US 7,261,551 B2

(12) United States Patent
Hutchinson et al.

(10) Patent No.: US 7,261,551 B2
(45) Date of Patent: *Aug. 28, 2007

(54) PREFORM MOLDS INCORPORATING HIGH HEAT CONDUCTIVITY MATERIAL

(75) Inventors: Gerald A. Hutchinson, Coto de Caza, CA (US); Robert A. Lee, Bowdon (GB)

(73) Assignee: Advanced Plastics Technologies Luxembourg S.A., Luxembourg (LU)

( * ) Notice: Subject to any disclaimer, the term of this patent is extended or adjusted under 35 U.S.C. 154(b) by 171 days.

This patent is subject to a terminal disclaimer.

(21) Appl. No.: 10/788,905

(22) Filed: Feb. 26, 2004

(65) Prior Publication Data

US 2004/0247735 A1   Dec. 9, 2004

Related U.S. Application Data

(60) Continuation of application No. 10/090,471, filed on Mar. 4, 2002, now Pat. No. 6,939,591, which is a division of application No. 09/296,695, filed on Apr. 21, 1999, now Pat. No. 6,352,426, which is a continuation-in-part of application No. 09/174,971, filed on Oct. 19, 1998, now Pat. No. 6,391,408, which is a continuation-in-part of application No. 08/953,595, filed on Oct. 17, 1997, now Pat. No. 6,312,641.

(60) Provisional application No. 60/078,641, filed on Mar. 19, 1998.

(51) Int. Cl.
*B29C 45/16* (2006.01)
(52) U.S. Cl. ........................ 425/548; 425/552
(58) Field of Classification Search ........... 425/130, 425/572, 574, 575, 576, 533
See application file for complete search history.

(56) References Cited

U.S. PATENT DOCUMENTS 2,708,288 A   5/1955   Fuller et al.

(Continued)

FOREIGN PATENT DOCUMENTS

CA   1 174 020   9/1984

(Continued)

OTHER PUBLICATIONS

PCT International Search Report: mailed Jan. 28, 2002 for International Application No. PCT/US 01/28128, Filed on Sep. 5, 2001.

(Continued)

*Primary Examiner*—Tim Heitbrink
(74) *Attorney, Agent, or Firm*—Knobbe, Martens Olson & Bear, LLP

(57) ABSTRACT

This invention relates to methods and apparatus for making articles made of polyester, preferably polyethylene terephthalate (PET), having coated directly to at least one of the surfaces thereof one or more layers of thermoplastic material with good gas-barrier characteristics. In one preferred method and apparatus, preforms are injection molded, barrier-coated immediately thereafter, and remain on a mold portion for a time to speed cooling of the completed preform. Preferably the barrier-coated articles take the form of preforms coated by at least one layer of barrier material and the containers are blow-molded therefrom. Such barrier-coated containers are preferably of the type to hold beverages such as soft drinks, beer or juice. The preferred barrier materials have a lower permeability to oxygen and carbon dioxide than PET as well as key physical properties similar to PET. The materials and methods provide that the barrier layers have good adherence to PET, even during and after the blow molding process to form containers from preforms. Preferred barrier coating materials include poly(hydroxyamino ethers).

27 Claims, 24 Drawing Sheets

U.S. PATENT DOCUMENTS

| | | |
|---|---|---|
| 3,224,043 A | 12/1965 | Lameris et al. |
| 3,305,528 A | 2/1967 | Wynstra et al. |
| 3,317,471 A | 5/1967 | Johnson et al. |
| 3,395,118 A | 7/1968 | Reining et al. |
| 3,418,398 A | 12/1968 | Seefluthy |
| 3,430,680 A | 3/1969 | Leghorn |
| 3,482,284 A | 12/1969 | Rees |
| 3,632,267 A | 1/1972 | Kader |
| 3,719,735 A | 3/1973 | Valyi |
| 3,740,181 A | 6/1973 | Uhlig |
| 3,813,198 A | 5/1974 | Valyi |
| 3,819,314 A | 6/1974 | Marcus |
| 3,857,660 A | 12/1974 | Flynn et al. |
| 3,869,056 A | 3/1975 | Valyi |
| 3,878,282 A | 4/1975 | Bonis |
| 3,882,213 A | 5/1975 | Uhlig |
| 3,944,643 A | 3/1976 | Sato et al. |
| 3,947,176 A | 3/1976 | Rainville |
| 3,963,399 A | 6/1976 | Zavasnik |
| 3,966,378 A | 6/1976 | Valyi |
| 4,040,233 A | 8/1977 | Valyi |
| 4,061,705 A | 12/1977 | Marcus |
| 4,065,246 A | 12/1977 | Marcus |
| 4,079,851 A | 3/1978 | Valyi |
| 4,092,391 A | 5/1978 | Valyi |
| 4,108,956 A | 8/1978 | Lee |
| 4,116,606 A | 9/1978 | Valyi |
| 4,145,392 A | 3/1979 | Valyi |
| 4,149,645 A | 4/1979 | Valyi |
| 4,150,079 A | 4/1979 | Chang |
| 4,151,247 A | 4/1979 | Hafele |
| 4,151,248 A | 4/1979 | Valyi |
| 4,208,177 A | 6/1980 | Allen |
| 4,213,751 A | 7/1980 | Fernandez |
| 4,323,341 A | 4/1982 | Valyi |
| 4,357,288 A | 11/1982 | Oas et al. |
| 4,357,296 A | 11/1982 | Hafele |
| 4,375,947 A | 3/1983 | Marcus |
| 4,376,090 A | 3/1983 | Marcus |
| 4,378,963 A | 4/1983 | Schouenberg |
| 4,395,222 A * | 7/1983 | Gaiser et al. ............... 425/572 |
| 4,403,090 A | 9/1983 | Smith |
| 4,438,254 A | 3/1984 | Doorakian et al. |
| 4,451,224 A | 5/1984 | Harding |
| 4,480,082 A | 10/1984 | McLean et al. |
| 4,515,836 A | 5/1985 | Cobbs et al. |
| 4,528,219 A | 7/1985 | Yamada et al. |
| 4,538,542 A | 9/1985 | Kennon et al. |
| 4,540,543 A | 9/1985 | Thomas et al. |
| 4,560,741 A | 12/1985 | Davis et al. |
| 4,564,541 A | 1/1986 | Taira et al. |
| 4,569,869 A | 2/1986 | Kushida et al. |
| 4,573,596 A | 3/1986 | Slat |
| 4,578,295 A | 3/1986 | Jabarin |
| 4,587,073 A | 5/1986 | Jakobsen |
| 4,590,021 A | 5/1986 | Ota et al. |
| 4,604,044 A | 8/1986 | Hafele |
| 4,604,258 A | 8/1986 | Valyi |
| 4,615,667 A * | 10/1986 | Roy ............................ 425/533 |
| 4,615,925 A | 10/1986 | Nilsson |
| 4,623,497 A | 11/1986 | Waters |
| 4,646,925 A | 3/1987 | Nohara |
| 4,647,648 A | 3/1987 | Silvis et al. |
| 4,680,001 A | 7/1987 | Waters |
| 4,690,789 A | 9/1987 | Ritchie et al. |
| 4,698,013 A | 10/1987 | Butcher |
| 4,699,809 A | 10/1987 | Maruhashi et al. |
| 4,715,504 A | 12/1987 | Chang et al. |
| 4,717,521 A | 1/1988 | Border et al. |
| 4,741,936 A | 5/1988 | Nohara et al. |
| 4,755,404 A | 7/1988 | Collette |
| 4,818,213 A * | 4/1989 | Roy ............................ 425/533 |
| 4,818,575 A | 4/1989 | Hirata et al. |
| 4,830,811 A | 5/1989 | Aoki |
| 4,844,987 A | 7/1989 | Hirose et al. |
| 4,847,129 A | 7/1989 | Collette et al. |
| 4,867,664 A | 9/1989 | Fukuhara |
| 4,871,410 A | 10/1989 | Bonnebat et al. |
| 4,871,507 A | 10/1989 | Ajmera et al. |
| 4,937,130 A | 6/1990 | Clagett et al. |
| 4,940,616 A | 7/1990 | Yatsu et al. |
| 4,955,804 A | 9/1990 | Martell et al. |
| 4,956,143 A | 9/1990 | McFarlane |
| 4,980,211 A | 12/1990 | Kushida |
| 5,006,381 A | 4/1991 | Nugent, Jr. et al. |
| 5,071,340 A | 12/1991 | LaBianca |
| 5,077,111 A | 12/1991 | Collette |
| 5,085,821 A | 2/1992 | Nohara |
| 5,089,588 A | 2/1992 | White et al. |
| 5,094,793 A | 3/1992 | Schrenk et al. |
| 5,115,075 A | 5/1992 | Brennan et al. |
| 5,134,218 A | 7/1992 | Brennan et al. |
| 5,143,998 A | 9/1992 | Brennan et al. |
| 5,149,768 A | 9/1992 | White et al. |
| 5,188,787 A | 2/1993 | King et al. |
| 5,202,074 A | 4/1993 | Schrenk et al. |
| 5,219,593 A | 6/1993 | Schmidte et al. |
| 5,246,751 A | 9/1993 | White et al. |
| 5,275,853 A | 1/1994 | Silvis et al. |
| RE34,537 E | 2/1994 | Dyrup |
| 5,300,326 A | 4/1994 | Zezinka et al. |
| 5,300,541 A | 4/1994 | Nugent, Jr. et al. |
| 5,302,417 A | 4/1994 | Yamauchi et al. |
| 5,352,401 A | 10/1994 | Dalgewicz, III et al. |
| 5,354,532 A | 10/1994 | Nakai et al. |
| 5,376,317 A | 12/1994 | Maus et al. |
| 5,411,698 A | 5/1995 | Mero et al. |
| 5,443,378 A | 8/1995 | Jaroschek et al. |
| 5,443,766 A | 8/1995 | Slat et al. |
| 5,460,761 A | 10/1995 | Larsson |
| 5,464,106 A | 11/1995 | Slat et al. |
| 5,472,753 A | 12/1995 | Farha |
| 5,489,455 A | 2/1996 | Nugent, Jr. et al. |
| 5,491,204 A | 2/1996 | Nugent, Jr. et al. |
| 5,508,076 A | 4/1996 | Bright |
| 5,509,965 A | 4/1996 | Harry et al. |
| 5,516,470 A | 5/1996 | Larsson |
| 5,540,878 A | 7/1996 | Schrenk et al. |
| 5,551,858 A | 9/1996 | Yoshizawa et al. |
| 5,571,470 A | 11/1996 | Plester |
| 5,582,788 A | 12/1996 | Collette et al. |
| 5,599,494 A | 2/1997 | Marcus |
| 5,628,950 A | 5/1997 | Schrenk et al. |
| 5,628,957 A | 5/1997 | Collette et al. |
| 5,639,848 A | 6/1997 | Nugent, Jr. et al. |
| 5,645,183 A | 7/1997 | Slat et al. |
| 5,651,933 A | 7/1997 | Slat et al. |
| 5,652,034 A | 7/1997 | Seiner |
| 5,653,907 A | 8/1997 | Kendall et al. |
| 5,676,267 A | 10/1997 | Slat et al. |
| 5,688,570 A | 11/1997 | Ruttinger |
| 5,688,572 A | 11/1997 | Slat et al. |
| 5,728,439 A | 3/1998 | Carlblom |
| 5,731,094 A | 3/1998 | Brennan et al. |
| 5,759,653 A | 6/1998 | Collette et al. |
| 5,759,654 A | 6/1998 | Cahill |
| 5,759,656 A | 6/1998 | Collette et al. |
| 5,772,056 A | 6/1998 | Slat |
| 5,780,128 A | 7/1998 | Farha |
| 5,804,305 A | 9/1998 | Slat et al. |
| 5,834,078 A | 11/1998 | Cavitt et al. |
| 5,837,339 A | 11/1998 | Wood et al. |
| 5,851,471 A | 12/1998 | Schloss et al. |
| 5,879,727 A | 3/1999 | Puri |

| | | | | | |
|---|---|---|---|---|---|
| 5,894,023 A | 4/1999 | Schramm et al. | EP | 0 099 727 | 2/1984 |
| 5,902,541 A | 5/1999 | Imai et al. | EP | 0 100 375 | 2/1984 |
| 5,906,285 A | 5/1999 | Slat | EP | 0 125 107 | 11/1984 |
| 5,906,787 A | 5/1999 | Plester | EP | 0 126 575 | 11/1984 |
| 5,914,138 A | 6/1999 | Swenson | EP | 0 174 265 | 3/1986 |
| 5,927,525 A | 7/1999 | Darr et al. | EP | 0 191 701 | 8/1986 |
| 5,968,620 A | 10/1999 | Harvey et al. | EP | 0 096 581 | 9/1986 |
| 5,971,742 A | 10/1999 | McCollum et al. | EP | 0 203 630 | 12/1986 |
| 5,972,445 A | 10/1999 | Kimura et al. | EP | 0 105 826 | 3/1987 |
| 5,989,661 A | 11/1999 | Krishnakumar et al. | EP | 0 218 245 | 4/1987 |
| 6,051,294 A | 4/2000 | White et al. | EP | 0 156 085 | 7/1987 |
| 6,068,900 A | 5/2000 | Kohn et al. | EP | 0 225 049 | 2/1988 |
| 6,090,460 A | 7/2000 | Collette et al. | EP | 0 266 900 | 5/1988 |
| 6,123,211 A | 9/2000 | Rashid et al. | EP | 0 280 736 | 9/1988 |
| 6,136,354 A | 10/2000 | Wood et al. | EP | 0 287 839 | 10/1988 |
| 6,168,740 B1 | 1/2001 | Koch et al. | EP | 0 160 984 | 2/1989 |
| 6,180,715 B1 | 1/2001 | Schmidt | EP | 0 302 117 | 2/1989 |
| 6,194,043 B1 | 2/2001 | Fehn | EP | 0 304 059 | 2/1989 |
| 6,196,830 B1 | 3/2001 | Foltuz et al. | EP | 0 095 909 | 4/1989 |
| 6,257,867 B1 | 7/2001 | McCollum et al. | EP | 0 171 161 | 6/1989 |
| 6,276,656 B1 | 8/2001 | Baresich | EP | 0 180 191 | 7/1989 |
| 6,312,628 B1 | 11/2001 | Wieder et al. | EP | 0 325 030 | 7/1989 |
| 6,312,641 B1 | 11/2001 | Hutchinson | EP | 0 176 229 | 10/1989 |
| 6,315,549 B1 | 11/2001 | Jenko et al. | EP | 0 153 894 | 1/1990 |
| 6,319,574 B1 | 11/2001 | Slat | EP | 0 350 745 | 1/1990 |
| 6,352,426 B1 * | 3/2002 | Hutchinson et al. ........ 425/548 | EP | 0 351 118 | 1/1990 |
| 6,365,247 B1 | 4/2002 | Cahill et al. | EP | 0 368 278 | 5/1990 |
| 6,372,318 B1 | 4/2002 | Collette et al. | EP | 0 092 979 | 8/1990 |
| 6,391,408 B1 | 5/2002 | Hutchinson | EP | 0 118 226 | 10/1990 |
| 6,413,075 B1 | 7/2002 | Koch et al. | EP | 0 395 237 | 10/1990 |
| 6,428,305 B2 | 8/2002 | Jenko | EP | 0 215 630 | 9/1991 |
| 6,428,737 B1 | 8/2002 | Collette et al. | EP | 0 153 120 | 12/1991 |
| 6,461,697 B1 | 10/2002 | Slat et al. | EP | 0 462 455 | 12/1991 |
| 6,471,503 B1 | 10/2002 | Priest et al. | EP | 0 278 403 | 1/1992 |
| 6,485,804 B1 | 11/2002 | Makamachi et al. | EP | 0 491 650 | 6/1992 |
| 6,524,672 B1 | 2/2003 | Slat et al. | EP | 0 518 703 | 12/1992 |
| 6,533,571 B2 | 3/2003 | Fikani | EP | 0 544 545 | 6/1993 |
| 6,676,883 B2 | 1/2004 | Hutchinson et al. | EP | 0 199 633 | 7/1993 |
| 6,808,820 B2 | 10/2004 | Lee et al. | EP | 0 555 976 | 8/1993 |
| 6,939,591 B2 | 9/2005 | Hutchinson et al. | EP | 0 571 116 | 11/1993 |
| 2001/0030163 A1 | 10/2001 | Rashid et al. | EP | 0 306 675 | 12/1993 |
| 2002/0001686 A1 | 1/2002 | Kashiba et al. | EP | 0 581 970 | 2/1994 |
| 2002/0014722 A1 | 2/2002 | Baresich | EP | 0 583 953 | 2/1994 |
| 2002/0028870 A1 | 3/2002 | Lan et al. | EP | 0 387 614 | 6/1994 |
| 2002/0048682 A1 | 4/2002 | Subramanian et al. | EP | 0 376 469 | 3/1995 |
| 2002/0061371 A1 | 5/2002 | Schmidt et al. | EP | 0 212 339 | 8/1995 |
| 2002/0090473 A1 | 7/2002 | Lee et al. | EP | 0 671 251 | 9/1995 |
| 2002/0155236 A1 | 10/2002 | Cahill et al. | EP | 0 678 554 | 10/1995 |
| 2003/0001315 A1 | 1/2003 | Hutchinson et al. | EP | 0 689 933 | 1/1996 |
| 2003/0012904 A1 | 1/2003 | Hutchinson et al. | EP | 0 341 044 | 9/1996 |
| 2003/0031814 A1 | 2/2003 | Hutchinson et al. | EP | 0 524 572 | 10/1996 |
| 2003/0039779 A1 | 2/2003 | Share et al. | EP | 0 744 263 | 11/1996 |
| 2003/0219555 A1 | 11/2003 | Hutchinson et al. | EP | 0 756 931 | 2/1997 |
| 2004/0013833 A1 | 1/2004 | Lee et al. | EP | 0 767 049 | 4/1997 |
| 2004/0071885 A1 | 4/2004 | Hutchinson et al. | EP | 0 774 491 | 5/1997 |
| 2004/0151937 A1 | 8/2004 | Hutchinson et al. | EP | 0 653 982 | 9/1997 |
| 2004/0247735 A1 | 12/2004 | Hutchinson et al. | EP | 0 794 007 | 9/1997 |
| 2005/0053739 A1 | 3/2005 | Lee et al. | EP | 0 822 213 | 2/1998 |
| | | | EP | 0 894 604 | 2/1999 |
| FOREIGN PATENT DOCUMENTS | | | EP | 0 964 031 | 12/1999 |
| | | | EP | 0 837 763 | 12/2001 |
| DE | 298620 | 8/1925 | FR | 2538297 | 6/1984 |
| DE | 2108774 | 9/1971 | GB | 1 482 956 | 8/1977 |
| DE | 26 49 640 | 5/1978 | GB | 2011309 | 7/1979 |
| DE | 30 44 930 | 10/1981 | JP | 55-37335 | 3/1980 |
| DE | 3407 060 | 4/1986 | JP | 57-093126 | 6/1982 |
| DE | 3518 441 | 3/1987 | JP | 58-92536 | 6/1983 |
| DE | 3518 875 | 11/1989 | JP | 58173634 | 10/1983 |
| DE | 3121 420 | 3/1990 | JP | 58215309 | 12/1983 |
| DE | 3121 421 | 8/1990 | JP | 61-002519 | 1/1986 |
| DE | 196 40662 | 3/1998 | JP | 61-185417 | 8/1986 |
| EP | 0 019 438 | 11/1980 | JP | 04074620 | 3/1992 |
| EP | 0 073 151 | 3/1983 | JP | 04-197634 | 7/1992 |

| | | |
|---|---|---|
| JP | 05-200793 A | 8/1993 |
| JP | 07-156349 | 6/1995 |
| JP | 08-281892 | 10/1996 |
| JP | 09-296056 | 11/1997 |
| JP | 10-128839 A | 5/1998 |
| JP | 11-090975 | 4/1999 |
| JP | 2001-106219 | 4/2001 |
| JP | 2003-103324 | 4/2003 |
| WO | WO87/02680 | 5/1987 |
| WO | WO87/05276 | 9/1987 |
| WO | WO89/08556 | 9/1989 |
| WO | WO90/07553 | 7/1990 |
| WO | WO92/01558 | 2/1992 |
| WO | WO93/01988 | 2/1993 |
| WO | WO93/07068 | 4/1993 |
| WO | WO93/25835 | 12/1993 |
| WO | WO94/01268 | 1/1994 |
| WO | WO94/19186 | 9/1994 |
| WO | WO94/25366 | 11/1994 |
| WO | WO95/00325 | 1/1995 |
| WO | WO95/06680 | 3/1995 |
| WO | WO95/07219 | 3/1995 |
| WO | WO95/18002 | 7/1995 |
| WO | WO95/22451 | 8/1995 |
| WO | WO95/29805 | 11/1995 |
| WO | WO95/34425 | 12/1995 |
| WO | WO96/18685 | 6/1996 |
| WO | WO96/20074 | 7/1996 |
| WO | WO96/33062 | 10/1996 |
| WO | WO96/35571 | 11/1996 |
| WO | WO97/02939 | 1/1997 |
| WO | WO97/09366 | 3/1997 |
| WO | WO97/15420 | 5/1997 |
| WO | WO97/26127 | 7/1997 |
| WO | WO97/28218 | 8/1997 |
| WO | WO97/31050 | 8/1997 |
| WO | WO97/32708 A | 9/1997 |
| WO | WO97/34758 | 9/1997 |
| WO | WO97/40972 | 11/1997 |
| WO | WO97/40981 | 11/1997 |
| WO | WO97/42250 | 11/1997 |
| WO | WO97/43182 | 11/1997 |
| WO | WO97/44174 | 11/1997 |
| WO | WO97/47695 | 12/1997 |
| WO | WO98/02479 | 1/1998 |
| WO | WO98/17470 | 4/1998 |
| WO | WO98/21730 | 5/1998 |
| WO | WO98/25746 | 6/1998 |
| WO | WO98/46410 | 10/1998 |
| WO | WO99/20462 | 4/1999 |
| WO | WO99/43563 | 9/1999 |
| WO | WO99/61514 | 12/1999 |
| WO | WO 00/62998 | 10/2000 |
| WO | WO 01/83193 | 11/2001 |
| WO | WO 02/20246 | 3/2002 |
| WO | WO 04/043675 | 5/2004 |

OTHER PUBLICATIONS

"Konzepte Füer Die Werkzeugtemperierung Eine Uebersicht Mit Erfahrungen Aus Der Praxis" Dunststoffe, Carl Hanser Verlag. Munchen, DE, vol. 92, No. 11, Nov. 2002, pp. 28-36, XP001121639 ISSN: 0023-5563 p. 30, col. 3, last paragraph p. 31, col. 3 paragraph 1.

PCT International Search Report: mailed Mar. 30, 2004 for International Application No. PCT/US 03/35949, Filed Nov. 10, 2003.

"Tool Steel Recommendations for Injection Molds Designed for Processing Geon® Vinyl Compounds," Technical Service Report, No. 12; Apr. 1996.

Mold-Making Handbook, 2nd Edition, pp. 223 and 343, Gunter Mennig, 1998.

Proceedings of 3$^{rd}$ International Conference on Rigid Polyester Packaging Innovations for Food and Beverages; Nova-Pak Americas '98; Jan. 26-27, 1998.

White et al.; "High-Barrier Structural Thermoplastics Based on Diglycidyl Ethers"; Polymer Science; vol. 34(1); 1993; pp. 904-905.

"Mitsui B-010:Gas Barrier Polyester"; Chemical Data Sheet; Mitsui Chemicals, Inc.; Feb. 1, 1998.

The Condensed Chemical Dictionary, 1981, p. 65.

Yukihiko Suematsu; Growth Prospects & Challenges for Pet in Asia/Japan: A Producer's Perspective.

\* cited by examiner

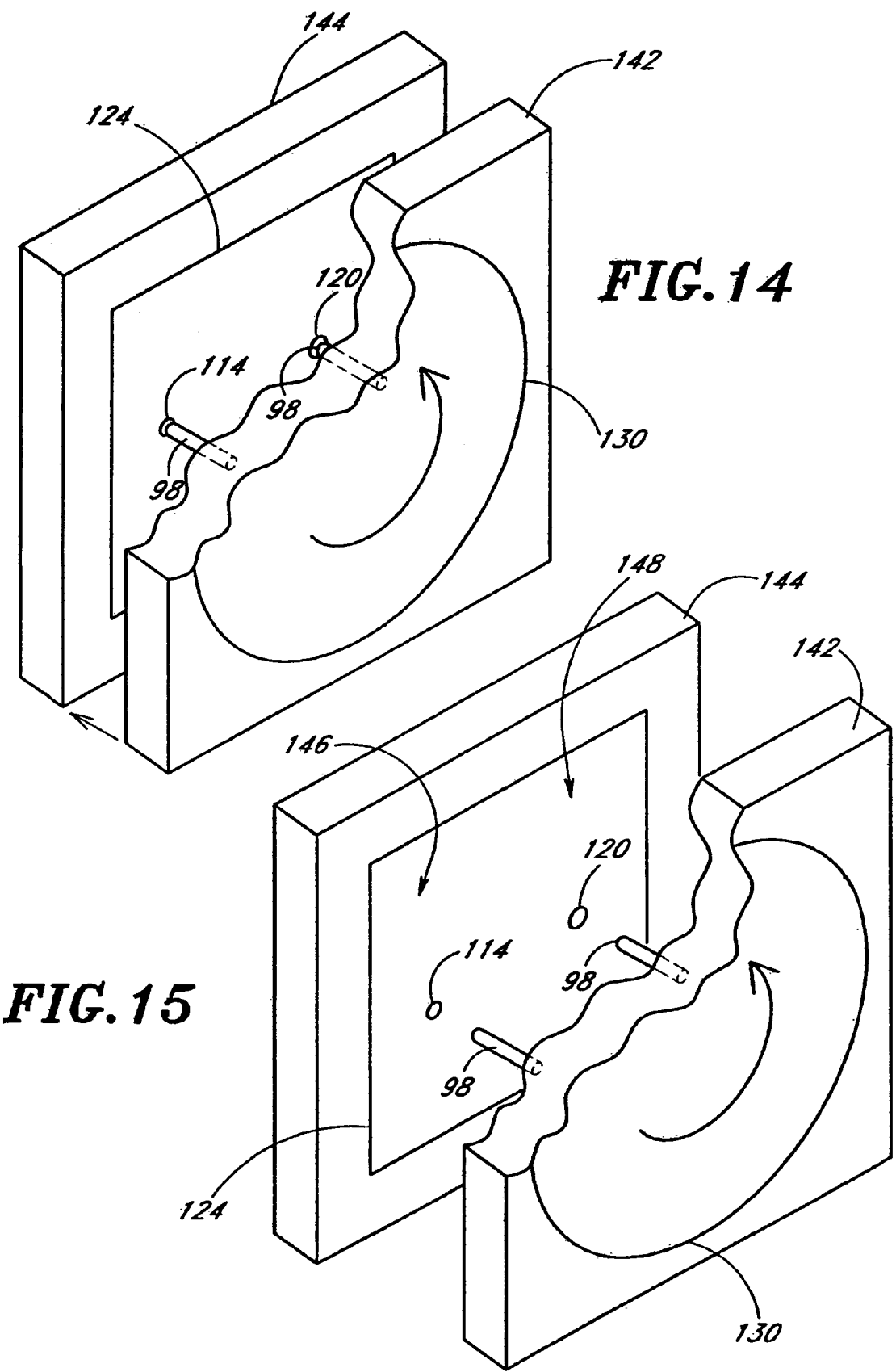

PREFORM MOLDS INCORPORATING HIGH HEAT CONDUCTIVITY MATERIAL

RELATED APPLICATION DATA

This application is a continuation of U.S. patent application Ser. No. 10/090,471, filed Mar. 4, 2002 now U.S. Pat. No. 6,939,591, which is a divisional of U.S. patent application Ser. No. 09/296,695, filed Apr. 21, 1999 now U.S. Pat. No. 6,352,426, which is a continuation-in-part of U.S. patent application Ser. No. 09/174,971, filed Oct. 19, 1998 now U.S. Pat. No. 6,391,408, entitled BARRIER-COATED POLYESTER which is a continuation-in-part of U.S. patent application Ser. No. 08/953,595, filed Oct. 17, 1997 now U.S. Pat. No. 6,312,641 and also claims priority under 35 U.S.C. § 119(e) from provisional application Ser. No. 60/078,641, filed Mar. 19, 1998.

BACKGROUND OF THE INVENTION

This invention relates to an apparatus and method for making barrier-coated polyesters, preferably barrier coated polyethylene terephthalate (PET) and articles made therefrom. Preferably the barrier-coated PET takes the form of preforms having at least one layer of a barrier material and the bottles blow-molded therefrom.

The use of plastic containers as a replacement for glass or metal containers in the packaging of beverages has become increasingly popular. The advantages of plastic packaging include lighter weight, decreased breakage as compared to glass, and potentially lower costs. The most common plastic used in making beverage containers today is PET. Virgin PET has been approved by the FDA for use in contact with foodstuffs. Containers made of PET are transparent, thin-walled, lightweight, and have the ability to maintain their shape by withstanding the force exerted on the walls of the container by pressurized contents, such as carbonated beverages. PET resins are also fairly inexpensive and easy to process.

Despite these advantages and its widespread use, there is a serious downside to the use of PET in thin-walled beverage containers: permeability to gases such as carbon dioxide and oxygen. These problems are of particular importance when the bottle is small. In a small bottle, the ratio of surface area to volume is large which allows for a large surface for the gas contained within to diffuse through the walls of the bottle. The permeability of PET bottles results in soft drinks that go "flat" due to the egress of carbon dioxide, as well as beverages that have their flavor spoiled due to the ingress of oxygen. Because of these problems, PET bottles are not suitable for all uses desired by industry, and for many of the existing uses, the shelf-life of liquids packaged in PET bottles is shorter than desired.

U.S. Pat. No. 5,464,106 to Slat, et al, describes bottles formed from the blow molding of preforms having a barrier layer. The barrier materials disclosed are polyethylene naphthalate, saran, ethylene vinyl alcohol copolymers or acrylonitrile copolymers. In Slat's technique, the barrier material and the material to form the inner wall of the preform are coextruded in the shape of a tube. This tube is then cut into lengths corresponding to the length of the preform, and is then placed inside a mold wherein the outer layer of the preform is injected over the tube to form the finished preform. The preform may then be blow-molded to form a bottle. The drawbacks of this method are that most of the barrier materials disclosed do not adhere well to PET, and that the process itself is rather cumbersome.

A family of materials with good barrier characteristics are those disclosed in U.S. Pat. No. 4,578,295 to Jabarin. Such barrier materials include copolymers of terephthalic acid and isophthalic acid with ethylene glycol and at least one diol. This type of material is commercially available as B-010 from Mitsui Petrochemical Ind. Ltd. (Japan). These barrier materials are miscible with polyethylene terephthalate and form blends of 80-90% PET and 10-20% of the copolyester from which barrier containers are formed. The containers made from these blends are about 20-40% better gas barriers to CO2 transmission than PET alone. Although some have claimed that this polyester adheres to PET without delamination, the only preforms or containers disclosed were made with blends of these materials.

Another group of materials, the polyamine-polyepoxides, have been proposed for use as a gas-barrier coating. These materials can be used to form a barrier coating on polypropylene or surface-treated PET, as described in U.S. Pat. No. 5,489,455 to Nugent, Jr. et al. These materials commonly come as a solvent or aqueous based thermosetting composition and are generally spray coated onto a container and then heat-cured to form the finished barrier coating. Being thermosets, these materials are not conducive to use as preform coatings, because once the coating has been cured, it can no longer be softened by heating and thus cannot be blow molded, as opposed to thermoplastic materials which can be softened at any time after application.

Another type of barrier-coating, that disclosed in U.S. Pat. No. 5,472,753 to Farha, relies upon the use of a copolyester to effect adherence between PET and the barrier material. Farha describes two types of laminates, a three-ply and a two-ply. In the three-ply laminate, an amorphous, thermoplastic copolyester is placed between the barrier layer of phenoxy-type thermoplastic and the layer of PET to serve as a tie layer to bind the inner and outer layers. In the two-ply laminate, the phenoxy-type thermoplastic is first blended with the amorphous, thermoplastic copolyester and this blend is then applied to the PET to form a barrier. These laminates are made either by extrusion or by injection molding wherein each layer is allowed to cool before the other layer of material is injected.

PCT Application Number PCT/US95/17011, to Collette et al., which was published on Jul. 4, 1996, describes a method of cooling multilayer preforms. The disclosed apparatus comprises a rotary turret having multiple faces, each face carrying an array of cores. The cores are inserted into corresponding mold cavities. Multiple melt streams are brought together and coinjected into each cavity to form a multilayer preform on each core. After the preform is injected, the cores are removed from the cavities and the turret is rotated, presenting a new set of cores to the mold cavities. The just-injected cavities remain on the cores cooling while preforms are formed on other arrays of cores. The drawbacks of the Collette application include that coinjection results in preforms that are inconsistent and have unpredictable layering. Thus, distribution of barrier materials in such a preform would be unpredictable and would result in a preform having unreliable barrier properties.

Since PET containers can be manufactured by injection molding using only a single injection of PET, manufacture is relatively easy and production cycle time is low. Thus, PET containers are inexpensive. Even if known barrier materials can be bonded to PET to create a saleable container with reliable barrier properties, methods and apparatus for making such containers within a competitive cycle time and cost have not been devised. Production cycle time is especially important because a lower cycle time enables a manufacturer to make more efficient use of its capital equipment. Thus, low cycle time enables higher volume and less expensive production of containers. Cost-effective production would be necessary to develop a viable alternative to monolayer PET containers.

Thus, the need exists for an apparatus and method for making barrier-coated PET preforms and containers which are economical, cosmetically appealing, easy to produce, and have good barrier and physical properties remains unfulfilled.

SUMMARY OF THE INVENTION

This invention relates to methods and apparatus for making PET articles having coated upon the surfaces thereof one or more thin layers of thermoplastic material with good gas-barrier characteristics. The articles of the present invention are preferably in the form of preforms and containers.

In an aspect of the present invention there is provided a barrier coated preform comprising a polyester layer and a barrier layer comprising barrier material, wherein the polyester layer is thinner in the end cap than in the wall portion and the barrier layer is thicker in the end cap than in the wall portion.

In another aspect of the present invention there is provided a method for making a barrier coated polyester article. A polyester article with at least an inner surface and an outer surface is formed by injecting molten polyester through a first gate into the space defined by a first mold half and a core mold half, where the first mold half and the core mold half are cooled by circulating fluid and the first mold half contacts the outer polyester surface and the core mold half contacts the inner polyester surface. Following this, the molten polyester is allowed to remain in contact with the mold halves until a skin forms on the inner and outer polyester surfaces which surrounds a core of molten polyester. The first mold half is then removed from the polyester article, and the skin on the outer polyester surface is softened by heat transfer from the core of molten polyester, while the inner polyester surface is cooled by continued contact with the core mold half. The polyester article, still on the core mold half is then placed into a second mold half, wherein the second mold half is cooled by circulating fluid. In the coating step, the barrier layer comprising barrier material is placed on the outer polyester surface by injecting molten barrier material through a second gate into the space defined by the second mold half and the outer polyester surface to form the barrier coated polyester article. The second mold half is then removed from the barrier coated article and then the barrier coated article is removed from the core mold half. The barrier materials used in the process preferably comprise a Copolyester Barrier Materials, Phenoxy-type Thermoplastics, Polyamides, polyethylene naphthalate, polyethylene naphthalate copolymers, polyethylene naphthalate/polyethylene terephthalate blends, and combinations thereof.

In a further aspect of the present invention, there is provided a method of making and coating preforms. The method begins by closing a mold comprising a stationary half and a movable half, wherein the stationary mold half comprises at least one preform molding cavity and at least one preform coating cavity and the movable mold half comprises a rotatable plate having mounted thereon a number of mandrels equal to the sum of the number of preform molding cavities and preform coating cavities. The remaining steps comprise: injecting a first material into the space defined by a mandrel and a preform molding cavity to form a preform having an inner surface and an outer surface; opening the mold; rotating the rotatable plate; closing the mold; injecting a second material into the space defined by the outer surface of the preform and the preform coating cavity to form a coated preform; opening the mold; removing the coated preform.

In accordance with a preferred embodiment having features in accordance with the present invention, an apparatus for injection molding multilayer preforms is provided. The apparatus comprises first and second mold cavities in communication with first and second melt sources, respectively. A turntable is provided and is divided into a plurality of stations, with at least one mold core disposed on each station. The turntable is adapted to rotate each station to a first position at which a core on the station interacts with the first mold cavity to form a first preform layer, then to a second position at which the core interacts with the second mold cavity to form a second preform layer. Finally, the turntable is further adapted to rotate the station to at least one cooling position, at which the molded preform remains on the core to cool.

In accordance with another preferred embodiment having features in accordance with the present invention, a mold apparatus for injection molding multilayer preforms is provided. The mold apparatus has a first mold body which is adapted to fit about a mold core to define a first layer cavity therebetween, a first gate area, and is in communication with a first melt source. A second mold body is adapted to fit about a first preform layer disposed on the mold core to define a second layer cavity therebetween, has a second gate area, and is in communication with a second melt source. At least one of the gate areas has Ampcoloy metal inserts disposed therein.

In accordance with another preferred embodiment having features in accordance with the present invention, a mold apparatus for injection molding multilayer preforms is provided. The mold apparatus has a first mold body which is adapted to fit about a mold core, defining a first layer cavity therebetween. The first layer cavity has a base end and a main body. The first mold body is in communication with a first melt source and has a first gate area adjacent the base end of the first layer cavity. A thickness of the cavity at the base end is less than the thickness of the main body of the cavity. the mold apparatus also has a second mold body, which is adapted to fit about a first preform layer disposed on the mold core, defining a second layer cavity therebetween. The second mold body is in communication with a second melt source and has a second gate area.

In accordance with yet another preferred embodiment having features in accordance with the present invention, a mold for injection molding multilayer preforms is provided. The mold has a mandrel and first and second cavities. The mandrel is hollow and has a wall of substantially uniform thickness. A coolant supply tube is disposed centrally within the hollow mandrel to supply coolant directly to a base end of the mandrel. The first cavity has a gate for injecting molten plastic. A gate area of the cavity has an insert of material having greater heat transfer properties than the majority of the cavity.

In accordance with a further preferred embodiment having features in accordance with the present invention, a method for improving injection mold performance is provided. The method includes forming an opening in a wall of a mold cavity. The opening is sized and adapted so that molten plastic will not substantially enter the opening. A passageway is formed connecting the opening to a source of air pressure. The method further includes providing a valve between the opening and the source of air pressure.

In accordance with another preferred embodiment having features in accordance with the present invention, a method for injection molding and cooling a multilayer preform is provided. The method includes the steps of providing a mold core disposed on a turntable and having an internal cooling system, rotating the turntable so that the core is aligned with a first mold cavity, engaging the core with the first mold cavity, and injecting a melt to form a first preform layer. The first preform layer is held within the mold cavity to cool until a skin is formed on a surface of the layer, but an interior of the layer remains substantially molten. The core is then removed from the first mold cavity while retaining the molded preform layer on the core and the turntable is rotated so that the core is aligned with a second mold cavity. The core is engaged with the second mold cavity and a melt is injected to form a second preform layer on top of the first preform layer. The core is removed from the second mold cavity while retaining the molded preform on the core and the turntable is rotated so that the core and preform are in a cooling position during which the preform cools upon the core. The preform is eventually removed from the core.

In accordance with one aspect of the present invention, there is provided a laminate comprising at least one layer of polyethylene terephthalate directly adhered to at least one layer of barrier material. The polyethylene terephthalate has an isophthalic acid content of at least about 2% by weight. Barrier materials used include Copolyester Barrier Materials, Phenoxy-type Thermoplastics, Polyamides, polyethylene naphthalate, polyethylene naphthalate copolymers, polyethylene naphthalate/polyethylene terephthalate blends, and combinations thereof. In preferred embodiments, the laminate is provided in the form of preforms and containers.

In accordance with a further aspect of the present invention, there is provided a preform comprising at least two layers, wherein the first layer is thinner in the end cap than in the wall portion and the second layer is thicker in the end cap than in the wall portion. The first layer comprises polyethylene terephthalate having an isophthalic acid content of at least about 2% by weight and the second layer comprises a barrier material. Barrier materials used include Copolyester Barrier Materials, Phenoxy-type Thermoplastics, Polyamides, polyethylene naphthalate, polyethylene naphthalate copolymers, polyethylene naphthalate/polyethylene terephthalate blends, and combinations thereof.

For purposes of summarizing the invention and the advantages achieved over the prior art, certain objects and advantages of the invention have been described hereinabove. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 14 is a perspective view of a schematic of a mold with mandrels partially located within the molding cavities.

FIG. 15 is a perspective view of a mold with mandrels fully withdrawn from the molding cavities, prior to rotation.

DETAILED DESCRIPTION OF THE PREFERRED EMBODIMENT

A. General Description of the Invention

Figure 1:
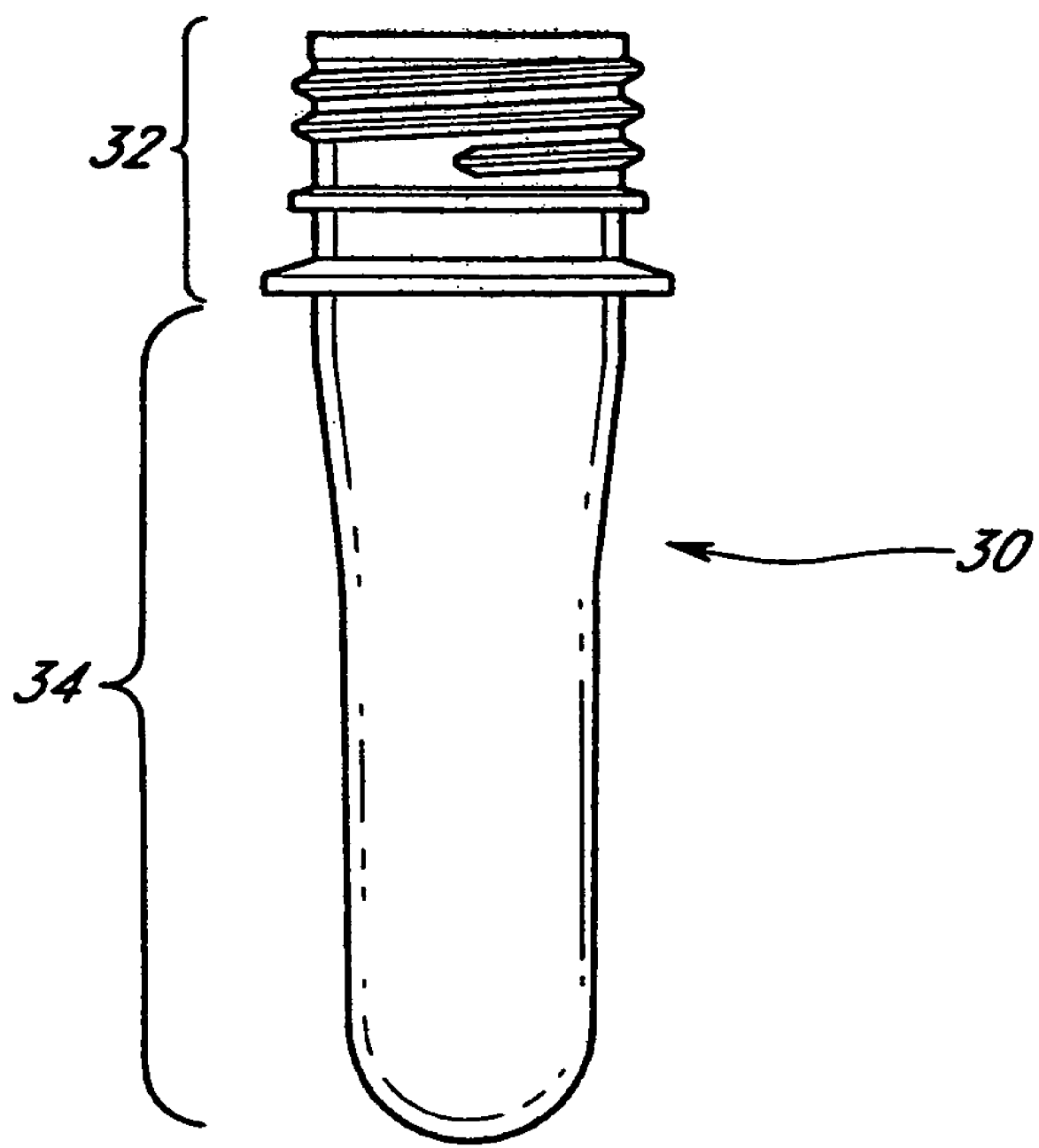
FIG. 1 is an uncoated preform as is used as a starting material for embodiments of the present invention.

This invention relates to methods and apparatus for making plastic articles having coatings comprising one or more layers of thermoplastic material with good gas-barrier characteristics. As presently contemplated, one embodiment of barrier coated article is a bottle of the type used for beverages. Alternatively, embodiments of the barrier coated articles of the present invention could take the form of jars, tubs, trays, or bottles for holding liquid foods. However, for the sake of simplicity, these embodiments will be described herein primarily in the context of beverage bottles and the preforms from which they are made by blow-molding.

Furthermore, the invention is described herein specifically in relation to polyethylene terephthalate (PET) but it is applicable to many other thermoplastics of the polyester type. Examples of such other materials include polyethylene 2,6- and 1,5-naphthalate (PEN), PETG, polytetramethylene 1,2-dioxybenzoate and copolymers of ethylene terephthalate and ethylene isophthalate.

In especially preferred embodiments, "high IPA PET" is used as the polyester which is barrier coated. As it is used herein, the term "high-IPA PET" refers to PET to which IPA was added during to manufacture to form a copolymer in which the IPA content is more than about 2% by weight, preferably 2-10% IPA by weight, more preferably 3-8%, most preferably about 4-5% IPA by weight. The most preferred range is based upon current FDA regulations, which do not allow for PET materials having an IPA content of more than 5% to be in contact with food or drink. If such regulations are not a concern, then an IPA content of 5-10% is preferred. As used herein, "PET" includes "high IPA PET."

The high-IPA PET (more than about 2% by weight) is preferred because the inventor has surprisingly discovered that use of high-IPA PET in the processes for making barrier preforms and containers, provides for better interlayer adhesion than is found in those laminates comprising PET with no IPA or low IPA. Additionally, it has been found that interlayer adhesion improves as the IPA content rises. Incorporation of the higher amounts of IPA into the PET results in a decrease in the rate of crystallization of the high IPA PET material as compared to PET homopolymer, or PET having lower amounts of IPA. The decrease in the rate of crystallization allows for the production of PET layers (made of high IPA PET) having a lower level of crystallinity than what is achieved with low-IPA PET or homopolymer PET when they are made into barrier preforms by similar procedures. The lower crystallinity of the high-IPA PET is important in reducing crystallinity at the surface of the PET, i.e. the interface between the PET and the barrier material. Lower crystallinity allows for better adhesion between the layers and also provides for a more transparent container following blow molding of the preform.

Preferably, the preforms and containers have the barrier coating disposed on their outer surfaces or within the wall of the container. In contrast with the technique of Slat, which produces multilayered preforms in which the layers are readily separated, in embodiments of the present invention the thermoplastic barrier material adheres directly and strongly to the PET surface and is not easily separated therefrom. Adhesion between the layers results without the use of any additional materials such as an adhesive material or a tie layer. The coated preforms are processed, preferably by stretch blow molding to form bottles using methods and conditions similar to those used for uncoated PET preforms. The containers which result are strong, resistant to creep, and cosmetically appealing as well as having good gas-barrier properties.

One or more layers of a barrier material are employed in carrying out the present invention. As used herein, the terms "barrier material", "barrier resin" and the like refer to materials which, when used to form articles, preferably have key physical properties similar to PET, adhere well to PET, and have a lower permeability to oxygen and carbon dioxide than PET.

Once a suitable barrier material is chosen, an apparatus and method for economically manufacturing a container using the barrier material is necessary. One important method and apparatus involves using an injection molding machine in conjunction with a mold comprising a mandrel or core and a cavity. A first layer of a preform is molded between the mandrel and a first cavity of the mold when a molten polyester is injected therein. The first layer remains on the mandrel when the mandrel is pulled out of the cavity, moved, and inserted into a second mold cavity. A second layer of the material, preferably a barrier layer or a layer comprising barrier material, is then injected over the existing first preform layer. The mandrel and accompanying preform are then removed from the second cavity and a robot removes the preform from the mandrel. While the robot cools the molded preform, the mandrel is available for another molding cycle.

In another embodiment, the apparatus retains the preform on the mandrel after removal from the second mold cavity but indexes the mandrel out of the way of the mold cavities in order to cool the new preform. During this time, other mandrels of the apparatus interact with the mold cavities to form preform layers. After the preform is sufficiently cooled, it is removed from the mandrel by a robot or other device and the mandrel is available to start the process over again. This method and apparatus allows preforms to be cooled on the mandrel without substantially increasing cycle time.

A number of barrier materials having the requisite low permeability to gases such as oxygen and carbon dioxide are useful in embodiments of the present invention, the choice of barrier material being partly dependent upon the mode or application as described below. Preferred barrier materials for use in barrier coatings fall into two major categories: (1) copolyesters of terephthalic acid, isophthalic acid, and at least one diol having good barrier properties as compared to PET, such as those disclosed in U.S. Pat. No. 4,578,295 to Jabarin, and which is commercially available as B-010 (Mitsui Petrochemical Ind. Ltd., Japan); and (2) hydroxy-functional poly(amide-ethers) such as those described in U.S. Pat. Nos. 5,089,588 and 5,143,998, poly(hydroxy amide ethers) such as those described in U.S. Pat. No. 5,134,218, polyethers such as those described in U.S. Pat. Nos. 5,115,075 and 5,218,075, hydroxy-functional polyethers such as those as described in U.S. Pat. No. 5,164,472, hydroxy-functional poly(ether sulfonamides) such as those described in U.S. Pat. No. 5,149,768, poly(hydroxy ester ethers) such as those described in U.S. Pat. No. 5,171,820, hydroxy-phenoxyether polymers such as those described in U.S. Pat. No. 5,814,373, and poly(hydroxyamino ethers) ("PHAE") such as those described in U.S. Pat. No. 5,275, 853. The barrier materials described in (1) above are referred to herein by the term "Copolyester Barrier Materials". The compounds described in the patents in (2) above are collectively categorized and referred to herein by the term "Phenoxy-type Thermoplastic" materials. All the patents referenced in this paragraph are hereby incorporated in their entireties into this disclosure by this reference thereto.

Preferred Copolyester Barrier Materials will have FDA approval. FDA approval allows for these materials to be used in containers where they are in contact with beverages and the like which are intended for human consumption. To the inventor's knowledge, none of the Phenoxy-type Thermoplastics have FDA approval as of the date of this disclosure. Thus, these materials are preferably used in multi-layered containers in locations which do not directly contact the contents, if the contents are ingestible.

In carrying out preferred methods of the present invention to form barrier coated preforms and bottles, an initial preform is coated with at least one additional layer of material comprising barrier material, polyesters such as PET, post-consumer or recycled PET (collectively recycled PET), and/or other compatible thermoplastic materials. A coating layer may comprise a single material, a mix or blend of materials (heterogeneous or homogeneous), an interwoven matrix of two or more materials, or a plurality of microlayers (lamellae) comprised of at least two different materials. In one embodiment, the initial preform comprises a plurality of microlayers, such as may be prepared by a lamellar injection molding process. Initial preforms comprise polyester, and it is especially preferred that initial preforms comprise virgin materials which are approved by the FDA for being in contact with foodstuffs.

Thus the preforms and containers of embodiments of the present invention may exist in several embodiments, such as: virgin PET coated with a layer of barrier material; virgin PET coated with a layer of material comprising alternating microlayers of barrier material and recycled PET; virgin PET coated with a barrier layer which is in turn coated with recycled PET; microlayers of virgin PET and a barrier material coated with a layer of recycled PET; or virgin PET coated with recycled PET which is then coated with barrier material. In any case, at least one layer must comprise at least one barrier material.

As described previously, preferred barrier materials for use in accordance with the present invention are Copolyester Barrier Materials and Phenoxy-type Thermoplastics. Other barrier materials having similar properties may be used in lieu of these barrier materials. For example, the barrier material may take the form of other thermoplastic polymers, such as acrylic resins including polyacrylonitrile polymers, acrylonitrile styrene copolymers, polyamides, polyethylene naphthalate (PEN), PEN copolymers, and PET/PEN blends. Preferred barrier materials in accordance with embodiments of the present invention have oxygen and carbon dioxide permeabilities which are less than one-third those of polyethylene terephthalate. For example, the Copolyester Barrier Materials of the type disclosed in the aforementioned patent to Jabarin will exhibit a permeability to oxygen of about 11 cc mil/100 in$^2$ day and a permeability to carbon dioxide of about 2 cc mil/100 in$^2$ day. For certain PHAEs, the permeability to oxygen is less than 1 cc mil/100 in$^2$ day and the permeability to carbon dioxide is 3.9 cc mil/100 in$^2$ day. The corresponding $CO_2$ permeability of polyethylene terephthalate, whether in the recycled or virgin form, is about 12-20 cc mil/100 in$^2$ day.

The methods of embodiments of the present invention provide for a coating to be placed on a preform which is later blown into a bottle. Such methods are preferable to placing coatings on the bottles themselves. Preforms are smaller in size and of a more regular shape than the containers blown therefrom, making it simpler to obtain an even and regular coating. Furthermore, bottles and containers of varying shapes and sizes can be made from preforms of similar size and shape. Thus, the same equipment and processing can be used to produce preforms to form several different kinds of containers. The blow-molding may take place soon after molding, or preforms may be made and stored for later blow-molding. If the preforms are stored prior to blow-molding, their smaller size allows them to take up less space in storage.

Even though it is preferable to form containers from coated preforms as opposed to coating containers themselves, they have generally not been used because of the difficulties involved in making containers from coated or multi-layer preforms. One step where the greatest difficulties arise is during the blow-molding process to form the container from the preform. During this process, defects such as delamination of the layers, cracking or crazing of the coating, uneven coating thickness, and discontinuous coating or voids can result. These difficulties can be overcome by using suitable barrier materials and coating the preforms in a manner that allows for good adhesion between the layers.

Thus, one aspect of the present invention is the choice of a suitable barrier material. When a suitable barrier material is used, the coating sticks directly to the preform without any significant delamination, and will continue to stick as the preform is blow-molded into a bottle and afterwards. Use of a suitable barrier material also helps to decrease the incidence of cosmetic and structural defects which can result from blow-molding containers as described above.

It should be noted that although most of the discussion, drawings, and examples of making coated preforms deal with two layer preforms, such discussion is not intended to limit the present invention to two layer articles. The two layer barrier containers and preforms of the present invention are suitable for many uses and are cost-effective because of the economy of materials and processing steps. However, in some circumstances and for some applications, preforms consisting of more than two layers may be desired. Use of three or more layers allows for incorporation of materials such as recycled PET, which is generally less expensive than virgin PET or the preferred barrier materials. Thus, it is contemplated as part of the present invention that all of the methods for producing the barrier-coated preforms of the present invention which are disclosed herein and all other suitable methods for making such preforms may be used, either alone or in combination to produce barrier-coated preforms and containers comprised of two or more layers.

B. Detailed Description of the Drawings

Referring to FIG. 1, a preferred uncoated preform 30 is depicted. The preform is preferably made of an FDA approved material such as virgin PET and can be of any of a wide variety of shapes and sizes. The preform shown in FIG. 1 is of the type which will form a 16 oz. carbonated beverage bottle that requires an oxygen and carbon dioxide barrier, but as will be understood by those skilled in the art, other preform configurations can be used depending upon the desired configuration, characteristics and use of the final article. The uncoated preform 30 may be made by injection molding as is known in the art or by methods disclosed herein.

Figure 2:
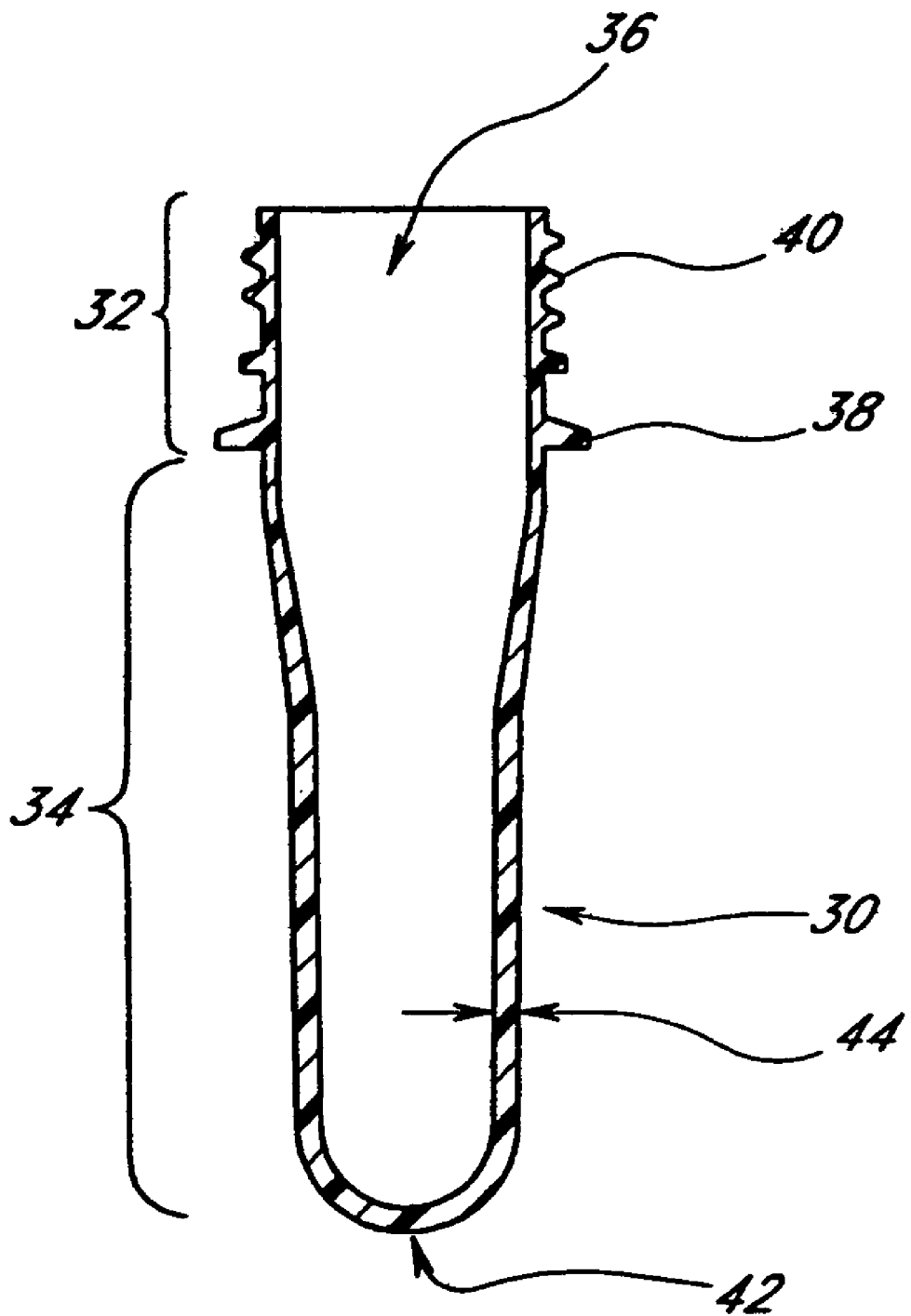
FIG. 2 is a cross-section of a preferred uncoated preform of the type that is barrier-coated in accordance with an embodiment the present invention.

Referring to FIG. 2, a cross-section of the preferred uncoated preform 30 of FIG. 1 is depicted. The uncoated preform 30 has a neck portion 32 and a body portion 34. The neck portion 32 begins at the opening 36 to the interior of the preform 30 and extends to and includes the support ring 38. The neck portion 32 is further characterized by the presence of the threads 40, which provide a way to fasten a cap for the bottle produced from the preform 30. The body portion 34 is an elongated and cylindrically shaped structure extending down from the neck portion 32 and culminating in the rounded end cap 42. The preform thickness 44 will depend upon the overall length of the preform 30 and the wall thickness and overall size of the resulting container.

Figure 3:
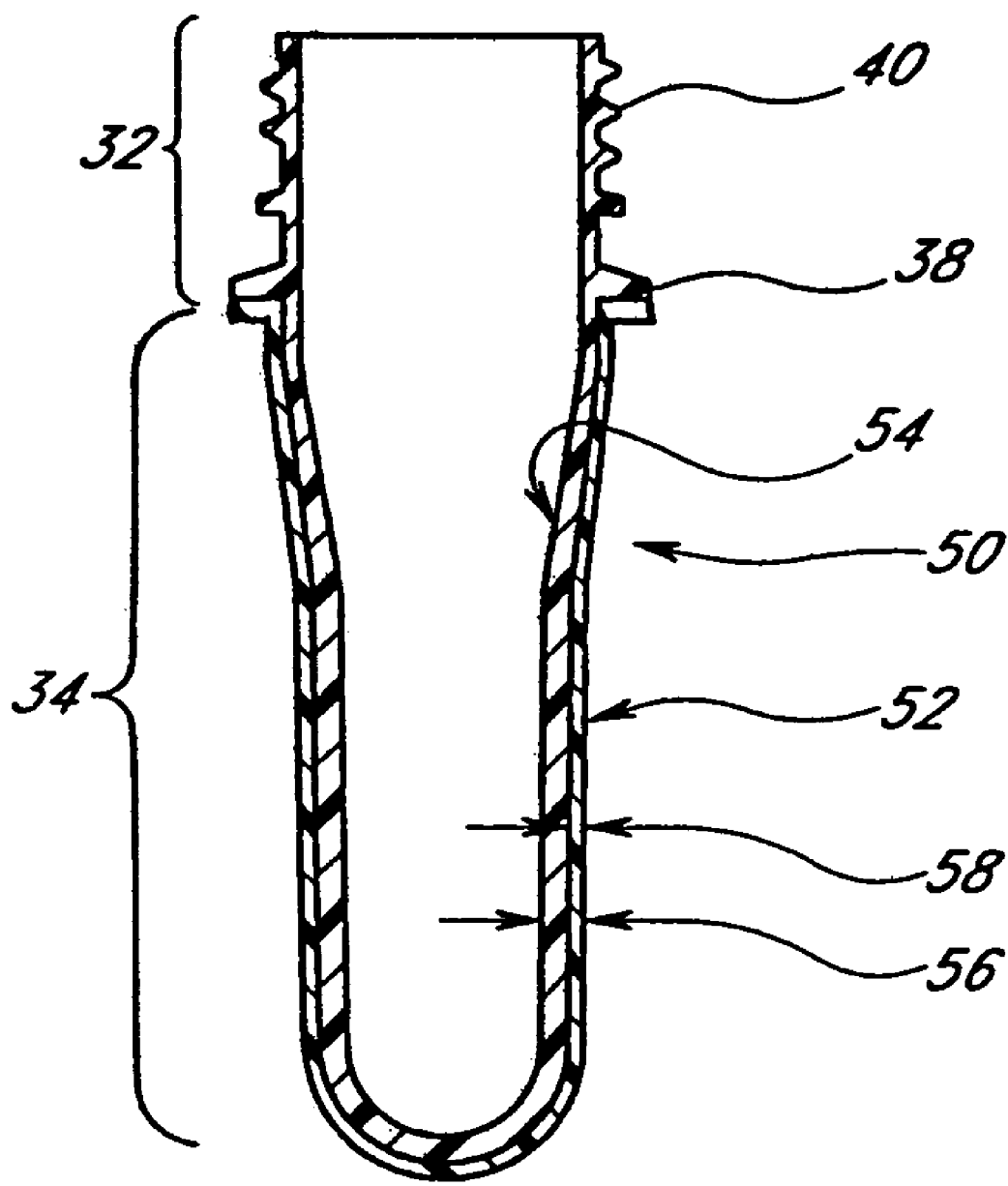
FIG. 3 is a cross-section of one preferred embodiment of barrier-coated preform of the present invention.

Referring to FIG. 3, a cross-section of one type of barrier-coated preform 50 having features in accordance with the present invention is disclosed. The barrier-coated preform 50 has a neck portion 32 and a body portion 34 as in the uncoated preform 30 in FIGS. 1 and 2. The barrier coating layer 52 is disposed about the entire surface of the body portion 34, terminating at the bottom of the support ring 38. A barrier coating layer 52 in the embodiment shown in the figure does not extend to the neck portion 32, nor is it present on the interior surface 54 of the preform which is preferably made of an FDA approved material such as PET. The barrier coating layer 52 may comprise either a single material or several microlayers of at least two materials. The overall thickness 56 of the preform is equal to the thickness of the initial preform plus the thickness 58 of the barrier layer, and is dependent upon the overall size and desired coating thickness of the resulting container. By way of example, the wall of the bottom portion of the preform may have a thickness of 3.2 millimeters; the wall of the neck finish, a cross-sectional dimension of about 3 millimeters; and the barrier material applied to a thickness of about 0.3 millimeters.

Figure 4:
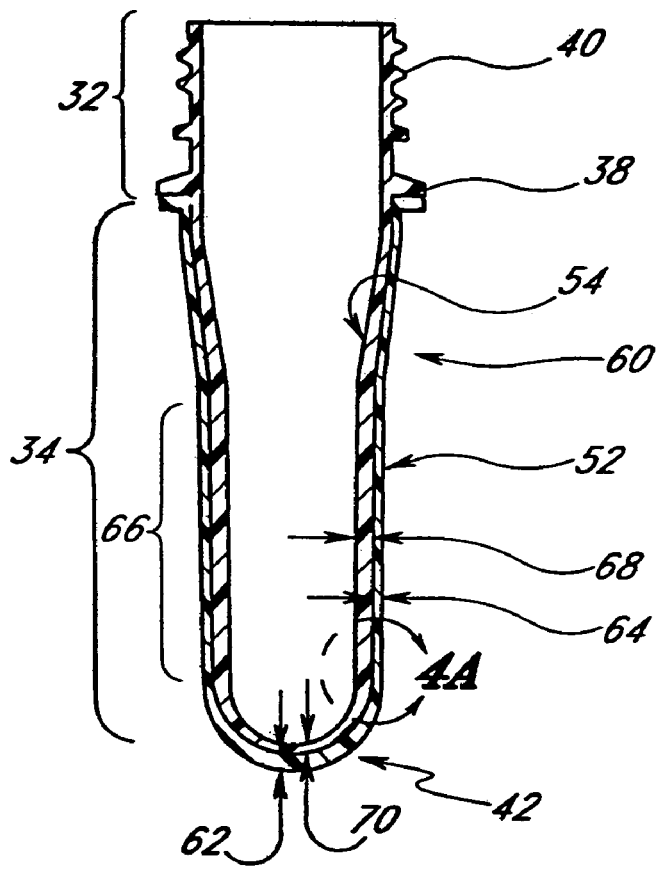
FIG. 4 is a cross-section of another preferred embodiment of a barrier-coated preform of an embodiment of the present invention.

Referring to FIG. 4, a preferred embodiment of a coated preform 60 is shown in cross-section. The primary difference between the coated preform 60 and the coated preform 50 in FIG. 3 is the relative thickness of the two layers in the area of the end cap 42. In coated preform 50, the barrier layer 52 is generally thinner than the thickness of the initial preform throughout the entire body portion of the preform. In coated preform 60, however, the barrier coating layer 52 is thicker at 62 near the end cap 42 than it is at 64 in the wall portion 66, and conversely, the thickness of the inner polyester layer is greater at 68 in the wall portion 66 than it is at 70, in the region of the end cap 42. This preform design is especially useful when the barrier coating is applied to the initial preform in an overmolding process to make the coated preform, as described below, where it presents certain advantages including that relating to reducing molding cycle time. These advantages will be discussed in more detail below. The barrier coating layer 52 may be homogeneous or it may be comprised of a plurality of microlayers.

Figure 4A:
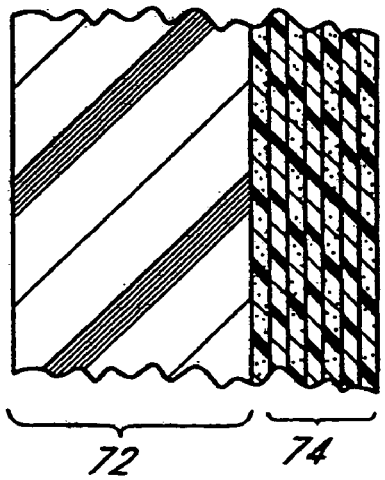
FIG. 4A is an enlargement of a section of the wall portion of a preform such as that made by a LIM-over-inject process. Not all preforms of the type in FIG. 4 made in accordance with an embodiment of the present invention will have this type of layer arrangement.

FIG. 4A is an enlargement of a wall section of the preform showing the makeup of the layers in a LIM-over-inject embodiment of preform. The LIM process will be discussed in more detail below. The layer 72 is the inner layer of the preform and 74 is the outer layer of the preform. The outer layer 74 comprises a plurality of microlayers of material as will be made when a LIM system is used. Not all preforms of FIG. 4 will be of this type.

Figure 5:
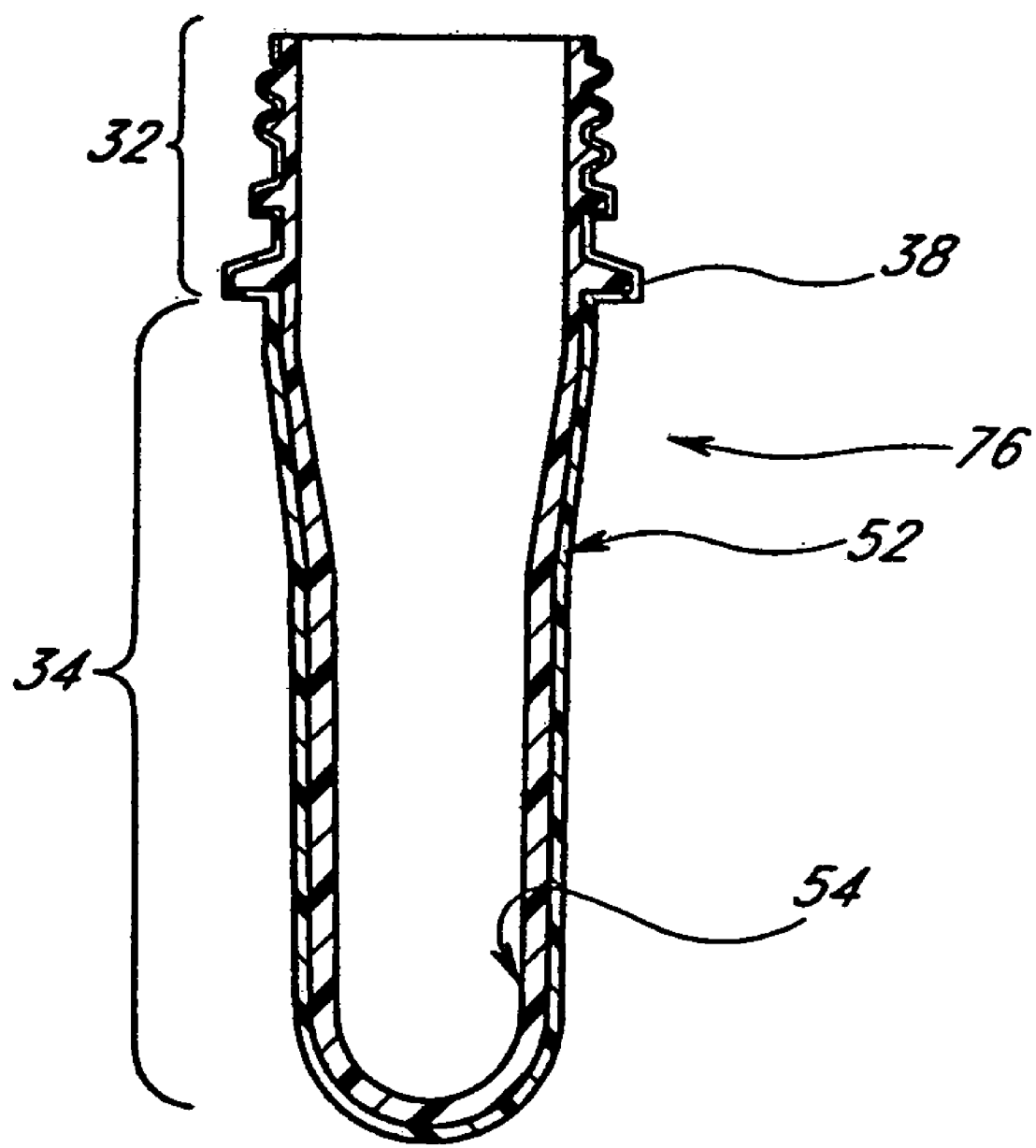
FIG. 5 is a cross-section of another embodiment of a barrier-coated preform of an embodiment of the present invention.

Referring to FIG. 5, another embodiment of a coated preform 76 is shown in cross-section. The primary difference between the coated preform 76 and the coated preforms 50 and 60 in FIGS. 3 and 4, respectively, is that the barrier coating layer 52 is disposed on the neck portion 32 as well as the body portion 34.

The barrier preforms and containers can have layers which have a wide variety of relative thicknesses. In view of the present disclosure, the thickness of a given layer and of the overall preform or container, whether at a given point or over the entire container, can be chosen to fit a coating process or a particular end use for the container. Furthermore, as discussed above in regard to the barrier coating layer in FIG. 3, the barrier coating layer in the preform and container embodiments disclosed herein may comprise a single material or several microlayers of two or more materials.

Figure 6:
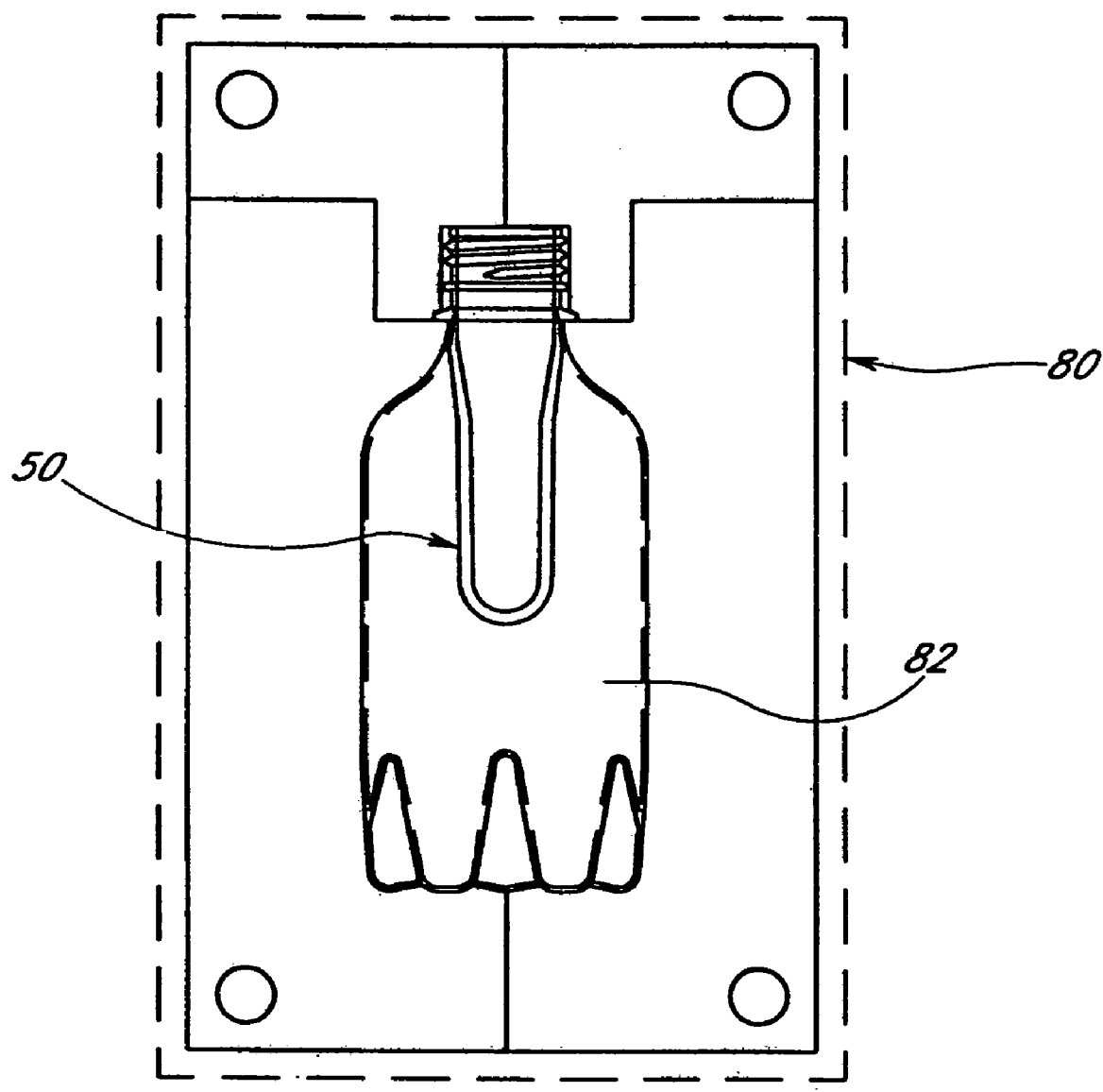
FIG. 6 is a cross-section of a preferred preform in the cavity of a blow-molding apparatus of a type that may be used to make a preferred barrier-coated container of an embodiment of the present invention.

After a barrier-coated preform, such as that depicted in FIG. 3, is prepared by a method and apparatus such as those discussed in detail below, it is subjected to a stretch blow-molding process. Referring to FIG. 6, in this process a barrier-coated preform 50 is placed in a mold 80 having a cavity corresponding to the desired container shape. The barrier-coated preform is then heated and expanded by stretching and by air forced into the interior of the preform 50 to fill the cavity within the mold 80, creating a barrier-coated container 82. The blow molding operation normally is restricted to the body portion 34 of the preform with the neck portion 32 including the threads, pilfer ring, and support ring retaining the original configuration as in the preform.

Figure 7:
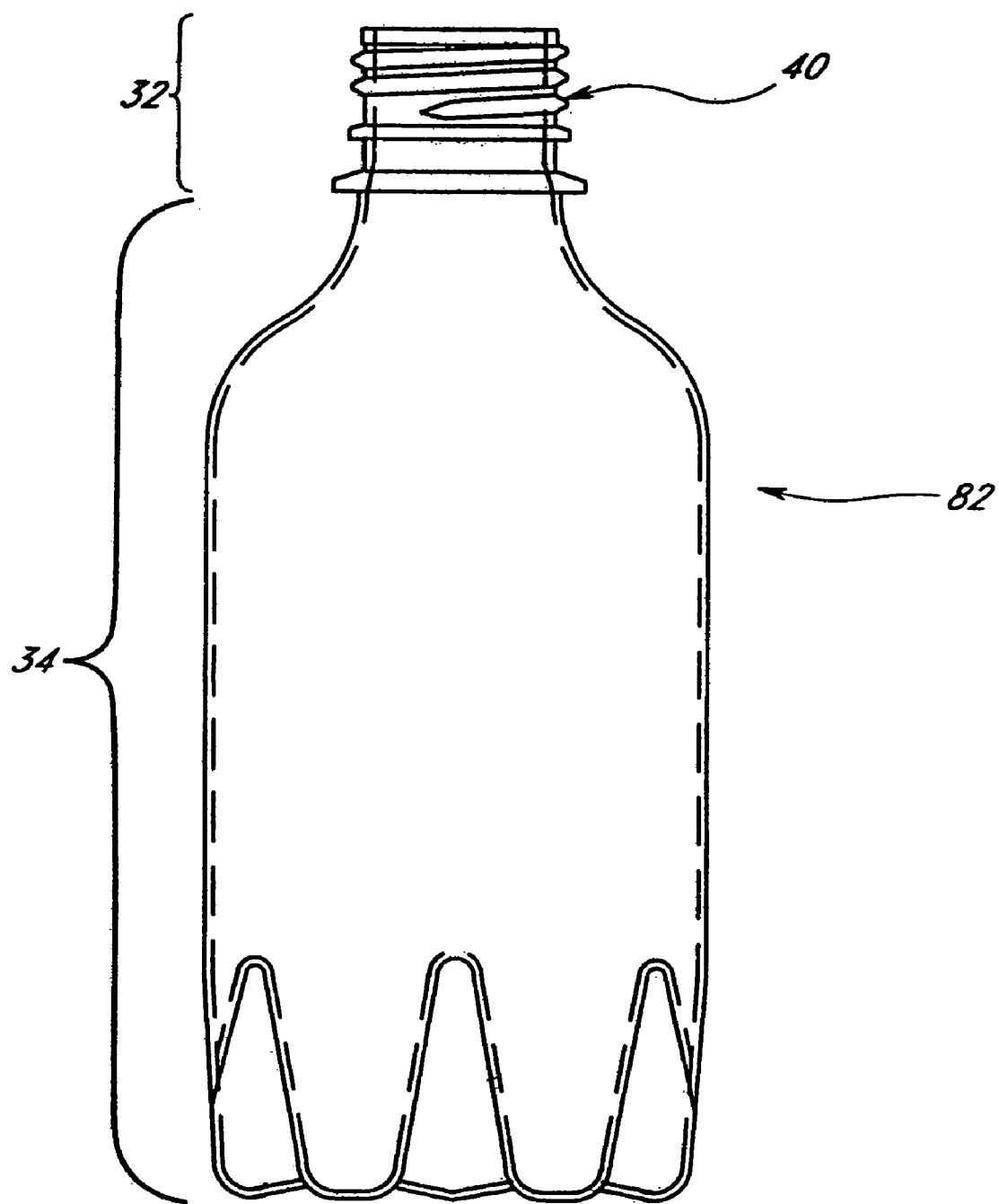
FIG. 7 is one preferred embodiment of barrier-coated container of the present invention.

Referring to FIG. 7, there is disclosed an embodiment of barrier coated container 82 in accordance with the present invention, such as that which might be made from blow molding the barrier coated preform 50 of FIG. 3. The container 82 has a neck portion 32 and a body portion 34 corresponding to the neck and body portions of the barrier-coated preform 50 of FIG. 3. The neck portion 32 is further characterized by the presence of the threads 40 which provide a way to fasten a cap onto the container.

Figure 8:
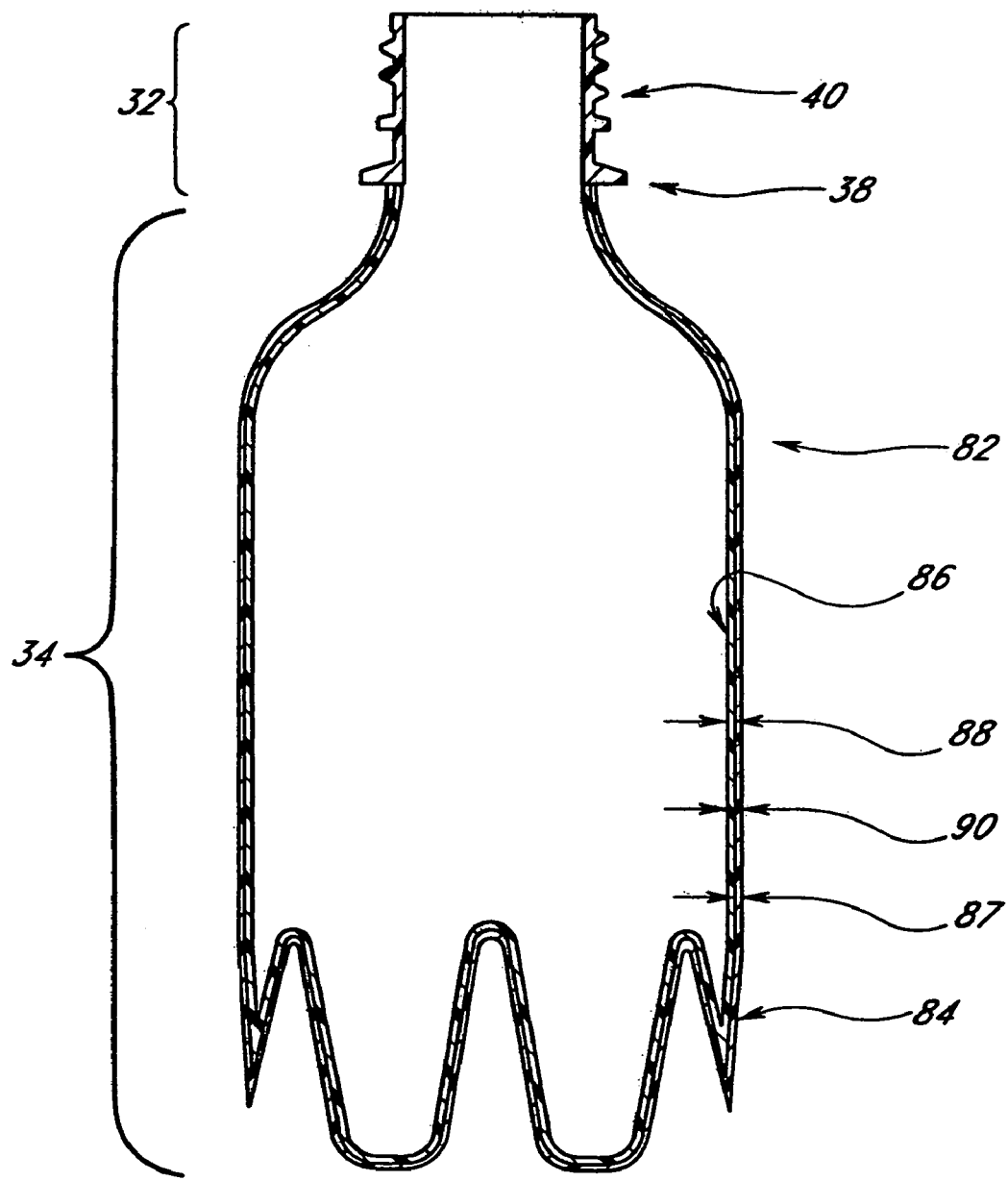
FIG. 8 is a cross-section of one preferred embodiment of a barrier-coated container having features in accordance with the present invention.

When the barrier-coated container 82 is viewed in cross-section, as in FIG. 8, the construction can be seen. The barrier coating 84 covers the exterior of the entire body portion 34 of the container 82, stopping just below the support ring 38. The interior surface 86 of the container, which is made of an FDA-approved material, preferably PET, remains uncoated so that only the interior surface 86 is in contact with beverages or foodstuffs. In one preferred embodiment that is used as a carbonated beverage container, the thickness 87 of the barrier coating is preferably 0.020-0.060 inch, more preferably 0.030-0.040 inch; the thickness 88 of the PET layer is preferably 0.080-0.160 inch, more preferably 0.100-0.140 inch; and the overall wall thickness 90 of the barrier-coated container 82 is preferably 0.140-0.180 inch, more preferably 0.150-0.170 inch. Preferably, on average, the overall wall thickness 90 of the container 82 derives the majority of its thickness from the inner PET layer.

Figure 9:
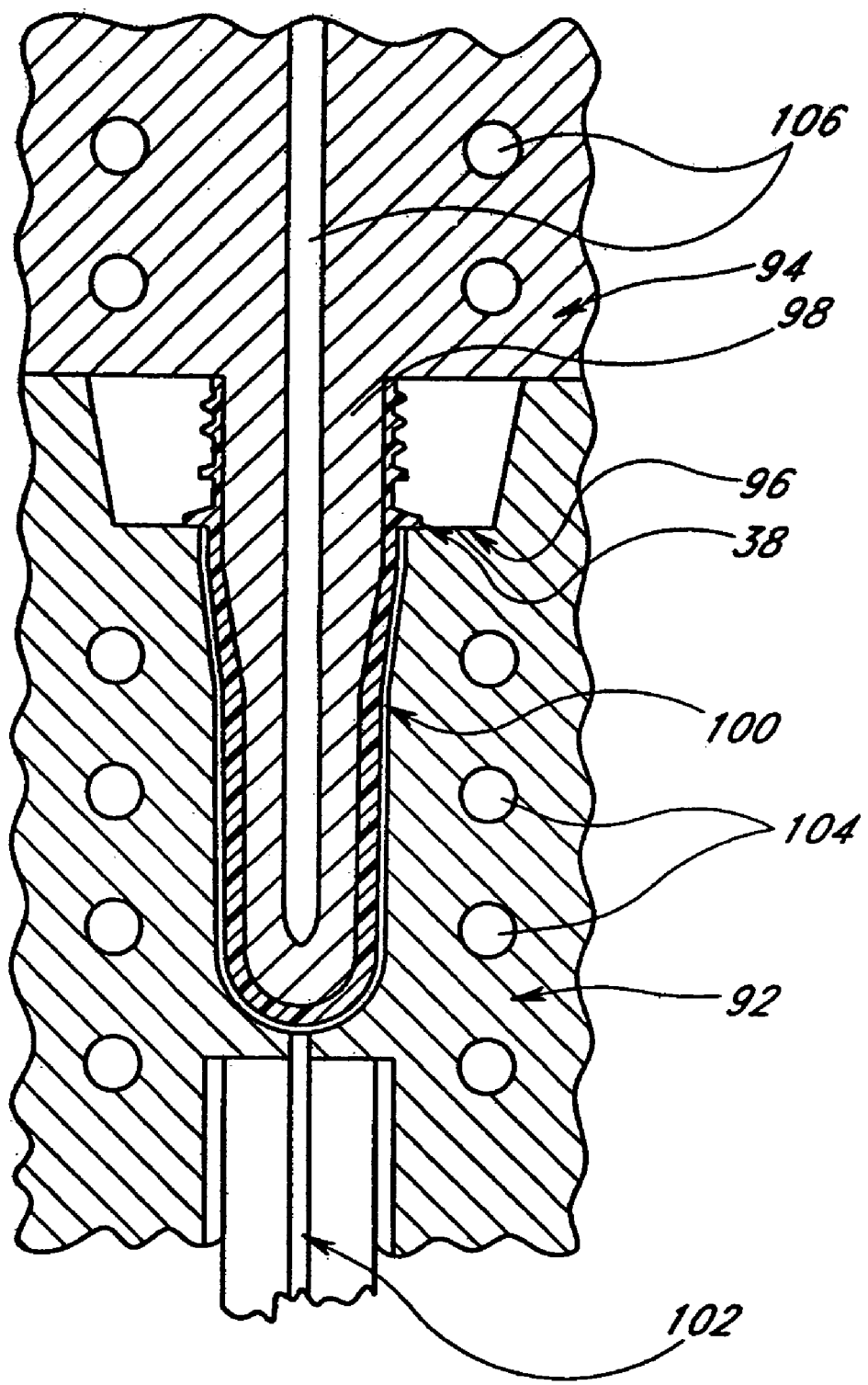
FIG. 9 is a cross-section of an injection mold of a type that may be used to make a preferred barrier-coated preform in accordance with the present invention.

FIG. 9 illustrates a preferred type of mold for use in methods which utilize overmolding. The mold comprises two halves, a cavity half 92 and a mandrel half 94. The cavity half 92 comprises a cavity in which an uncoated preform is placed. The preform is held in place between the mandrel half 94, which exerts pressure on the top of the preform and the ledge 96 of the cavity half 92 on which the support ring 38 rests. The neck portion 32 of the preform is thus sealed off from the body portion of the preform. Inside the preform is the mandrel 98. As the preform sits in the mold, the body portion of the preform is completely surrounded by a void space 100. The preform, thus positioned, acts as an interior die mandrel in the subsequent injection procedure, in which the melt of the overmolding material is injected through the gate 102 into the void space 100 to form the coating. The melt, as well as the uncoated preform, is cooled by fluid circulating within channels 104 and 106 in the two halves of the mold. Preferably the circulation in channels 104 is completely separate from the circulation in the channels 106.

Figure 10:
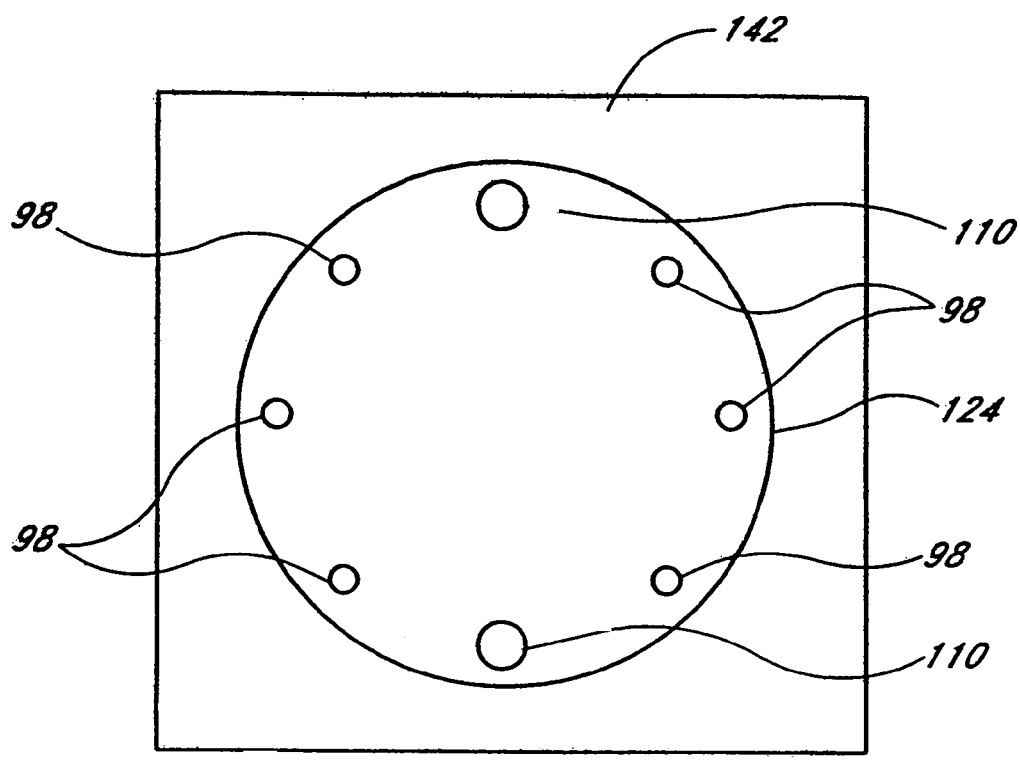
FIGS. 10 and 11 are two halves of a molding machine to make barrier-coated preforms.
Figure 11:
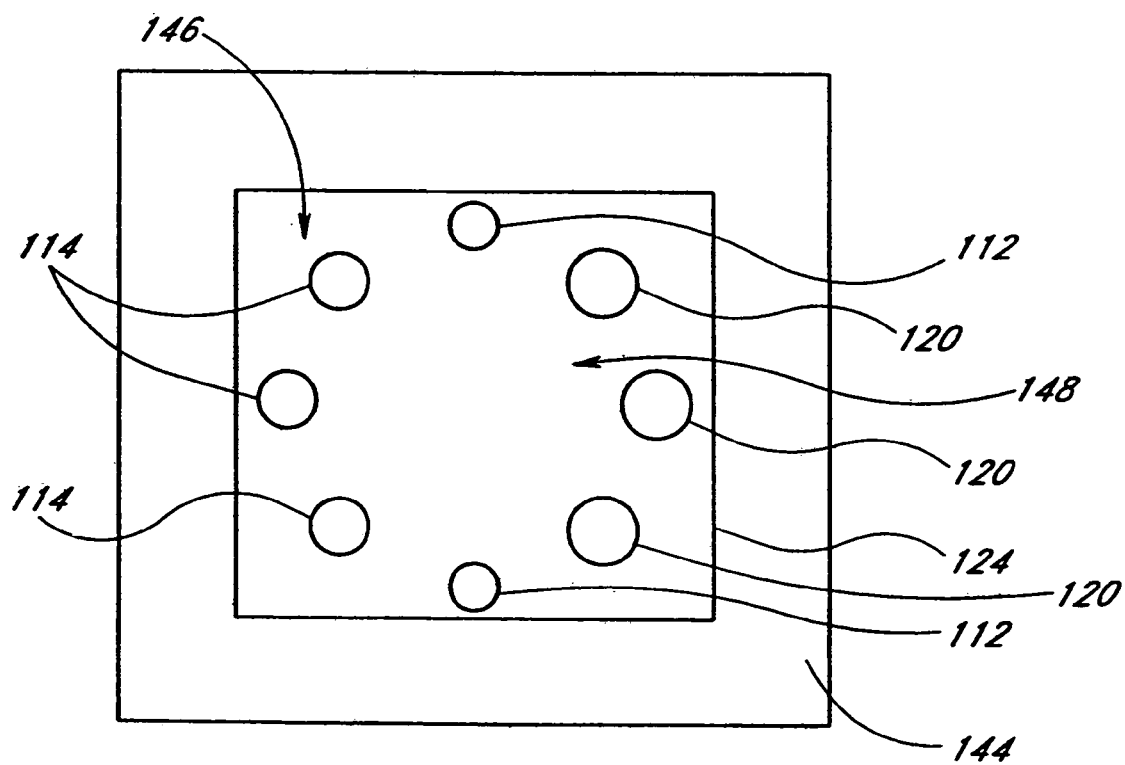

FIGS. 10 and 11 are a schematic of a portion of the preferred type of apparatus to make coated preforms in accordance with the present invention. The apparatus is an injection molding system designed to make one or more uncoated preforms and subsequently coat the newly-made preforms by over-injection of a barrier material. FIGS. 10 and 11 illustrate the two halves of the mold portion of the apparatus which will be in opposition in the molding machine. The alignment pegs 110 in FIG. 10 fit into their corresponding receptacles 112 in the other half of the mold.

The mold half depicted in FIG. 11 has several pairs of mold cavities, each cavity being similar to the mold cavity depicted in FIG. 9. The mold cavities are of two types: first injection preform molding cavities 114 and second injection preform coating cavities 120. The two types of cavities are equal in number and are preferably arranged so that all cavities of one type are on the same side of the injection block 124 as bisected by the line between the alignment peg receptacles 112. This way, every preform molding cavity 114 is 180° away from a preform coating cavity 120.

The mold half depicted in FIG. 10 has several mandrels 98, one for each mold cavity (114 and 120). When the two halves which are FIGS. 10 and 11 are put together, a mandrel 98 fits inside each cavity and serves as the mold for the interior of the preform for the preform molding cavities 114 and as a centering device for the uncoated preforms in preform coating cavities 120. The mandrels 98 are mounted on a turntable 130 which rotates 180° about its center so that a mandrel 98 originally aligned with a preform molding cavity 114 will, after rotation, be aligned with a preform coating cavity 120, and vice-versa. As described in greater detail below, this type of setup allows a preform to be molded and then coated in a two-step process using the same piece of equipment.

It should be noted that the drawings in FIGS. 10 and 11 are merely illustrative. For instance, the drawings depict an apparatus having three molding cavities 114 and three coating cavities 120 (a 3/3 cavity machine). However, the machines may have any number of cavities, as long as there are equal numbers of molding and coating cavities, for example 12/12, 24/24, 48/48 and the like. The cavities may be arranged in any suitable manner, as can be determined by one skilled in the art. These and other minor alterations are contemplated as part of this invention.

Figure 12:
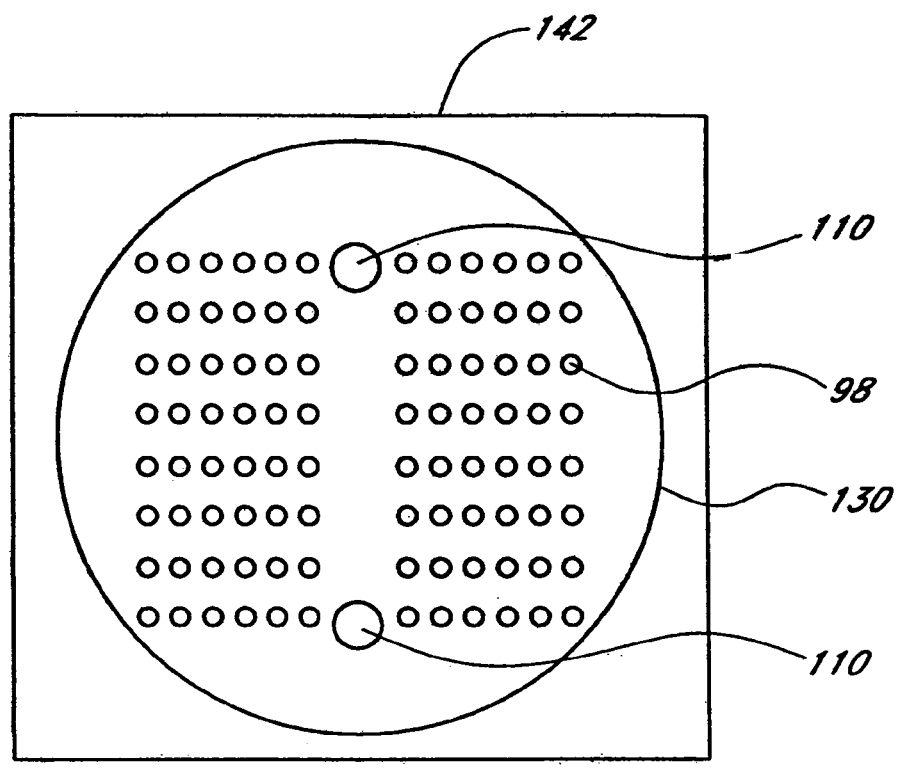
FIGS. 12 and 13 are two halves of a molding machine to make forty-eight two-layer preforms.
Figure 13:
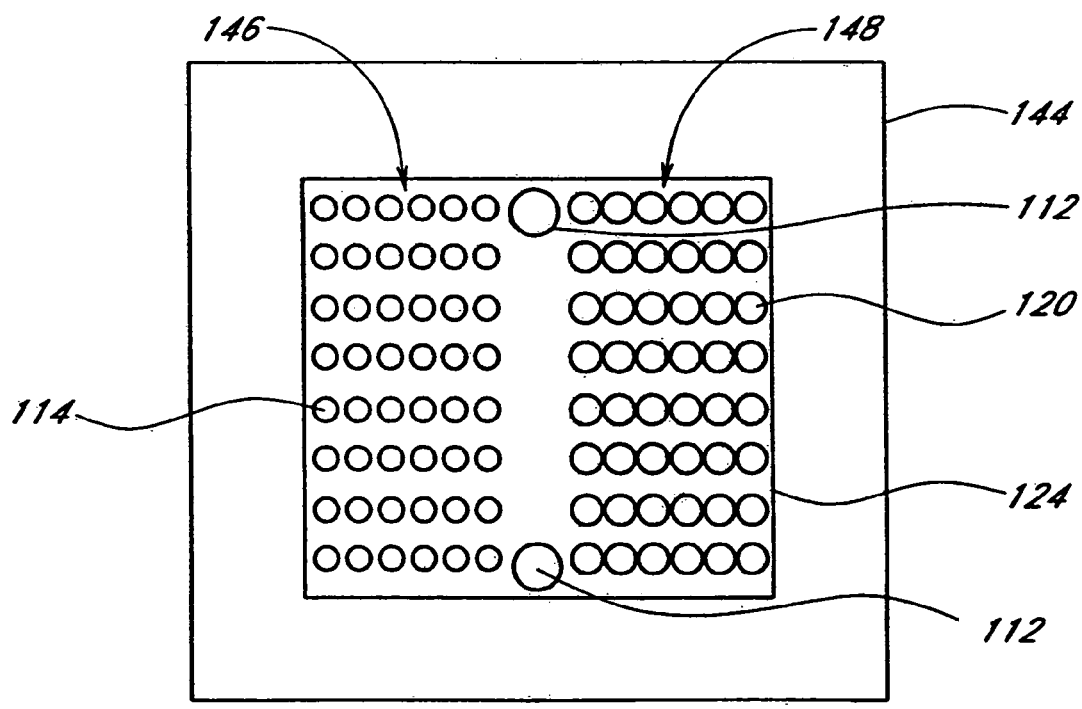

The two mold halves depicted in FIGS. 12 and 13 illustrate an embodiment of a mold of a 48/48 cavity machine as discussed for FIGS. 10 and 11.

Referring to FIG. 14 there is shown a perspective view of a mold of the type for an overmolding (inject-over-inject) process in which the mandrels 98 are partially located within the cavities 114 and 120. The arrow shows the movement of the movable mold half 142, on which the mandrels 98 lie, as the mold closes.

FIG. 15 shows a perspective view of a mold of the type used in an overmolding process, wherein the mandrels 98 are fully withdrawn from the cavities 114 and 120. The arrow indicates that the turntable 130 rotates 180° to move the mandrels 98 from one cavity to the next. On the stationary half 144, the cooling for the preform molding cavity 114 is separate from the cooling for the preform coating cavity 120. Both of these are separate from the cooling for the mandrels 98 in the movable half.

Figure 16:
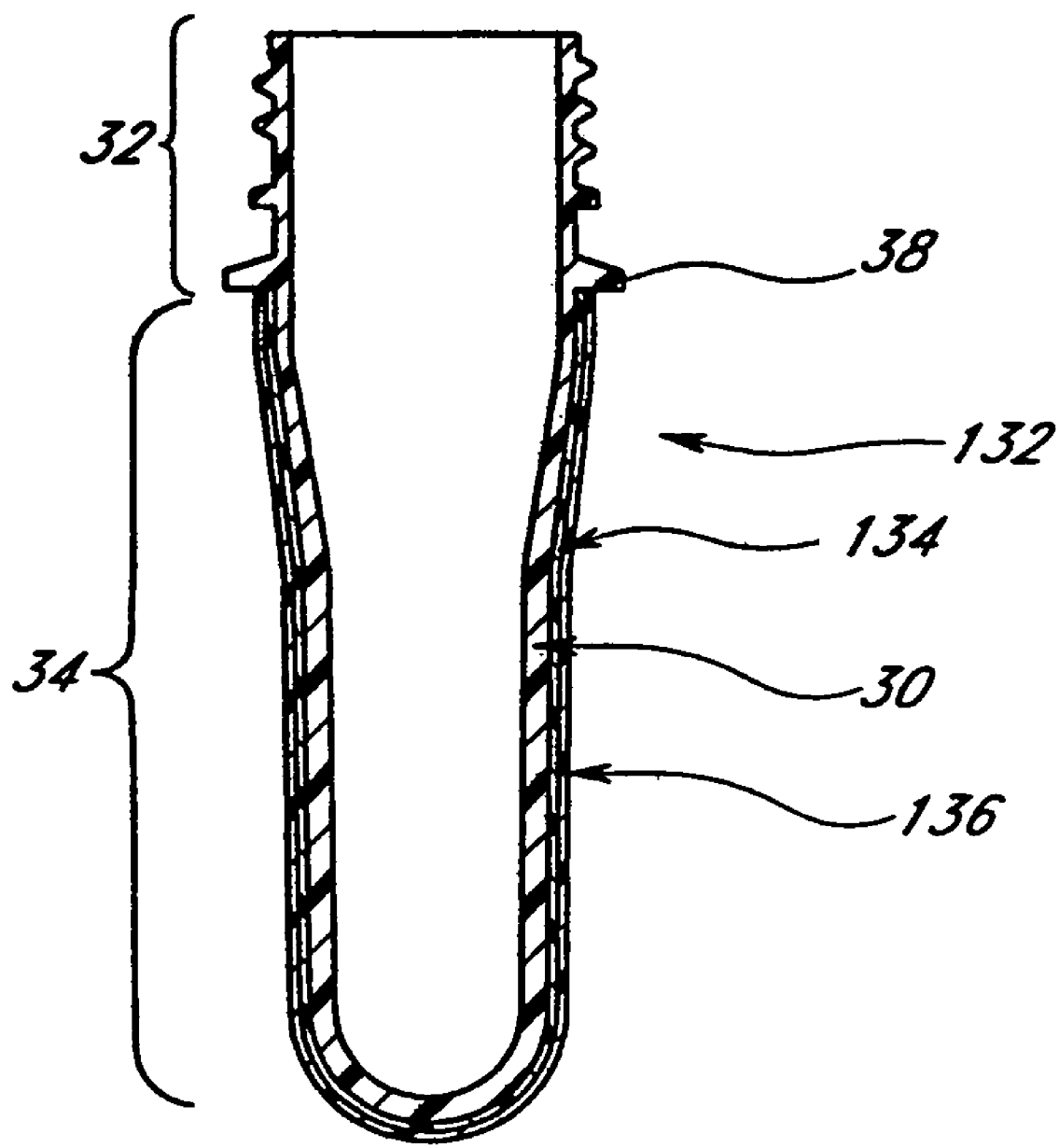
FIG. 16 is a three-layer embodiment of a preform.

Referring to FIG. 16 there is shown a preferred three-layer preform 132. This embodiment of coated preform is preferably made by placing two coating layers 134 and 136 on a preform 30 such as that shown in FIG. 1.

Figure 17:
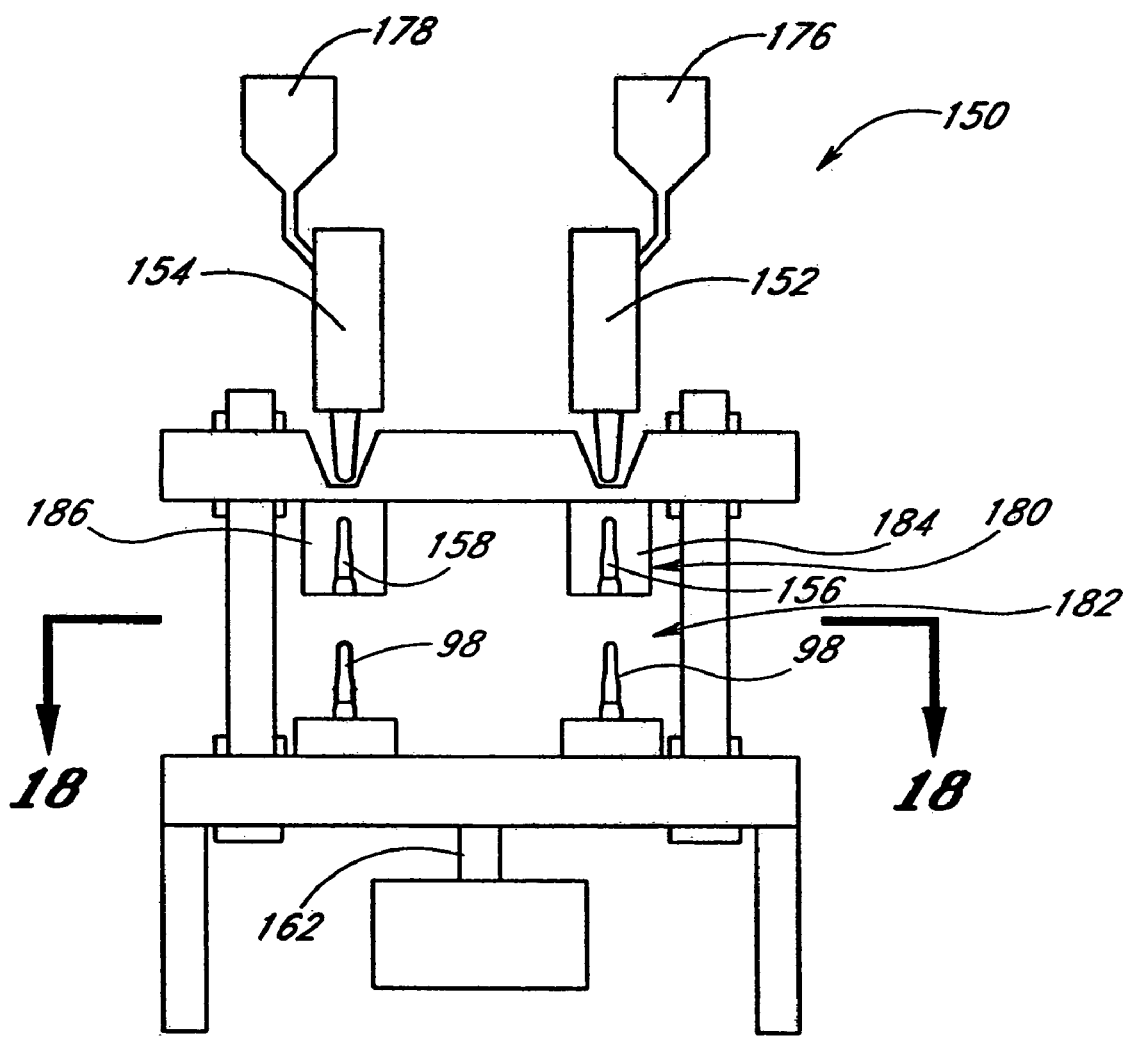
FIG. 17 is a front view of a preferred embodiment of an apparatus for making preforms in accordance with the present invention.
Figure 18:
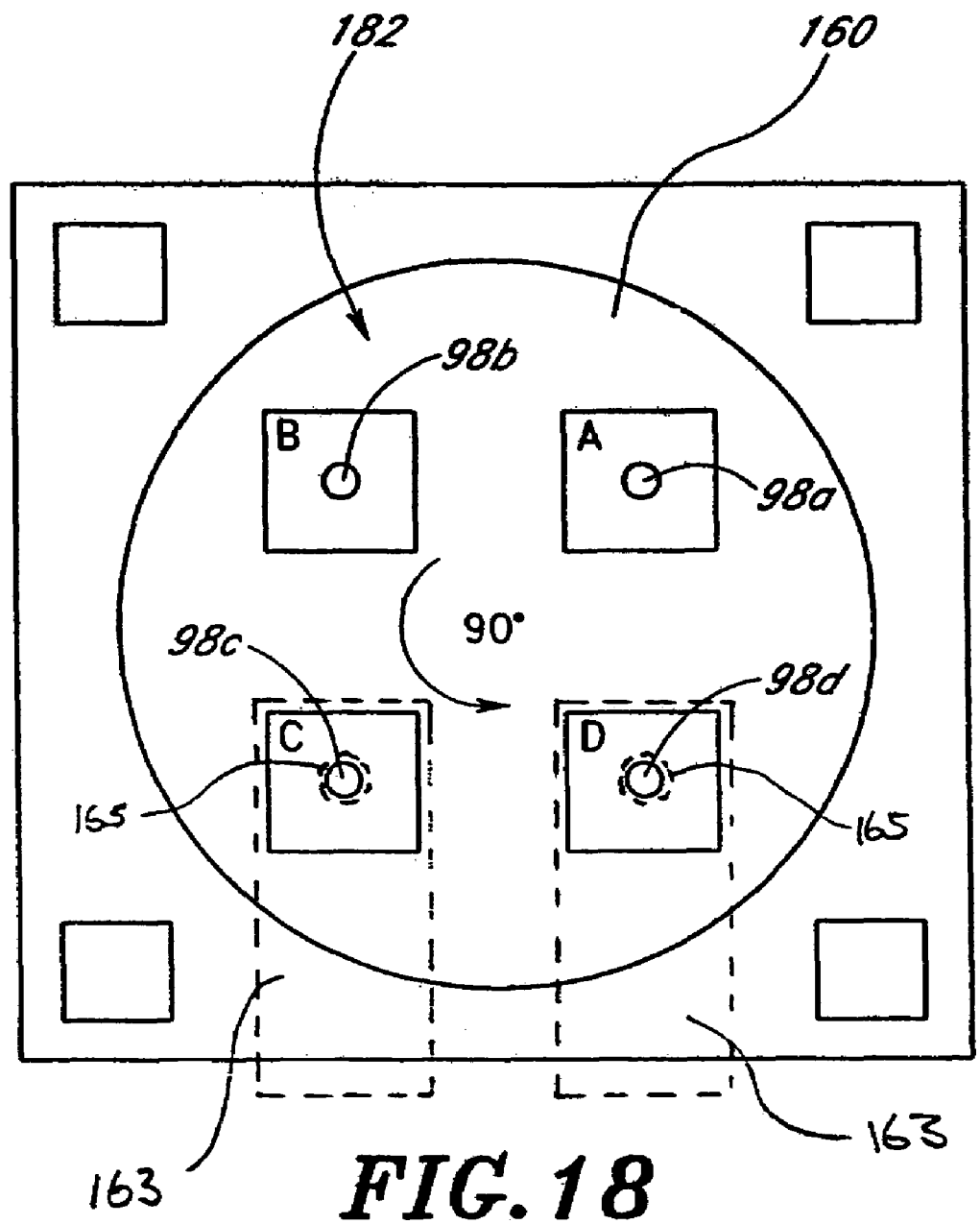
FIG. 18 is a cross-section of the apparatus of FIG. 17 taken along lines 18-18.
Figure 19:
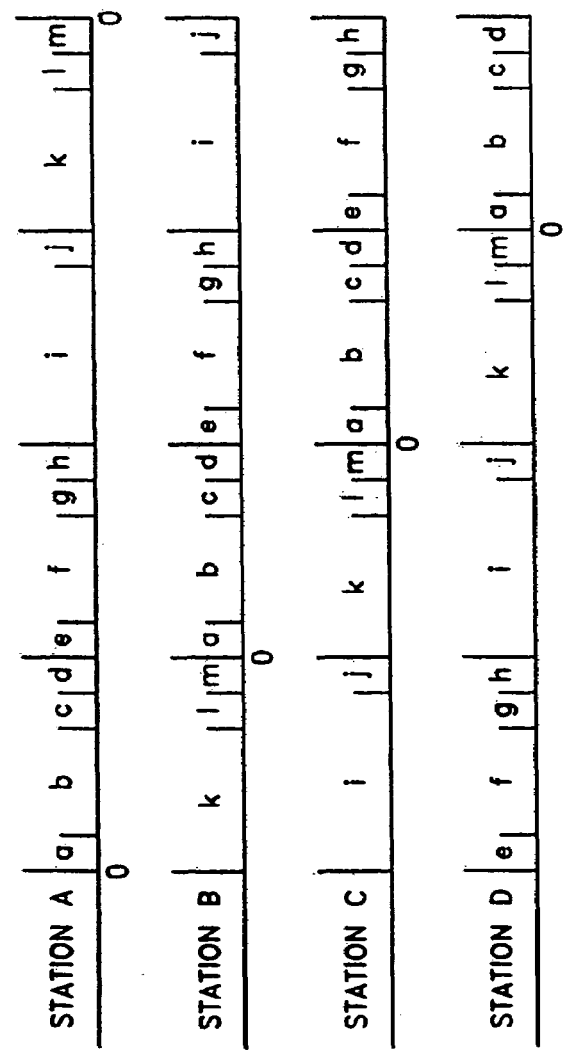
FIG. 19 is a chart showing the relative positions of stations of the apparatus of FIG. 17 during a production cycle.

FIG. 17 schematically shows another preferred apparatus 150 which may be used in an overmolding process. A first and second injector 152, 154 are disposed at the top of the machine 150 to provide a meltstream to first and second mold cavities 156, 158. FIG. 18 shows a rotating table 160 portion of the embodiment of FIG. 17. Four stations, labeled A through D, each have a mandrel 98A-D formed thereon and are disposed on the rotating table 160 roughly 90° in rotation apart. An actuator 162 such as a hydraulic cylinder lifts the table 160 so that mandrels 98 from two stations are simultaneously inserted into the first and second mold cavities 156, 158. The mandrels 98 on the other stations remain clear of any mold cavities. After the table 160 is lowered so that the mandrels 98 are removed from the cavities, it then rotates 90°. Thus, the mandrel 98 that was just removed from the first cavity 156 is placed in position to be inserted into the second mold cavity 158 and the mandrel just removed from the second cavity 158 is moved clear of the mold cavities. Each of the stations are cycled in turn through the first and second mold cavities 156, 158 by a series of sequential 90° rotations. FIG. 19 tracks the positions of the stations relative to each other during each step of a production cycle.

Figure 20:
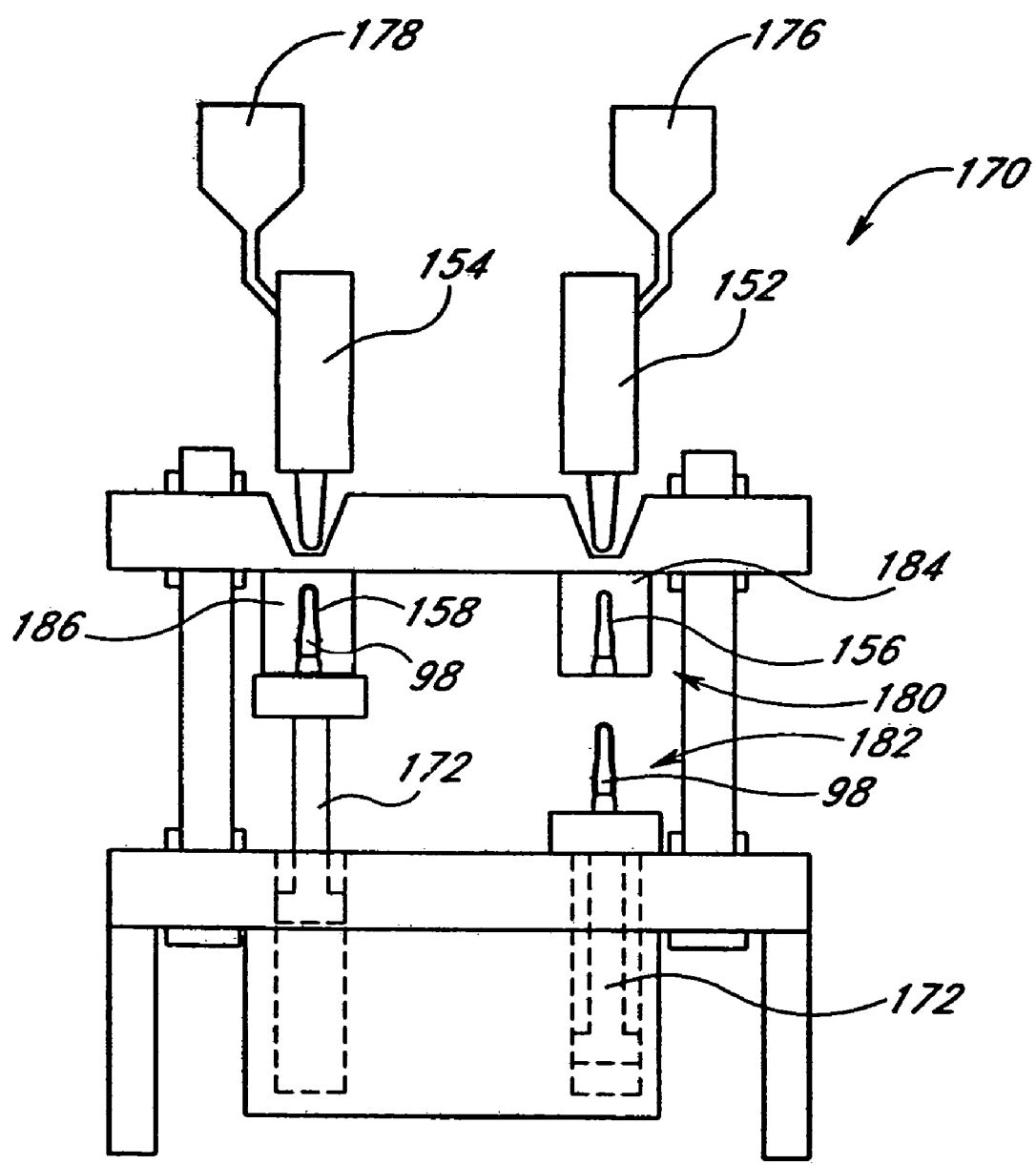
FIG. 20 is a front view of another preferred embodiment of an apparatus for making preforms in accordance with the present invention.
Figure 21:
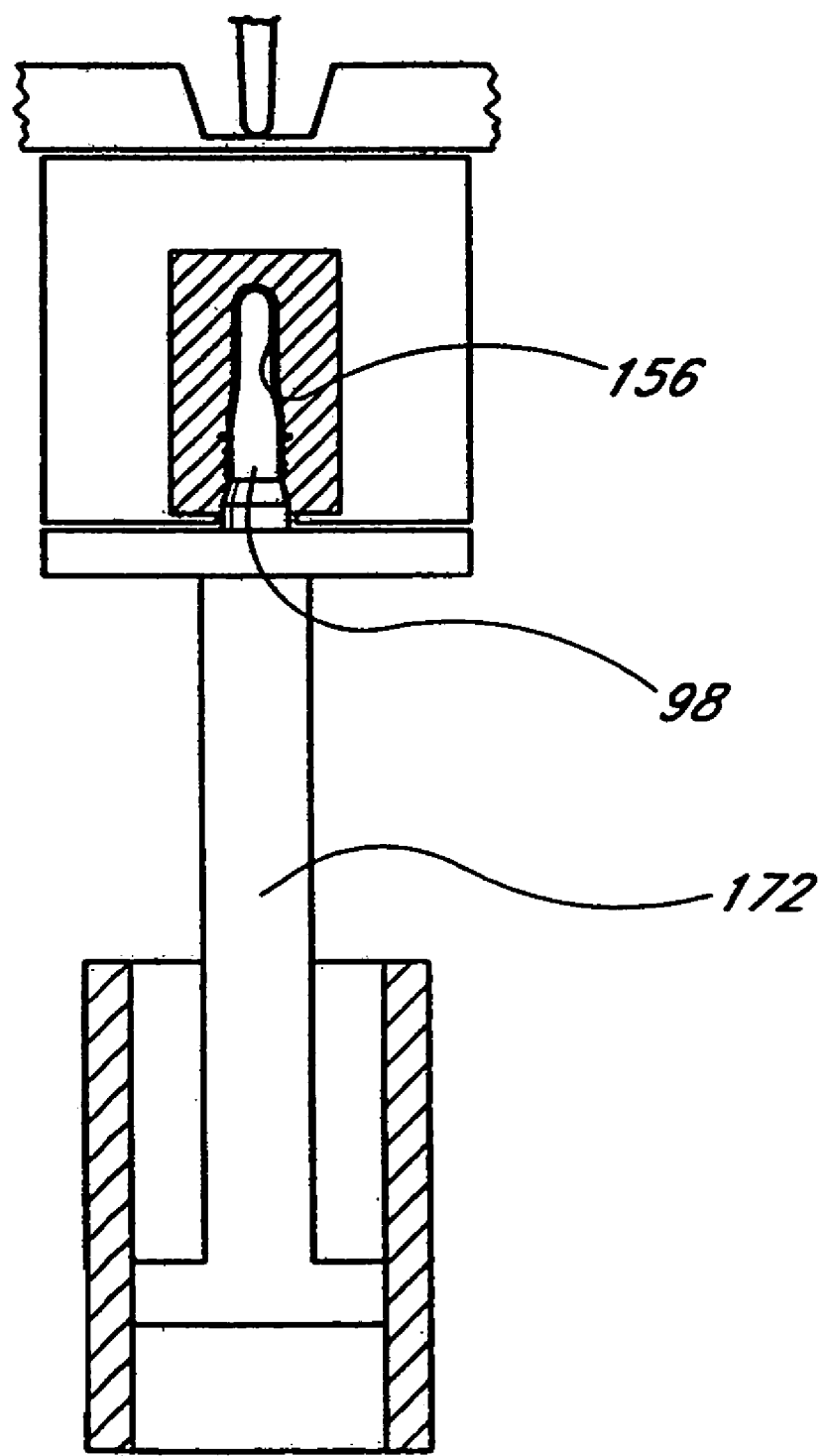
FIG. 21 is a close up view of a station and actuator of the apparatus of FIG. 20.

FIGS. 20 and 21 show another embodiment of an apparatus 170 of the present invention similar in many ways to that of FIGS. 17 and 18. However, in this embodiment, instead of the entire table 160 being lifted by a hydraulic member, each station of the turntable 160 is individually controlled by an actuator 172, and independently moved into and out of engagement with a respective mold cavity. This arrangement allows for increased flexibility of the apparatus 170. For example, FIG. 20 shows that a mandrel 98 may be held within the second cavity 158 after a mandrel 98 in the first cavity 156 is removed therefrom. Thus, hold time between mold cavities can be independently optimized.

Figure 22:
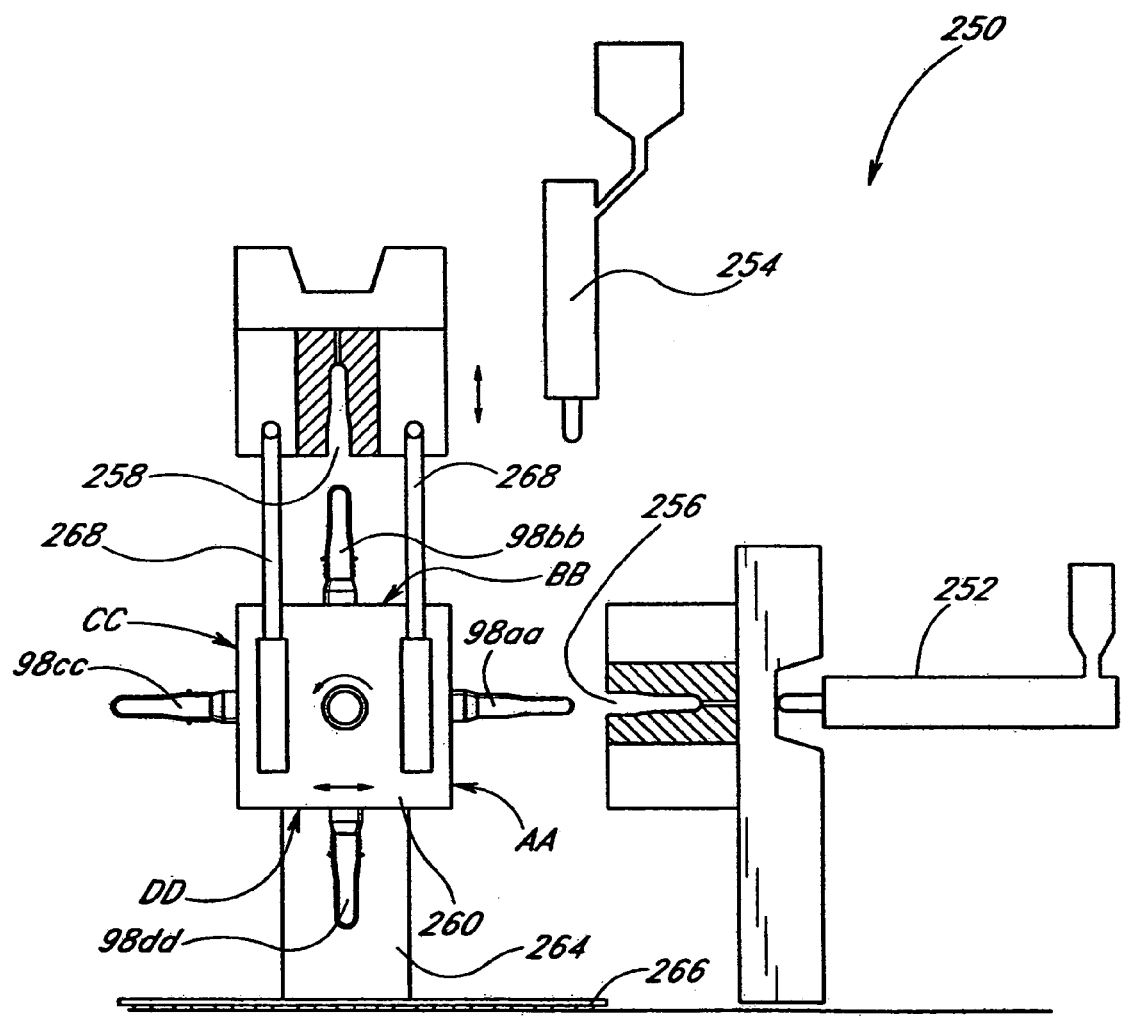
FIG. 22 is a front view of another preferred embodiment of an apparatus for making preforms in accordance with the present invention.
Figure 23:
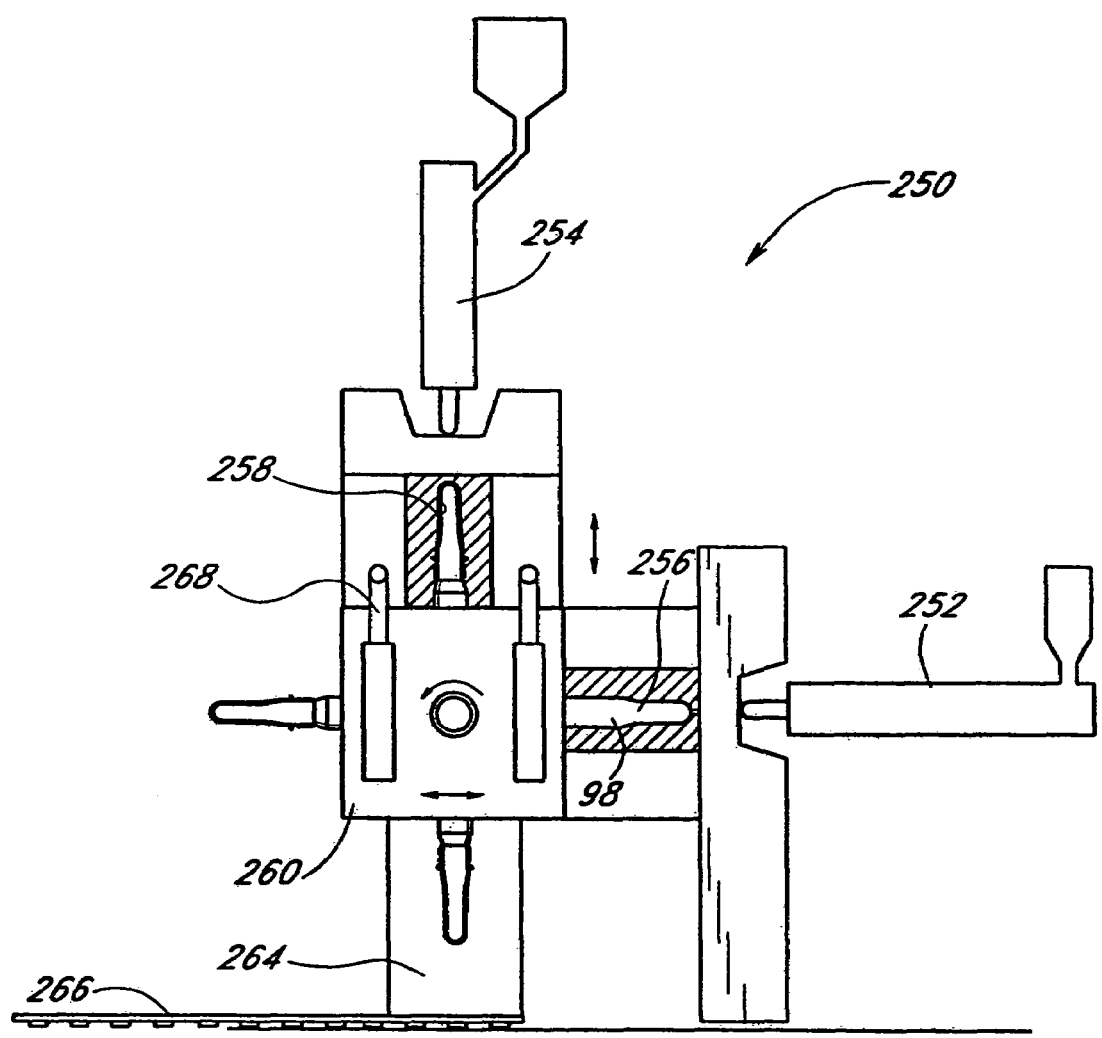
FIG. 23 is a front view of the apparatus of FIG. 22 in a closed position.

With next reference to FIGS. 22-23, a schematic view of another preferred apparatus 250 which may be used to overmold multilayer preforms is shown. In this embodiment, a rotating turntable 260 has a station (AA-DD) formed on each of four sides. Mold mandrels 98 or cores are disposed on each of the stations as in previous embodiments. First and second mold cavities 256, 258 are in communication with corresponding first and second injection machines 252, 254 which supply melt streams of PET and barrier material, respectively. The first mold cavity 256 is connected to the first injection machine 252 and remains stationary; the second injection machine 254 is vertically oriented overhead and also remains stationary. The turntable 260 is supported by a base member 264 which is horizontally movable upon ways 266 which support the base member 264. The second mold cavity 258 is connected to the turntable 260 by actuators 268 and also moves horizontally with the turntable 260. The actuators 268 pull the second mold cavity 258 into engagement with a mandrel 98B disposed on the turntable 268 in order to close the mold. After the second cavity 258 engages the corresponding mandrel, the turntable 260 next moves horizontally to engage a mandrel with the first mold cavity 256. With both mold cavities engaged with mandrels, the mold is now completely closed, as shown in FIG. 23.

Also, the second injection machine 254 is placed in communication with the second mold cavity 258 so that the second injection machine 254 can provide a melt stream of barrier material thereto.

Figure 24:
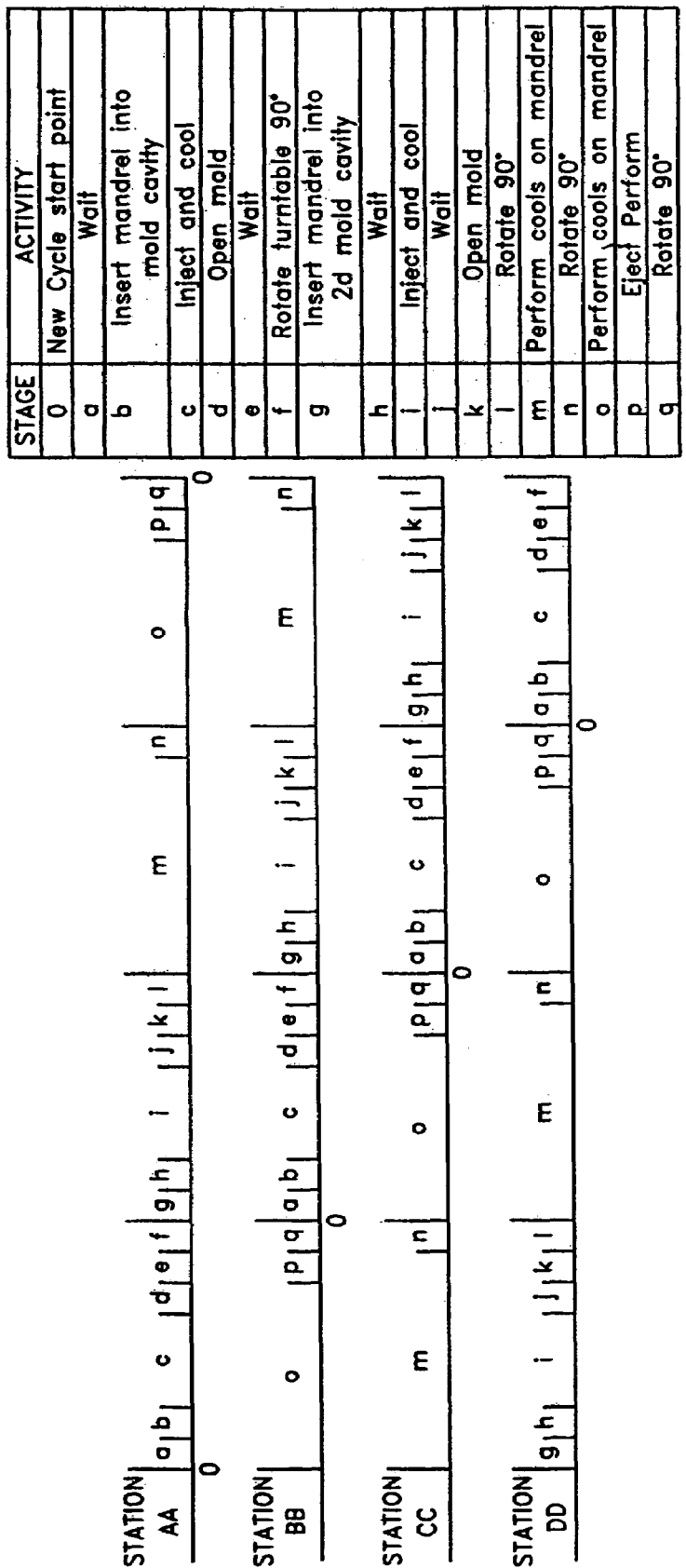
FIG. 24 is a chart showing the relative positions of stations of the apparatus of FIG. 22 during a production cycle.

When injection is complete, the mold is opened. This is accomplished by the turntable 260 first moving horizontally to disengage the mandrel from the first cavity 256, then raising the second mold out of engagement with the turntable 260. The turntable 260 then rotates 90° and closure of the mold and injection of material is repeated. Injected preforms disposed on the mandrels 98 not engaged with mold cavities cool upon the associated mandrel during the rest of the cycle. The preforms are ejected before the associated mandrel is again brought into engagement with the first mold cavity 256. FIG. 24 tracks the positions of the stations relative to each other during each step of a production cycle.

Figure 25:
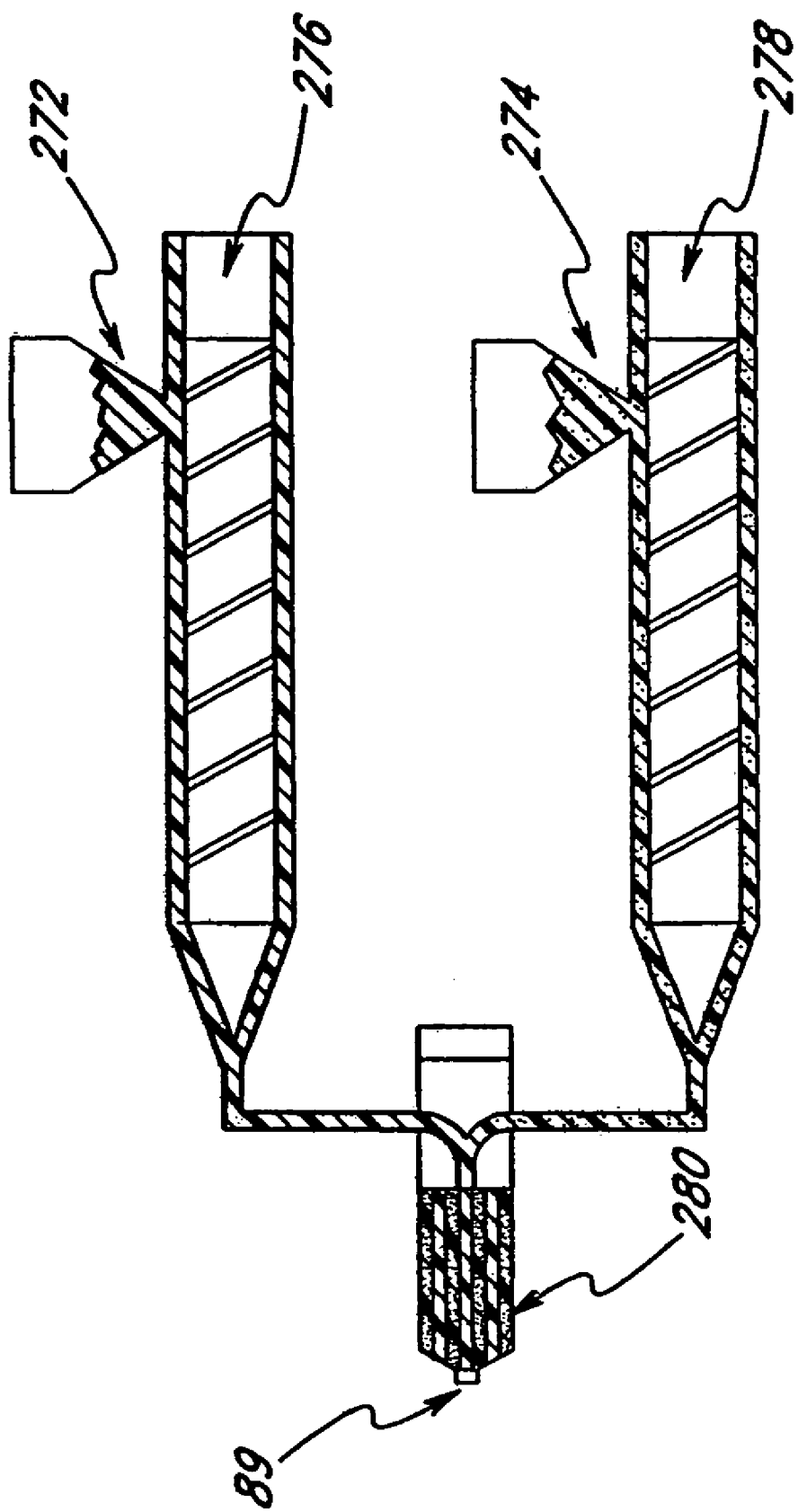
FIG. 25 is a schematic of a lamellar injection molding (LIM) system.

Referring to FIG. 25, there is shown a schematic of an apparatus which may be used to produce a meltstream comprised of numerous microlayers or lamellae in a lamellar injection molding (LIM) process as described in further detail below.

Figure 26:
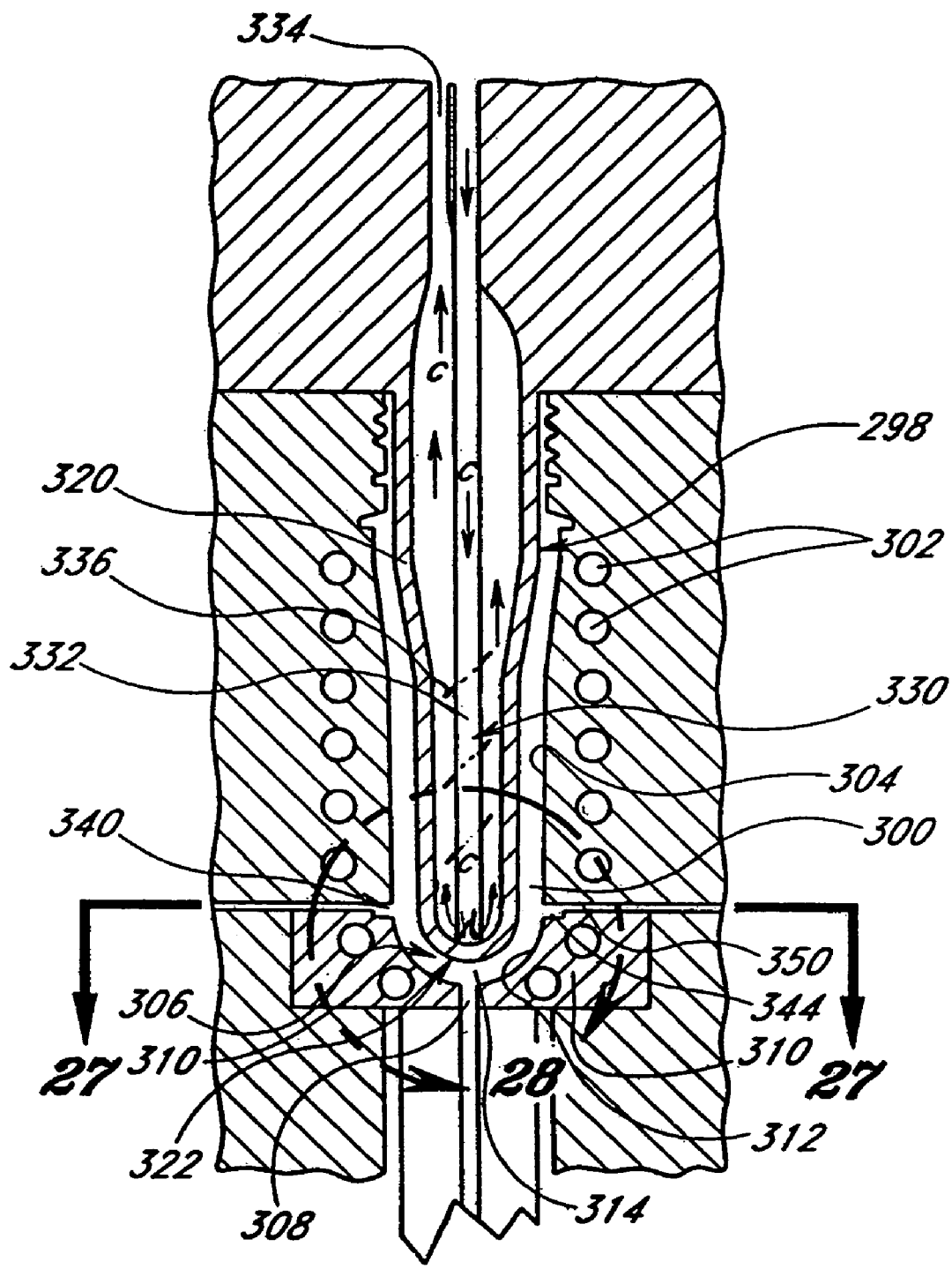
FIG. 26 is a cross-section of an injection mold of a type that may be used to make a preferred preform of the present invention.

With next reference to FIG. 26, a preferred embodiment of a mold mandrel 298 and associated cavity 300 are shown. Cooling tubes 302 are formed in a spiral fashion just below the surface 304 of the mold cavity 300. A gate area 308 of the cavity 300 is defined near a gate 308 and an insert 310 of a material with especially high heat transfer properties is disposed in the cavity at the gate area 306. Thus, the injected preform's gate area/base end 314 is cooled especially quickly.

The mandrel 298 is hollow and has a wall 320 of generally uniform thickness. A bubbler cooling arrangement 330 is disposed within the hollow mandrel 298 and comprises a core tube 332 located centrally within the mandrel 298 which delivers chilled coolant C directly to a base end 322 of the mandrel 298. Coolant C works its way up the mandrel from the base end 322 and exits through an output line 334. The core tube is held in place by ribs 336 extending between the tube and the mandrel wall 320.

Figure 27:
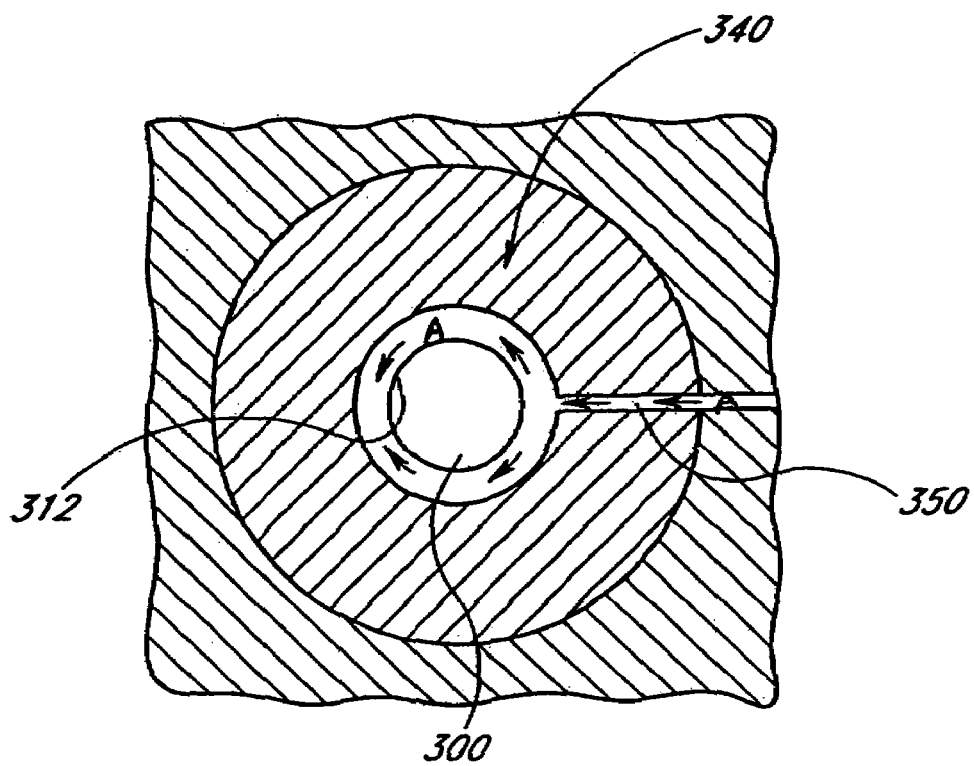
FIG. 27 is a cross-section of the mold of FIG. 26 taken along lines 27-27.
Figure 28:
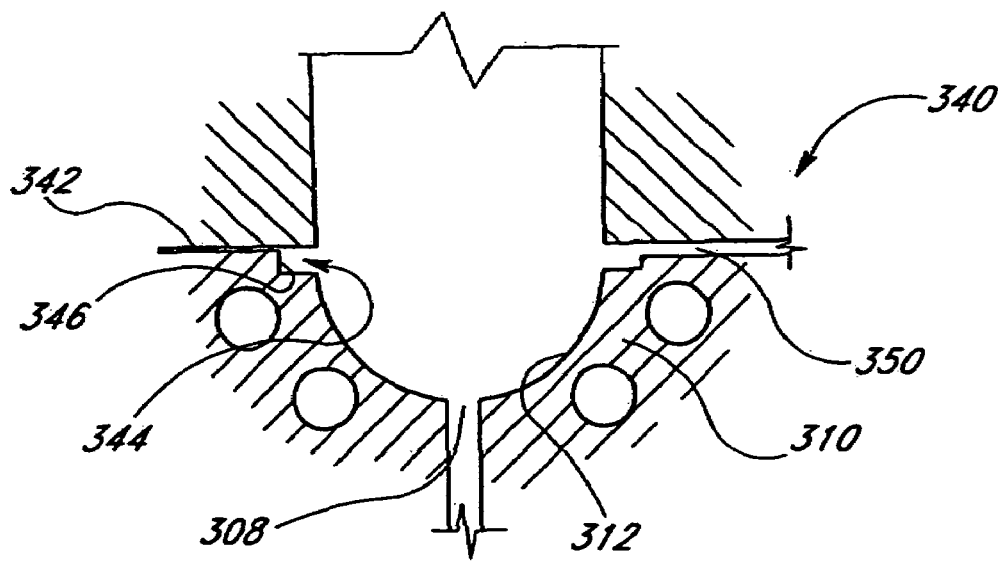
FIG. 28 is a cutaway close up view of the area of FIG. 26 defined by line 28.

Referring also to FIGS. 27 and 28, an air insertion system 340 is shown formed at a joint 342 between members of the mold cavity 300. A notch 344 is formed circumferentially around the cavity 300. The notch 344 is sufficiently small that substantially no molten plastic will enter during melt injection. An air line 350 connects the notch 344 to a source of air pressure and a valve regulates the supply of air to the notch 344. During melt injection, the valve is closed. When injection is complete, the valve is opened and pressurized air A is supplied to the notch 344 in order to defeat a vacuum that may form between an injected preform and the cavity wall 304.

The preferred method and apparatus for making barrier coated preforms is discussed in more detail below. Because the methods and apparatus are especially preferred for use in forming barrier coated bottles comprising certain preferred materials, the physical characteristics, identification, preparation and enhancement of the preferred materials is discussed prior to the preferred methods and apparatus for working with the materials.

C. Physical Characteristics of Preferred Barrier Materials

Preferred barrier materials in accordance with the present invention preferably exhibit several physical characteristics which allow for the barrier coated bottles and articles of the present invention to be able to withstand processing and physical stresses in a manner similar or superior to that of uncoated PET articles, in addition to producing articles which are cosmetically appealing and have excellent barrier properties.

Adhesion is the union or sticking together of two surfaces. The actual interfacial adhesion is a phenomenon which occurs at the microscopic level. It is based upon molecular interactions and depends upon chemical bonding, van der Waals forces and other intermolecular attractive forces at the molecular level.

Good adhesion between the barrier layer and the PET layer is especially important when the article is a barrier bottle made by blow-molding a preform. If the materials adhere well, then they will act as one unit when they are subjected to a blow molding process and as they are subjected to stresses when existing in the form of a container. Where the adhesion is poor, delamination results either over time or under physical stress such as squeezing the container or the container jostling during shipment. Delamination is not only unattractive from a commercial standpoint, it may be evidence of a lack of structural integrity of the container. Furthermore, good adhesion means that the layers will stay in close contact when the container is expanded during the molding process and will move as one unit. When the two materials act in such a manner, it is less likely that there will be voids in the coating, thus allowing a thinner coating to be applied. The barrier materials preferably adhere sufficiently to PET such that the barrier layer cannot be easily pulled apart from the PET layer at 22° C.

Thus, due in part to the direct adhesion of the barrier layer to the PET, the present invention differs from that disclosed by Farha in U.S. Pat. No. 5,472,753. In Farha, there is not disclosed, nor is the suggestion made, that the phenoxy-type thermoplastic can or should be bound directly to the PET without being blended with the copolyester or using the copolyester as a tie layer or that a copolyester itself could be used as a barrier material.

The glass transition temperature (Tg) is defined as the temperature at which a non-crystallizable polymer undergoes the transformation from a soft rubber state to a hard elastic polymer glass. In a range of temperatures above its Tg, a material will become soft enough to allow it to flow readily when subjected to an external force or pressure, yet not so soft that its viscosity is so low that it acts more like a liquid than a pliable solid. The temperature range above Tg is the preferred temperature range for performing a blow-molding process, as the material is soft enough to flow under the force of the air blown into the preform to fit the mold but not so soft that it breaks up or becomes uneven in texture. Thus, when materials have similar glass transition temperatures, they will have similar preferred blowing temperature ranges, allowing the materials to be processed together without compromising the performance of either material.

In the blow-molding process to produce bottle from a preform, as is known in the art, the preform is heated to a temperature slightly above the Tg of the preform material so that when air is forced into the preform's interior, it will be able to flow to fill the mold in which it is placed. If one does not sufficiently heat the preform and uses a temperature below the Tg, the preform material will be too hard to flow properly, and would likely crack, craze, or not expand to fill the mold. Conversely, if one heats the preform to a temperature well above the Tg, the material would likely become so soft that it would not be able to hold its shape and would process improperly.

If a barrier coating material has a Tg similar to that of PET, it will have a blowing temperature range similar to PET. Thus, if a PET preform is coated with such a barrier material, a blowing temperature can be chosen that allows both materials to be processed within their preferred blowing temperature ranges. If the barrier coating were to have a Tg dissimilar to that of PET, it would be difficult, if not impossible, to choose a blowing temperature suitable for both materials. When the barrier coating materials have a Tg similar to PET, the coated preform behaves during blow molding as if it were made of one material, expanding smoothly and creating a cosmetically appealing container with an even thickness and uniform coating of the barrier material where it is applied.

The glass transition temperature of PET occurs in a window of about 75-85° C., depending upon how the PET has been processed previously. The Tg for preferred barrier materials of embodiments of the present invention is preferably 55 to 140° C., more preferably 90 to 110° C.

Another factor which has an impact on the performance of barrier preforms during blow molding is the state of the material. The preferred barrier materials of preferred embodiments of the present invention are amorphous rather than crystalline. This is because materials in an amorphous state are easier to form into bottles and containers by use of a blow molding process than materials in a crystalline state. PET can exist in both crystalline and amorphous forms. However, in embodiments of the present invention it is highly preferred that the crystallinity of the PET be minimized and the amorphous state maximized in order to create a semi-crystalline state which, among other things, aids interlayer adhesion and in the blow molding process. A PET article formed from a melt of PET, as in injection molding, can be guided into a semi-crystalline form by cooling the melt at a high rate, fast enough to quench the crystallization process, freezing the PET in a mostly amorphous state. Additionally, use of "high IPA PET" as described earlier herein will allow easier quenching of the crystallization process because it crystallizes at a lower rate than homopolymer PET.

Intrinsic viscosity and melt index are two properties which are related to a polymer's molecular weight. These properties give an indication as to how materials will act under various processing conditions, such as injection molding and blow molding processes.

Barrier materials for use in the articles and methods of the present invention have an intrinsic viscosity of preferably 0.70-0.90 dl/g, more preferably 0.74-0.87 dl/g, most preferably 0.84-0.85 dl/g and a melt index of preferably 5-30, more preferably 7-12, most preferably 10.

Barrier materials of embodiments of the present invention preferably have tensile strength and creep resistance similar to PET. Similarity in these physical properties allows the barrier coating to act as more than simply a gas barrier. A barrier coating having physical properties similar to PET acts as a structural component of the container, allowing the barrier material to displace some of the polyethylene terephthalate in the container without sacrificing container performance. Displacement of PET allows for the resulting barrier-coated containers to have physical performance and characteristics similar to their uncoated counterparts without a substantial change in weight or size. It also allows for any additional cost from adding the barrier material to be defrayed by a reduction in the cost per container attributed to PET.

Similarity in tensile strength between PET and the barrier coating materials helps the container to have structural integrity. This is especially important if some PET is displaced by barrier material. Barrier-coated bottles and containers having features in accordance with the present invention are able to withstand the same physical forces as an uncoated container, allowing, for example, barrier-coated containers to be shipped and handled in the customary manner of handling uncoated PET containers. If the barrier-coating material were to have a tensile strength substantially lower than that of PET, a container having some PET displaced by barrier material would likely not be able to withstand the same forces as an uncoated container.

Similarity in creep resistance between PET and the barrier coating materials helps the container to retain its shape. Creep resistance relates to the ability of a material to resist changing its shape in response to an applied force. For example, a bottle which holds a carbonated liquid needs to be able to resist the pressure of dissolved gas pushing outward and retain its original shape. If the barrier coating material were to have a substantially lower resistance to creep than PET in a container, the resulting container would be more likely to deform over time, reducing the shelf-life of the product.

For applications where optical clarity is of importance, preferred barrier materials have an index of refraction similar to that of PET. When the refractive index of the PET and the barrier coating material are similar, the preforms and, perhaps more importantly, the containers blown therefrom are optically clear and, thus, cosmetically appealing for use as a beverage container where clarity of the bottle is frequently desired. If, however, the two materials have substantially dissimilar refractive indices when they are placed in contact with each other, the resulting combination will have visual distortions and may be cloudy or opaque, depending upon the degree of difference in the refractive indices of the materials.

Polyethylene terephthalate has an index of refraction for visible light within the range of about 1.40 to 1.75, depending upon its physical configuration. When made into preforms, the refractive index is preferably within the range of about 1.55 to 1.75, and more preferably in the range of 1.55-1.65. After the preform is made into a bottle, the wall of the final product, may be characterized as a biaxially-oriented film since it is subject to both hoop and axial stresses in the blow molding operation. Blow molded PET generally exhibits a refractive index within the range of about 1.40 to 1.75, usually about 1.55 to 1.75, depending upon the stretch ratio involved in the blow molding operation. For relatively low stretch ratios of about 6:1, the refractive index will be near the lower end, whereas for high stretch ratios, about 10:1, the refractive index will be near the upper end of the aforementioned range. It will be recognized that the stretch ratios referred to herein are biaxial stretch ratios resulting from and include the product of the hoop stretch ratio and the axial stretch ratio. For example, in a blow molding operation in which the final preform is enlarged by a factor of 2.5 in the axial direction and a factor of 3.5 diametrically, the stretch ratio will be about 8.75 (2.5×3.5).

Using the designation $n_t$ to indicate the refractive index for PET and $n_o$ to indicate the refractive index for the barrier material, the ratio between the values $n_t$ and $n_o$ is preferably 0.8-1.3, more preferably 1.0-1.2, most preferably 1.0-1.1. As will be recognized by those skilled in the art, for the ratio $n_i/n_o=1$ the distortion due to refractive index will be at a minimum, because the two indices are identical. As the ratio progressively varies from one, however, the distortion increases progressively.

D. Preferred Barrier Coating Materials and their Preparation

The preferred barrier coating materials for use in the articles and methods of the present invention include Phenoxy-type Thermoplastic materials, copolyesters of terephthalic acid, isophthalic acid, and at least one diol having good barrier properties as compared to PET (Copolyester Barrier Materials), Polyamides, PEN, PEN copolymers, PEN/PET blends, and combinations thereof. Preferably, the Phenoxy-type Thermoplastics used as barrier materials in the present invention are one of the following types:

(1) hydroxy-functional poly(amide ethers) having repeating units represented by any one of the Formulae Ia, Ib or Ic:

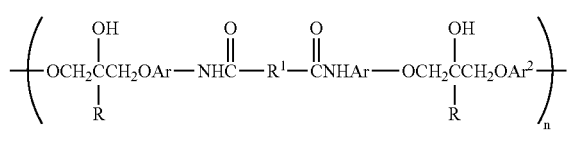

Ia

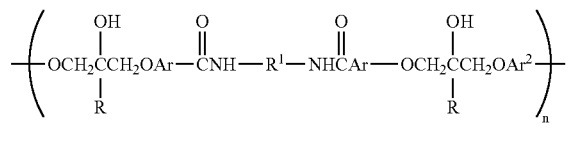

Ib or

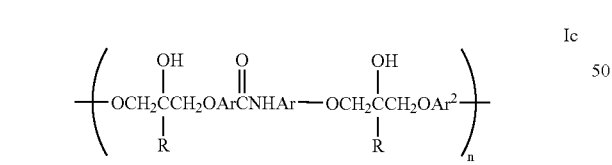

Ic (2) poly(hydroxy amide ethers) having repeating units represented independently by any one of the Formulae IIa, IIb or IIc:

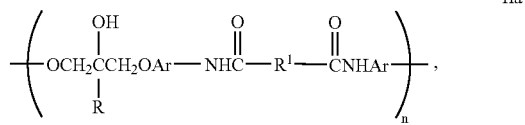

IIa

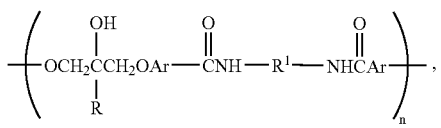

IIb or

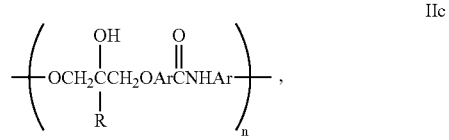

IIc (3) amide- and hydroxymethyl-functionalized polyethers having repeating units represented by Formula III:

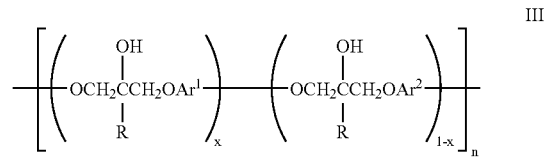

III (4) hydroxy-functional polyethers having repeating units represented by Formula IV:

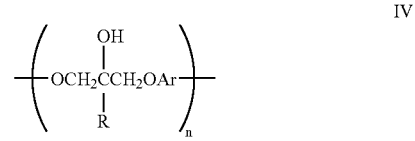

IV (5) hydroxy-functional poly(ether sulfonamides) having repeating units represented by Formulae Va or Vb:

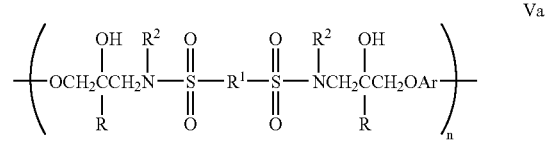

Va

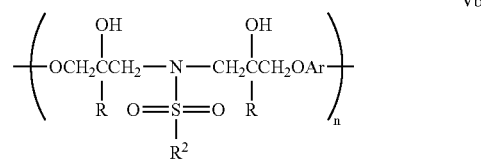

Vb (6) poly(hydroxy ester ethers) having repeating units represented by Formula VI:

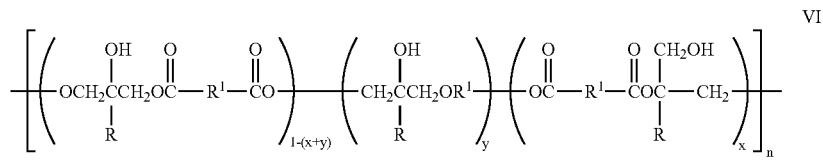

(7) hydroxy-phenoxyether polymers having repeating units represented by Formula VII:

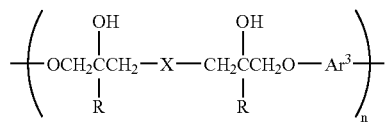

and (8) poly(hydroxyamino ethers) having repeating units represented by Formula VIII:

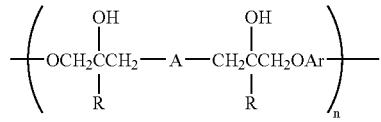

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar_1$ is a divalent aromatic moiety or combination of divalent aromatic moieties bearing amide or hydroxymethyl groups; each $Ar_2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R_1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R_2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar_3$ is a "cardo" moiety represented by any one of the Formulae:

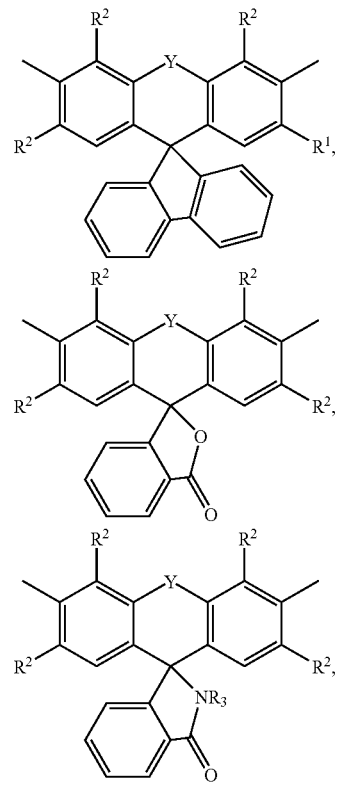

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I are preferably prepared by contacting an N,N'-bis(hydroxyphenylamido)alkane or arene with a diglycidyl ether as described in U.S. Pat. Nos. 5,089,588 and 5,143,998.

The poly(hydroxy amide ethers) represented by Formula II are prepared by contacting a bis(hydroxyphenylamido)

alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218.

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075.

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers are obtained by allowing a dihydric phenol or combination of dihydric phenols to react with an epihalohydrin by the process described by Reinking, Bamabeo and Hale in the Journal of Applied Polymer Science, Vol. 7, p. 2135 (1963).

The hydroxy-functional poly(ether sulfonamides) represented by Formula V are prepared, for example, by polymerizing an N,N'-dialkyl or N,N'-diaryldisulfonamide with a diglycidyl ether as described in U.S. Pat. No. 5,149,768.

The poly(hydroxy ester ethers) represented by Formula VI are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820.

The hydroxy-phenoxyether polymers represented by Formula VII are prepared, for example, by contacting at least one dinucleophilic monomer with at least one diglycidyl ether of a cardo bisphenol, such as 9,9-bis(4-hydroxyphenyl) fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,184,373.

The poly(hydroxyamino ethers) ("PHAE" or polyetheramines) represented by Formula VIII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These compounds are described in U.S. Pat. No. 5,275,853.

Phenoxy-type Thermoplastics of Formulae I-VIII may be acquired from Dow Chemical Company (Midland, Mich. U.S.A.).

The Phenoxy-type Thermoplastics commercially available from Phenoxy Associates, Inc. are suitable for use in the present invention. These hydroxy-phenoxyether polymers are the condensation reaction products of a dihydric polynuclear phenol, such as bisphenol A, and an epihalohydrin and have the repeating units represented by Formula IV wherein Ar is an isopropylidene diphenylene moiety. The process for preparing these is described in U.S. Pat. No. 3,305,528, incorporated herein by reference in its entirety.

The most preferred Phenoxy-type Thermoplastics are the poly(hydroxyamino ethers) ("PHAE") represented by Formula VIII. An example is that sold as XU19040.00L by Dow Chemical Company.

Examples of preferred Copolyester Barrier Materials and a process for their preparation is described in U.S. Pat. No. 4,578,295 to Jabarin. They are generally prepared by heating a mixture of at least one reactant selected from isophthalic acid, terephthalic acid and their $C_1$ to $C_4$ alkyl esters with 1,3 bis(2-hydroxyethoxy)benzene and ethylene glycol. Optionally, the mixture may further comprise one or more ester-forming dihydroxy hydrocarbon and/or bis(4-β-hydroxyethoxyphenyl)sulfone. Especially preferred Copolyester Barrier Materials are available from Mitsui Petrochemical Ind. Ltd. (Japan) as B-010, B-030 and others of this family.

Examples of preferred Polyamide barrier materials include MXD-6 from Mitsubishi Gas Chemical (Japan). Other preferred Polyamide barrier materials are polyamides containing preferably 1-10% polyester, more preferably 1-2% polyester by weight, where the polyester is preferably PET, more preferably high IPA PET. These materials are made by adding the polyester to the polyamide polycondensation mixture. "Polyamide" as used herein shall include those polyamides containing PET or other polyesters.

Other preferred barrier materials include polyethylene naphthalate (PEN), PEN copolyester, and PET/PEN blends. PEN materials can be purchased from Shell Chemical Company.

E. Preparation of Polyesters

Polyesters and methods for their preparation (including the specific monomers employed in their formation, their proportions, polymerization temperatures, catalysts and other conditions) are well-known in the art and reference is made thereto for the purposes of this invention. For purposes of illustration and not limitation, reference is particularly made to pages 1-62 of Volume 12 of the Encyclopedia of Polymer Science and Engineering, 1988 revision, John Wiley & Sons.

Typically, polyesters are derived from the reaction of a di- or polycarboxylic acid with a di- or polyhydric alcohol. Suitable di- or polycarboxylic acids include polycarboxylic acids and the esters and anthydrides of such acids, and mixture thereof. Representative carboxylic acids include phthalic, isophthalic, adipic azelaic, terephthalic, oxalic, malonic, succinic, glutaric, sebacic, and the like. Dicarboxylic components are preferred. Terephthalic acid is most commonly employed and preferred in the preparation of polyester films. α,β-Unsaturated di- and polycarboxylic acids (including esters or anthydrides of such acids and mixtures thereof) can be used as partial replacement for the saturated carboxylic components. Representative α,β-unsaturated di- and polycarboxylic acids include maleic, fumaric, aconitic, itaconic, mesaconic, citraconic, monochloromaleic and the like.

Typical di- and polyhydric alcohols used to prepare the polyester are those alcohols having at least two hydroxy groups, although minor amounts of alcohol having more or less hydroxy groups may be used. Dihydroxy alcohols are preferred. Dihydroxy alcohols conventionally employed in the preparation of polyesters include diethylene glycol; dipropylene glycol; ethylene glycol; 1,2-propylene glycol; 1,4-butanediol; 1,4-pentanediol; 1,5-hexanediol, 1,4-cyclohexanedimethanol and the like with 1,2-propylene glycol being preferred. Mixtures of the alcohols can also be employed. The di- or polyhydric alcohol component of the polyester is usually stoichiometric or in slight excess with respect to the acid. The excess of the di- or polyhydric alcohol will seldom exceed about 20 to 25 mole percent and usually is between about 2 and about 10 mole percent.

The polyester is generally prepared by heating a mixture of the di- or polyhydric alcohol and the di- or polycarboxylic component in their proper molar ratios at elevated temperatures, usually between about 100° C. and 250° C. for extended periods of time, generally ranging from 5 to 15 hours. Polymerization inhibitors such as t-butylcatechol may advantageously be used.

PET, the preferred polyester, which is commonly made by condensation of terephthalic acid and ethylene glycol, may be purchased from Dow Chemical Company (Midland, Mich.), and Allied Signal Inc. (Baton Rouge, La.), among many others.

Preferably, the PET used is that in which isophthalic acid (IPA) is added during the manufacture of the PET to form a copolymer. The amount of IPA added is preferably 2-10% by weight, more preferably 3-8% by weight, most preferably 4-5% by weight. The most preferred range is based upon current FDA regulations which currently do not allow for PET materials having an IPA content of more than 5% to be in contact with food or drink. High-IPA PET (PET having more than about 2% IPA by weight) can be made as discussed above, or purchased from a number of different manufacturers, for instance PET with 4.8% IPA may be purchased from SKF (Italy) and 10% EPA PET may be purchased from INCA (Dow Europe).

Additionally, if a Polyamide is chosen as the barrier material, it is preferred to use a polyamide-containing polyester. Such polyamide-containing polyesters are formed by adding polyamide to the polyester polycondensation mixture. The amount of polyamide in the polyester is preferably 1-10% by weight, more preferably 1-2% by weight. The polyester used is preferably PET, more preferably high IPA PET.

F. Materials to Enhance Barrier Properties of Barrier Resins

The barrier materials disclosed above may be used in combination with other materials which enhance the barrier properties. Generally speaking, one cause for the diffusion of gases through a material is the existence of gaps or holes in the material at the molecular level through which the gas molecules can pass. The presence of intermolecular forces in a material, such as hydrogen bonding, allows for interchain cohesion in the matrix which closes these gaps and discourages diffusion of gases. One may also increase the gas-barrier ability of good barrier materials by adding an additional molecule or substance which takes advantage of such intermolecular forces and acts as a bridge between polymer chains in the matrix, thus helping to close the holes in the matrix and reduce gas diffusion.

Derivatives of the diol resorcinol (m-dihydroxybenzene), when reacted with other monomers in the manufacture of PHAE, PET, Copolyester Barrier Materials, and other barrier materials, will generally result in a material which has better barrier properties than the same material if it does not contain the resorcinol derivative. For example, resorcinol diglycidyl ether can be used in PHAE and hydroxyethyl ether resorcinol can be used in PET and other polyesters and Copolyester Barrier Materials.

One measure of the efficacy of a barrier is the effect that it has upon the shelf life of the material. The shelf life of a carbonated soft drink in a 32 oz PET non-barrier bottle is approximately 12-16 weeks. Shelf life is determined as the time at which less than 85% of the original amount of carbon dioxide is remaining in the bottle. Bottles coated with PHAE using the inject-over-inject method described below have been found to have a shelf life 2 to 3 times greater than that of PET alone. If, however, PHAE with resorcinol diglycidyl ether is used, the shelf life can be increased to 4 to 5 times that of PET alone.

Another way of enhancing the barrier properties of a material is to add a substance which "plugs" the holes in the polymer matrix and thus discourages gases from passing through the matrix. Alternatively, a substance may aid in creating a more tortuous path for gas molecules to take as they permeate a material. One such substance, referred to herein by the term "Nanoparticles" or "nanoparticular material" are tiny particles of materials which enhance the barrier properties of a material by creating a more tortuous path for migrating oxygen or carbon dioxide. One preferred type of nanoparticular material is a microparticular clay-based product available from Southern Clay Products.

G. Preparing Barrier-Coated Articles

Once a suitable barrier coating material is chosen, the coated preform must be made in a manner that promotes adhesion between the two materials. Generally, adherence between the barrier coating materials and PET increases as the surface temperature of the PET increases. Therefore, it is preferable to perform coating on heated preforms, although the preferred barrier materials will adhere to PET at room temperature.

There are a number of methods of producing a coated PET preform in accordance with the present invention. Preferred methods include dip coating, spray coating, flame spraying fluidized bed dipping, and electrostatic powder spraying. Another preferred method, lamellar injection molding, is discussed in more detail below. Each of the above methods is introduced and described in my copending U.S. application Ser. No. 09/147,971, which was filed on Oct. 19, 1998, entitled BARRIER-COATED POLYESTER, which is hereby incorporated by reference in its entirety.

An especially preferred method of producing a coated PET preform is referred to herein generally as overmolding, and sometimes as inject-over-inject ("IOI"). The name refers to a procedure which uses injection molding to inject one or more layers of barrier material over an existing preform, which preferably was itself made by injection molding. The terms "overinjecting" and "overmolding" are used herein to describe the coating process whereby a layer of material, preferably comprising barrier material, is injected over an existing preform. In an especially preferred embodiment, the overinjecting process is performed while the underlying preform has not yet fully cooled. Overinjecting may be used to place one or more additional layers of materials such as those comprising barrier material, recycled PET, or other materials over a coated or uncoated preform.

The overmolding is carried out by using an injection molding process using equipment similar to that used to form the uncoated preform itself. A preferred mold for overmolding, with an uncoated preform in place is shown in FIG. 9. The mold comprises two halves, a cavity half 92 and a mandrel half 94, and is shown in FIG. 9 in the closed position prior to overinjecting. The cavity half 92 comprises a cavity in which the uncoated preform is placed. The support ring 38 of the preform rests on a ledge 96 and is held in place by the mandrel half 94, which exerts pressure on the support ring 38, thus sealing the neck portion off from the body portion of the preform. The cavity half 92 has a plurality of tubes or channels 104 therein which carry a fluid. Preferably the fluid in the channels circulates in a path in which the fluid passes into an input in the cavity half 92, through the channels 104, out of the cavity half 92 through an output, through a chiller or other cooling device, and then back into the input. The circulating fluid serves to cool the mold, which in turn cools the plastic melt which is injected into the mold to form the coated preform.

The mandrel half 94 of the mold comprises a mandrel 98. The mandrel 98, sometimes called a core, protrudes from the mandrel half 94 of the mold and occupies the central cavity of the preform. In addition to helping to center the preform in the mold, the mandrel 98 cools the interior of the preform. The cooling is done by fluid circulating through channels 106 in the mandrel half 94 of the mold, most importantly through the length of the mandrel 98 itself. The channels 106 of the mandrel half 94 work in a manner similar to the channels 104 in the cavity half 92, in that they create the portion of the path through which the cooling fluid travels which lies in the interior of the mold half.

As the preform sits in the mold cavity, the body portion of the preform is centered within the cavity and is completely surrounded by a void space 100. The preform, thus positioned, acts as an interior die mandrel in the subsequent injection procedure. The melt of the overmolding material, preferably comprising a barrier material, is then introduced into the mold cavity from the injector via gate 102 and flows around the preform, preferably surrounding at least the body portion 34 of the preform. Following overinjection, the overmolded layer will take the approximate size and shape of the void space 100.

To carry out the overmolding procedure, one preferably heats the initial preform which is to be coated preferably to a temperature above its Tg. In the case of PET, that temperature is preferably 100 to 200° C., more preferably 180-225° C. If a temperature at or above the temperature of crystallization for PET is used, which is about 120° C., care should be taken when cooling the PET in the preform. The cooling should be sufficient to minimize crystallization of the PET in the preform so that the PET is in the preferred semi-crystalline state. Alternatively, the initial preform used may be one which has been very recently injection molded and not fully cooled, as to be at an elevated temperature as is preferred for the overmolding process.

The coating material is heated to form a melt of a viscosity compatible with use in an injection molding apparatus. The temperature for this, the inject temperature, will differ among materials, as melting ranges in polymers and viscosities of melts may vary due to the history, chemical character, molecular weight, degree of branching and other characteristics of a material. For the preferred barrier materials disclosed above, the inject temperature is preferably in the range of about 160-325° C., more preferably 200 to 275° C. For example, for the Copolyester Barrier Material B-010, the preferred temperature is around 210° C., whereas for the PHAE XU-19040.00L the preferred temperature is in the range of 160-260° C., and is more preferably about 200-280° C. Most preferably, the PHAE inject temperature is about 190-230° C. If recycled PET is used, the inject temperature is preferably 250-300° C. The coating material is then injected into the mold in a volume sufficient to fill the void space 100. If the coating material comprises barrier material, the coating layer is a barrier layer.

The coated preform is preferably cooled at least to the point where it can be displaced from the mold or handled without being damaged, and removed from the mold where further cooling may take place. If PET is used, and the preform has been heated to a temperature near or above the temperature of crystallization for PET, the cooling should be fairly rapid and sufficient to ensure that the PET is primarily in the semi-crystalline state when the preform is fully cooled. As a result of this process, a strong and effective bonding takes place between the initial preform and the subsequently applied coating material.

Overmolding can be also used to create coated preforms with three or more layers. In FIG. 16, there is shown a three-layer embodiment of a preform 132 in accordance with the present invention. The preform shown therein has two coating layers, a middle layer 134 and an outer layer 134. The relative thickness of the layers shown in FIG. 16 may be varied to suit a particular combination of layer materials or to allow for the making of different sized bottles. As will be understood by one skilled in the art, a procedure analogous to that disclosed above would be followed, except that the initial preform would be one which had already been coated, as by one of the methods for making coated preforms described herein, including overmolding.

1. First Preferred Method and Apparatus for Overmolding

A first preferred apparatus for performing the overmolding process is based upon the use of a 330-330-200 machine by Engel (Austria). The preferred mold portion the machine is shown schematically in FIGS. 10-15 and comprises a movable half 142 and a stationary half 144. Both halves are preferably made from hard metal. The stationary half 144 comprises at least two mold sections 146, 148, wherein each mold section comprises N(N>0) identical mold cavities 114, 120, an input and output for cooling fluid, channels allowing for circulation of cooling fluid within the mold section, injection apparatus, and hot runners channeling the molten material from the injection apparatus to the gate of each mold cavity. Because each mold section forms a distinct preform layer, and each preform layer is preferably made of a different material, each mold section is separately controlled to accommodate the potentially different conditions required for each material and layer. The injector associated with a particular mold section injects a molten material, at a temperature suitable for that particular material, through that mold section's hot runners and gates and into the mold cavities. The mold section's own input and output for cooling fluid allow for changing the temperature of the mold section to accommodate the characteristics of the particular material injected into a mold section. Consequently, each mold section may have a different injection temperature, mold temperature, pressure, injection volume, cooling fluid temperature, etc. to accommodate the material and operational requirements of a particular preform layer.

The movable half 142 of the mold comprises a turntable 130 and a plurality of cores or mandrels 98. The alignment pins guide the movable half 142 to slidably move in a preferably horizontal direction towards or away from the stationary half 144. The turntable 130 may rotate in either a clockwise or counterclockwise direction, and is mounted onto the movable half 142. The plurality of mandrels 98 are affixed onto the turntable 130. These mandrels 98 serve as the mold form for the interior of the preform, as well as serving as a carrier and cooling device for the preform during the molding operation. The cooling system in the mandrels is separate from the cooling system in the mold sections.

The mold temperature or cooling for the mold is controlled by circulating fluid. There is separate cooling fluid circulation for the movable half 142 and for each of the mold sections 146, 148 of the stationary half 144. Therefore, in a mold having two mold sections in the stationary half 144, there is separate cooling for each of the two mold sections plus separate cooling for the movable half 142 of the mold. Analogously, in a mold having three mold sections in the stationary half, there are four separate cooling fluid circulation set ups: one for each mold section, for a total of three, plus one for the movable half 142. Each cooling fluid circulation set up works in a similar manner. The fluid enters the mold, flows through a network of channels or tubes inside as discussed above for FIG. 9, and then exits through an output. From the output, the fluid travels through a pump, which keeps the fluid flowing, and a chilling system to keep the fluid within the desired temperature range, before going back into the mold.

In a preferred embodiment, the mandrels and cavities are constructed of a high heat transfer material, such a beryllium, which is coated with a hard metal, such as tin or chrome. The hard coating keeps the beryllium from direct contact with the preform, as well as acting as a release for ejection and providing a hard surface for long life. The high heat transfer material allows for more efficient cooling, and thus assists in achieving lower cycle times. The high heat transfer material may be disposed over the entire area of each mandrel and/or cavity, or it may be only on portions thereof. Preferably at least the tips of the mandrels comprise high heat transfer material. Another, even more preferred high heat transfer material is Ampcoloy, which is commercially available from Uudenholm, Inc.

The number of mandrels is equal to the total number of cavities, and the arrangement of the mandrels 98 on the movable half 142 mirrors the arrangement of the cavities 114, 120 on the stationary half 144. To close the mold, the movable half 142 moves towards the stationary half 144, mating the mandrels 98 with the cavities 114, 120. To open the mold, the movable half 142 moves away from the stationary half 144 such that the mandrels 98 are well clear of the block on the stationary half 144. After the mandrels are fully withdrawn 98 from the mold sections 146, 148, the turntable 130 of the movable half 142 rotates the mandrels 98 into alignment with a different mold section. Thus, the movable half rotates 360°/(number of mold sections in the stationary half) degrees after each withdrawal of the mandrels from the stationary half. When the machine is in operation, during the withdrawal and rotation steps, there will be preforms present on some or all of the mandrels.

The size of the cavities in a given mold section 146, 148 will be identical; however the size of the cavities will differ among the mold sections. The cavities in which the uncoated preforms are first molded, the preform molding cavities 114, are smallest in size. The size of the cavities 120 in the mold section 148 in which the first coating step is performed are larger than the preform molding cavities 114, in order to accommodate the uncoated preform and still provide space for the coating material to be injected to form the overmolded coating. The cavities in each subsequent mold section wherein additional overmolding steps are performed will be increasingly larger in size to accommodate the preform as it gets larger with each coating step.

After a set of preforms has been molded and overmolded to completion, a series of ejectors eject the finished preforms off of the mandrels 98. The ejectors for the mandrels operate independently, or at least there is a single ejector for a set of mandrels equal in number and configuration to a single mold section, so that only the completed preforms are ejected. Uncoated or incompletely-coated preforms remain on the mandrels so that they may continue in the cycle to the next mold section. The ejection may cause the preforms to completely separate from the mandrels and fall into a bin or onto a conveyor. Alternatively, the preforms may remain on the mandrels after ejection, after which a robotic arm or other such apparatus grasps a preform or group of preforms for removal to a bin, conveyor, or other desired location.

FIGS. 10 and 11 illustrate a schematic for an embodiment of the apparatus described above. FIG. 11 is the stationary half 144 of the mold. In this embodiment, the block 124 has two mold sections, one section 146 comprising a set of three preform molding cavities 114 and the other section 148 comprising a set of three preform coating cavities 120. Each of the preform coating cavities 120 is preferably like that shown in FIG. 9, discussed above. Each of the preform molding cavities 114 is preferably similar to that shown in FIG. 9, in that the material is injected into a space defined by the mandrel 98 (albeit without a preform already thereon) and the wall of the mold which is cooled by fluid circulating through channels inside the mold block. Consequently, one full production cycle of this apparatus will yield three two-layer preforms. If more than three preforms per cycle is desired, the stationary half can be reconfigured to accommodate more cavities in each of the mold sections. An example of this is seen in FIG. 13, wherein there is shown a stationary half of a mold comprising two mold sections, one 146 comprising forty-eight preform molding cavities 114 and the other 148 comprising forty-eight preform coating cavities 120. If a three or more layer preform is desired, the stationary half 144 can be reconfigured to accommodate additional mold sections, one for each preform layer FIG. 10 illustrates the movable half 142 of the mold. The movable half comprises six identical mandrels 98 mounted on the turntable 130. Each mandrel 98 corresponds to a cavity on the stationary half 144 of the mold. The movable half also comprises alignment pegs 110, which correspond to the receptacles 112 on the stationary half 144. When the movable half 142 of the mold moves to close the mold, the alignment pegs 110 are mated with their corresponding receptacles 112 such that the molding cavities 114 and the coating cavities 120 align with the mandrels 98. After alignment and closure, half of the mandrels 98 are centered within preform molding cavities 114 and the other half of the mandrels 98 are centered within preform coating cavities 120.

The configuration of the cavities, mandrels, and alignment pegs and receptacles must all have sufficient symmetry such that after the mold is separated and rotated the proper number of degrees, all of the mandrels line up with cavities and all alignment pegs line up with receptacles. Moreover, each mandrel must be in a cavity in a different mold section than it was in prior to rotation in order to achieve the orderly process of molding and overmolding in an identical fashion for each preform made in the machine.

Two views of the two mold halves together are shown in FIGS. 14 and 15. In FIG. 14, the movable half 142 is moving towards the stationary half 144, as indicated by the arrow. Two mandrels 98, mounted on the turntable 130, are beginning to enter cavities, one enters a molding cavity 114 and the other is entering a coating cavity 120 mounted in the block 124. In FIG. 15, the mandrels 98 are fully withdrawn from the cavities on the stationary side. The preform molding cavity 114 has cooling circulation which is separate from the cooling circulation for the preform coating cavity 120, which comprises the other mold section 148. The two mandrels 98 are cooled by a single system which links all the mandrels together. The arrow in FIG. 15 shows the rotation of the turntable 130. The turntable 130 could also rotate clockwise. Not shown are coated and uncoated preforms which would be on the mandrels if the machine were in operation. The alignment pegs and receptacles have also been left out for the sake of clarity.

The operation of the overmolding apparatus will be discussed in terms of the preferred two mold section apparatus for making a two-layer preform. The mold is closed by moving the movable half 142 towards the stationary half 144 until they are in contact. A first injection apparatus injects a melt of first material into the first mold section 146, through the hot runners and into the preform molding cavities 114 via their respective gates to form the uncoated preforms each of which become the inner layer of a coated preform. The first material fills the void between the preform molding cavities 114 and the mandrels 98. Simultaneously, a second injection apparatus injects a melt of second material into the second mold section 148 of the stationary half 144, through the hot runners and into each preform coating cavity 120 via their respective gates, such that the second material fills the void (100 in FIG. 9) between the wall of the coating cavity 120 and the uncoated preform mounted on the mandrel 98 therein.

During this entire process, cooling fluid is circulating through the three separate areas, corresponding to the mold section 146 of the preform molding cavities 114, mold section 148 of the preform coating cavities 120, and the movable half 142 of the mold, respectively. Thus, the melts and preforms are being cooled in the center by the circulation in the movable half that goes through the interior of the mandrels, as well as on the outside by the circulation in each of the cavities. The operating parameters of the cooling fluid in the first mold section 146 containing preform molding cavities 114 are separately controlled from the operating parameters of the cooling fluid in the second mold section 148 containing the coating cavities to account for the different material characteristics of the preform and the coating. These are in turn separate from those of the movable half of 142 the mold which provides constant cooling for the interior of the preform throughout the cycle, whether the mold is open or closed.

The movable half 142 then slides back to separate the two mold halves and open the mold until all of the mandrels 98 having preforms thereon are completely withdrawn from the preform molding cavities 114 and preform coating cavities 120. The ejectors eject the coated, finished preforms off of the mandrels 98 which were just removed from the preform coating cavities. As discussed above, the ejection may cause the preforms to completely separate from the mandrels and fall into a bin or onto a conveyor, or if the preforms remain on the mandrels after ejection, a robotic arm or other apparatus may grasp a preform or group of preforms for removal to a bin, conveyor, or other desired location. The turntable 130 then rotates 180° so that each mandrel 98 having an uncoated preform thereon is positioned over a preform coating cavity 120, and each mandrel from which a coated preform was just ejected is positioned over a preform molding cavity 114. Rotation of the turntable 130 may occur as quickly as 0.3 seconds. Using the alignment pegs 110, the mold halves again align and close, and the first injector injects the first material into the preform molding cavity 114 while the second injector injects the barrier material into the preform coating cavity 120.

A production cycle of closing the mold, injecting the melts, opening the mold, ejecting finished barrier preforms, rotating the turntable, and closing the mold is repeated, so that preforms are continuously being molded and overmolded.

When the apparatus first begins running, during the initial cycle, no preforms are yet in the preform coating cavities 120. Therefore, the operator should either prevent the second injector from injecting the second material into the second mold section during the first injection, or allow the second material to be injected and eject and then discard the resulting single layer preform comprised solely of the second material. After this start-up step, the operator may either manually control the operations or program the desired parameters such that the process is automatically controlled.

Two layer preforms may be made using the first preferred overmolding apparatus described above. In one preferred embodiment, the two layer preform comprises an inner layer comprising polyester and an outer layer comprising barrier material. In especially preferred embodiments, the inner layer comprises virgin PET. The description hereunder is directed toward the especially preferred embodiments of two layer preforms comprising an inner layer of virgin PET. The description is directed toward describing the formation of a single set of coated preforms 60 of the type seen in FIG. 4, that is, following a set of preforms through the process of molding, overmolding and ejection, rather than describing the operation of the apparatus as a whole. The process described is directed toward preforms having a total thickness in the wall portion 66 of about 3 mm, comprising about 2 mm of virgin PET and about 1 mm of barrier material. The thickness of the two layers will vary in other portions of the preform 60, as shown in FIG. 4.

It will be apparent to one skilled in the art that some of the parameters detailed below will differ if other embodiments of preforms are used. For example, the amount of time which the mold stays closed will vary depending upon the wall thickness of the preforms. However, given the disclosure below for this preferred embodiment and the remainder of the disclosure herein, one skilled in the art would be able to determine appropriate parameters for other preform embodiments.

The apparatus described above is set up so that the injector supplying the mold section 146 containing the preform molding cavities 114 is fed with virgin PET and that the injector supplying the mold section 148 containing the preform coating cavities 120 is fed with a barrier material. Both mold halves are cooled by circulating fluid, preferably water, at a temperature of preferably 0-30° C., more preferably 10-15° C.

The movable half 142 of the mold is moved so that the mold is closed. A melt of virgin PET is injected through the back of the block 124 and into each preform molding cavity 114 to form an uncoated preform 30 which becomes the inner layer of the coated preform. The injection temperature of the PET melt is preferably 250 to 320° C., more preferably 255 to 280° C. The mold is kept closed for preferably 3 to 10 seconds, more preferably 4 to 6 seconds while the PET melt stream is injected and then cooled by the coolant circulating in the mold. During this time, surfaces of the preforms which are in contact with surfaces of preform molding cavities 114 or mandrels 98 begin to form a skin while the cores of the preforms remain molten and unsolidified.

The movable half 142 of the mold is then moved so that the two halves of the mold are separated at or past the point where the newly molded preforms, which remain on the mandrels 98, are clear of the stationary side 144 of the mold. The interior of the preforms, in contact with the mandrel 98, continues to cool. The cooling is preferably done in a manner which rapidly removes heat so that crystallization of the PET is minimized so that the PET will be in a semi-crystalline state. The chilled water circulating through the mold, as described above, should be sufficient to accomplish this task.

While the inside of the preform is cooling, the temperature of the exterior surface of the preform begins to rise as it absorbs heat from the molten core of the preform. This heating begins to soften the skin on the exterior surface of the newly molded preform. Although the skin, which had been cooled while in the mold cavity 114, increases in temperature and begins to soften when removed from the cavity, this softening of the skin is the result of significant heat absorption from the molten core. Thus, the initial formation and later softening of the skin speeds the overall cooling of the molten preform and helps avoid crystallization during cooling.

When the mandrels 98 are clear of the stationary side 144 of the mold, the turntable 130 then rotates 180° so that each mandrel 98 having a molded preform thereon is positioned over a preform coating cavity 120. Thus positioned, each of the other mandrels 98 which do not have molded preforms thereon, are each positioned over a preform molding cavity 114. The mold is again closed. Preferably the time between removal from the preform molding cavity 114 to insertion into the preform coating cavity 120 is 1 to 10 seconds, and more preferably 1 to 3 seconds.

When the molded preforms are first placed into preform coating cavities 120, the exterior surfaces of the preforms are not in contact with a mold surface. Thus, the exterior skin is still softened and hot as described above because the contact cooling is only from the mandrel inside. The high temperature of the exterior surface of the uncoated preform (which forms the inner layer of the coated preform) aids in promoting adhesion between the PET and barrier layers in the finished barrier coated preform. It is postulated that the surfaces of the materials are more reactive when hot, and thus chemical interactions between the barrier material and the virgin PET will be enhanced by the high temperatures. Barrier material will coat and adhere to a preform with a cold surface, and thus the operation may be performed using a cold initial uncoated preform, but the adhesion is markedly better when the overmolding process is done at an elevated temperature, as occurs immediately following the molding of the uncoated preform.

A second injection operation then follows in which a melt of a barrier material, is injected into each preform coating cavity 120 to coat the preforms. The temperature of the melt of barrier material is preferably 160 to 300° C. The exact temperature range for any individual barrier material is dependent upon the specific characteristics of that barrier material, but it is well within the abilities of one skilled in the art to determine a suitable range by routine experimentation given the disclosure herein. For example, if the PHAE barrier material XU19040.00L is used, the temperature of the melt (inject temperature) is preferably 160 to 260° C., more preferably 200 to 240° C., and most preferably 220 to 230° C. If the Copolyester Barrier Material B-010 is used, the injection temperature is preferably 160 to 260° C., more preferably 190 to 250° C. During the same time that this set of preforms are being overmolded with barrier material in the preform coating cavities 120, another set of uncoated preforms is being molded in the preform molding cavities 114 as described above.

The two halves of the mold are again separated preferably 3 to 10 seconds, more preferably 4 to 6 seconds following the initiation of the injection step. The preforms which have just been barrier coated in the preform coating cavities 120, are ejected from the mandrels 98. The uncoated preforms which were just molded in preform molding cavities 114 remain on their mandrels 98. The turntable 130 is then rotated 180° so that each mandrel having an uncoated preform thereon is positioned over a coating cavity 120 and each mandrel 98 from which a coated preform was just removed is positioned over a molding cavity 114.

The cycle of closing the mold, injecting the materials, opening the mold, ejecting finished barrier preforms, rotating the turntable, and closing the mold is repeated, so that preforms are continuously being molded and overmolded. Those of skill in the art will appreciate that dry cycle time of the apparatus may increase the overall production cycle time for molding a complete preform.

One of the many advantages of using the process disclosed herein is that the cycle times for the process are similar to those for the standard process to produce uncoated preforms; that is the molding and coating of preforms by this process is done in a period of time similar to that required to make uncoated PET preforms of similar size by standard methods currently used in preform production. Therefore, one can make barrier coated PET preforms instead of uncoated PET preforms without a significant change in production output and capacity.

If a PET melt cools slowly, the PET will take on a crystalline form. Because crystalline polymers do not blow mold as well as amorphous polymers, a preform of crystalline PET would not be expected to perform as well in forming containers according to the present invention. If, however, the PET is cooled at a rate faster than the crystal formation rate, as is described herein, crystallization will be minimized and the PET will take on a semi-crystalline form. The amorphous form is ideal for blow molding. Thus, sufficient cooling of the PET is crucial to forming preforms which will perform as needed when processed.

The rate at which a layer of PET cools in a mold such as described herein is proportional to the thickness of the layer of PET, as well as the temperature of the cooling surfaces with which it is in contact. If the mold temperature factor is held constant, a thick layer of PET cools more slowly than a thin layer. This is because it takes a longer period of time for heat to transfer from the inner portion of a thick PET layer to the outer surface of the PET which is in contact with the cooling surfaces of the mold than it would for a thinner layer of PET because of the greater distance the heat must travel in the thicker layer. Thus, a preform having a thicker layer of PET needs to be in contact with the cooling surfaces of the mold for a longer time than does a preform having a thinner layer of PET. In other words, with all things being equal, it takes longer to mold a preform having a thick wall of PET than it takes to mold a preform having a thin wall of PET.

The uncoated preforms of this invention, including those made by the first injection in the above-described apparatus, are preferably thinner than a conventional PET preform for a given container size. This is because in making the barrier coated preforms, a quantity of the PET which would be in a conventional PET preform can be displaced by a similar quantity of one of the preferred barrier materials. This can be done because the preferred barrier materials have physical properties similar to PET, as described above. Thus, when the barrier materials displace an approximately equal quantity of PET in the walls of a preform or container, there will not be a significant difference in the physical performance of the container. Because the preferred uncoated preforms which form the inner layer of the barrier coated preforms are thin-walled, they can be removed from the mold sooner than their thicker-walled conventional counterparts. For example, the uncoated preform can be removed from the mold preferably after about 4-6 seconds without crystallizing, as compared to about 12-24 seconds for a conventional PET preform having a total wall thickness of about 3 mm. All in all, the time to make a barrier coated preform is equal to or slightly greater (up to about 30%) than the time required to make a monolayer PET preform of this same total thickness.

Additionally, because the preferred barrier materials are amorphous, they will not require the same type of treatment as the PET. Thus, the cycle time for a molding-overmolding process as described above is generally dictated by the cooling time required by the PET. In the above-described method, barrier coated preforms can be made in about the same time it takes to produce an uncoated conventional preform.

The advantage gained by a thinner preform can be taken a step farther if a preform made in the process is of the type in FIG. 4. In this embodiment of a coated preform, the PET wall thickness at 70 in the center of the area of the end cap 42 is reduced to preferably about ⅓ of the total wall thickness. Moving from the center of the end cap out to the end of the radius of the end cap, the thickness gradually increases to preferably about ⅔ of the total wall thickness, as at reference number 68 in the wall portion 66. The wall thickness may remain constant or it may, as depicted in FIG. 4, transition to a lower thickness prior to the support ring 38. The thickness of the various portions of the preform may be varied, but in all cases, the PET and barrier layer wall thicknesses must remain above critical melt flow thickness for any given preform design.

Using preforms 60 of the design in FIG. 4 allows for even faster cycle times than that used to produce preforms 50 of the type in FIG. 3. As mentioned above, one of the biggest barriers to short cycle time is the length of time that the PET needs to be cooled in the mold following injection. If a preform comprising PET has not sufficiently cooled before it is ejected from the mandrel, it will become substantially crystalline and potentially cause difficulties during blow molding. Furthermore, if the PET layer has not cooled enough before the overmolding process takes place, the force of the barrier material entering the mold will wash away some of the PET near the gate area. The preform design in FIG. 4 takes care of both problems by making the PET layer thinnest in the center of the end cap region 42, which is where the gate is in the mold. The thin gate section allows the gate area to cool more rapidly, so that the uncoated PET layer may be removed from the mold in a relatively short period of time while still avoiding crystallization of the gate and washing of the PET during the second injection or overmolding phase.

The physical characteristics of the preferred barrier materials help to make this type of preform design workable. Because of the similarity in physical properties, containers having wall portions which are primarily barrier material can be made without sacrificing the performance of the container. If the barrier material used were not similar to PET, a container having a variable wall composition as in FIG. 4 would likely have weak spots or other defects that could affect container performance.

2. Second Preferred Method and Apparatus for Overmolding

A second preferred apparatus 150 for performing the overmolding process is specially suited to accommodate the properties of the preform's PET inner layer and barrier material outer layer. As discussed above, the barrier material is generally amorphous and will cool to a semi-crystalline state regardless of the cooling rate. However, PET will cool to be substantially crystalline unless it is cooled very quickly. If, however, the PET is cooled quickly, crystallization will be minimized and the PET will be mostly amorphous and well suited for blow molding. Since the inner layer of the preferred preform is formed of PET and the outer layer is formed of a barrier material, it is most important to quickly cool the preform's inner layer in order to avoid crystallization of the PET. Thus, this second preferred apparatus retains the completed preform on a cooling mandrel 98 for a time after removal from the mold coating cavity 158. Thus, the mandrel 98 continues to extract heat from the inner layer of the preform while the preform mold cavities 156, 158 are available to form other preforms.

FIG. 17 shows the second embodiment of an apparatus 150 for overmolding. Hoppers 176, 178 feed injection machines 152, 154 which heat the PET and barrier materials and provide melt streams injected into the preform molding cavity 156 and coating cavity 158, respectively. As in the first preferred embodiment discussed above, the mold is divided into a stationary half 180 and a moveable half 182. The stationary half 180 has at least two mold cavity sections 184, 186, each comprising at least one identical mold cavity. The first stationary mold section 184 has at least one preform molding cavity 156 formed therein and the second stationary mold section 186 has at least one preform coating cavity 158 formed therein.

The mold of the present embodiment also has other aspects already discussed above. For instance, the mold cooling system has cooling tubes with input and output ports for continuously circulating chilled coolant through the mold members; hot runners communicate molten plastic from an injection apparatus into a void space between a mated mandrel and mold cavity to form a preform layer; the mold halves are constructed of hard metal; and alignment pegs and corresponding receptacles aid alignment of the moveable half into the stationary half. Certain of these molding components are commercially available from Husky Injection Molding Systems, Ltd.

With next reference to FIG. 18, the movable half 182 of the mold comprises a turntable 160 divided into preferably four stations (A, B, C, D), each separated by 90° of rotation. In the illustrated embodiment, each station has a single mandrel 98 affixed thereto which corresponds to the single cavity formed in each stationary section 180. However, as in the first preferred embodiment discussed above, the number of mandrels per station can be adjusted to increase the output of the machine so long as the number of cavities in each mold section is increased correspondingly. Accordingly, although the illustrated embodiment shows only one mandrel per station, which would produce only one preform per station each production cycle, the apparatus could have, for example, three, eight, or even forty-eight mandrels per station and cavities per mold section.

Although all of the mandrels 98 are substantially identical, they will be described and labeled herein as relating to the respective station on which they are located. Thus, the mandrel 98 disposed on station A is labeled 98A, the mandrel disposed on station B is labeled 98B, and so on. As above, the mandrels 98A-D serve as the mold form for the interior of the preform. They also serve as a carrier and cooling system for the preform during the molding operation.

The present apparatus 150 is designed to use approximately the same injection times, materials and temperatures discussed above. However, the orientation of the apparatus and the molds upon the turntable 160 are adapted to optimize both cooling of the preforms and output by the apparatus. A preferred method of using this apparatus to overmold a two layer preform, especially a two layer preform having a barrier material formed as the outer layer, is described below. To illustrate the operation of this apparatus, molding of a preform will be described by following station A through a complete production cycle. It will be appreciated that stations B-D also produce preforms concurrently with station A. FIG. 19 is a chart showing the relative activities of each of the stations at each point of the production cycle.

At the start of a cycle, the mandrel 96A on station A is unencumbered and directly aligned with the preform molding cavity 156 of the first section 184 of the stationary mold 182. An actuator 162, preferably hydraulic, lifts the turntable 130 so that the mandrel 98A is inserted into the molding cavity 156. The void space between the mandrel 98A and the cavity 156 is then filled with a PET melt and allowed to cool in the mold for a short time, allowing the molded preform to develop the cooling skin discussed previously. The turntable 130 is then lowered, thus pulling the mandrel 98A out of the molding cavity 156. The just-injected preform remains on the mandrel 98A. Once the mandrels 98 are cleared of the cavities, the turntable 130 is rotated 90° so that the mandrel 98A is directly aligned with the coating cavity 158 of the second stationary mold section 186. The rotary table 130 is again lifted, inserting the mandrel 98A and the associated preform into the coating cavity 158. A melt of barrier material is injected to coat the preform and is allowed to cool briefly. The table 130 is again lowered and the completely-injected molded preform remains on the mandrel 98A. The turntable is rotated 90°, however the mandrel 98A is no longer aligned with any mold cavity. Instead, the mandrel 98A is left in the open and the cooling system within the mandrel 96A continues to cool the preform quickly from the inner surface. Alternatively, the mandrel 98A may also be aligned with a cooling system 163 having, for example, air or water cooling tubes 165 adapted to receive the mandrel 98A and accompanying preform, cooling the preform from the outer surface. Meanwhile, mandrels 98B and 98C of stations B and C are interacting with the coating and molding cavities 156, 158, respectively. When the injections are complete, the turntable again rotates 90°. Again, the mandrel 98A is not aligned with any mold cavity and the cooling process continues. Mandrels 98C and 98D of stations C and D are at this time interacting with the coating and molding cavities 156, 158, respectively. The cooling preform is next ejected from the mandrel 98A by an ejector and is removed by a device such as a robot. The robot will deposit the completed preform on a conveyor, bin or the like. With the preform now ejected, the mandrel 98A is again unencumbered. Once stations C and D have completed their interactions with the mold cavities, the turntable again rotates 90° and station A and mandrel 98A are again aligned with the preform molding cavity 156. The cycle thus starts over again.

The above apparatus 150 may be adapted to create an apparatus 170 with improved versatility. With next reference to FIGS. 20 and 21, instead of the entire turntable 130 being raised and lowered by a single hydraulic actuator, each station of the turntable 130 could be connected to its own dedicated actuator 172. Thus, each of the stations can function independently to allow process optimization for the overmolding operation. For instance, depending on the material injected, it may be preferable to cool the newly injected material in one cavity for a longer or shorter time than material injected into another cavity. Dedicated hydraulic actuators 172 allow the stations to be independently moved into and out of engagement with the respective mold cavity 156, 158.

Although the above-described apparatus has been discussed in the context of forming a two-layer preform, it will be appreciated that the disclosed principles of construction and operation may be adapted to mold preforms having numerous layers. For instance, additional stations could be disposed on the turntable and additional injection machines and associated coating cavities arranged on the machine to provide for injections of additional layers.

3. Third Preferred Method and Apparatus for Overmolding.

FIGS. 22-24 illustrate a third preferred method and apparatus 250 for overmolding which uses the principle of retaining newly-injected preforms on the core to hasten cooling of the inner layer of the preforms. While the preforms are thus cooling, other mandrels interact with mold cavities to form further preforms. The cooled preform is ejected from the mandrel on which it was formed just before the mandrel is reused to mold yet another preform.

The apparatus 250 includes a stationary first mold cavity 256 connected by hot runners to an injection apparatus 252 which supplies a PET melt. A second injection apparatus 254 is adapted to supply a melt stream of a barrier material and is vertically and stationarily oriented adjacent the first cavity. A turntable 260 is mounted on a support member 264 slidably disposed on ways 266, allowing the turntable 260 and all parts associated therewith to travel horizontally back and forth on the ways 266. The turntable 260 is rotatable through a vertical plane. Along the peripheral edges of the turntable are stations (AA, BB, CC, DD) similar to those discussed above. Mandrels 98AA-98DD are disposed on stations AA-DD, respectively. A second mold cavity 258 is disposed above the turntable 260 and is connected thereto. The mold cavity 258 is movable by actuators 268 such as hydraulic cylinders or the like into and out of engagement with a mandrel 98 disposed on the associated station. The second mold cavity 258 also moves horizontally with the turntable apparatus. The turntable stations and the mold cavities each have cooling systems, hot runner systems, alignment systems, and the like as discussed above.

FIG. 22 shows the present apparatus 250 in an open position with none of the molds engaged. FIG. 23 shows the apparatus 250 in a closed position with the mandrels engaged with the respective cavities. Also, FIG. 23 shows the second mold cavity 258 in position to receive a melt stream from the second injection apparatus 254. To move from the open position to the closed position, the second mold cavity 258 is first drawn towards the turntable 260 and into engagement with the corresponding mandrel 98. The turntable assembly then moves horizontally along the ways to engage the first cavity 256 with the corresponding mandrel 98. When the engagement is complete, the second mold cavity 258 is in communication with the second melt source 254.

A method of forming a two layer overmolded preform is described below. As above, however, a particular mandrel 98AA will be followed through a production cycle. It will be appreciated that the other mandrels 98BB-DD are in concurrent use in other steps of the cycle. FIG. 24 includes a chart showing the stages each station and mandrel will complete when forming a preform using this apparatus and showing the relative positions of each station during the production cycle.

At the beginning of a cycle, the apparatus is in the open position and the mandrel 98AA is unencumbered by any preform. It is oriented so that it extends horizontally and is aligned with the first mold cavity 256. Concurrently, mandrel 98DD, which has a single layer PET preform already disposed thereon, is oriented vertically and is aligned with the second mold cavity 258. To close the molds, the second mold cavity 258 is first drawn into engagement with the mandrel 98DD and the turntable assembly is moved horizontally along the ways 266 so that the mandrel 98AA engages the first mold cavity 256 and the second injector 254 is brought into communication with the second mold cavity 258. The first injector 252 then injects a melt stream of PET into the first mold cavity 256 to fill the void space between the mandrel 98AA and the first mold cavity 256. Concurrently, the second injector 254 injects a melt stream of barrier material into the void space between the second mold cavity 258 and the PET layer disposed on the mandrel 98DD. After a brief cooling time during which a skin is formed on the just-injected PET preform, the turntable 260 is moved horizontally along the ways to pull the mandrel 98AA out of engagement with the first cavity 256. As above, the just-injected preform remains on the mandrel 98AA. The second mold cavity 258 is then withdrawn from the mandrel 98DD and the rotating turntable 260 is rotated 90° so that mandrel 98AA is now aligned with the second mold cavity 258 and the mandrel 98BB is now aligned with the first mold cavity 256. The mold is closed as above and a layer of barrier material is injected onto the PET preform on mandrel 98AA while a PET preform is formed on mandrel 98BB. After a brief cooling time, the mold is again opened as above and the turntable 260 is rotated 90°. Mandrel 98AA is now free of any mold cavities and the newly molded preform disposed on the mandrel 98AA is cooled during this time. Concurrently, mandrels 98BB and 98CC are in communication with the mold cavities. After the injections involving mandrels 98BB and 98CC are complete, the rotating table 260 is again rotated 90°. The mandrel 98AA is again retained in a cooling position out of alignment with any mold cavity. Concurrently, mandrels 98CC and 98DD engage the mold cavities and have layers injected thereon. The now-cooled preform is ejected from the mandrel 98AA to a conveyor or bin below the turntable 260 and the turntable 260 is again rotated 90°. Mandrel 98AA is again unencumbered, aligned with the first mold cavity 258, and ready to begin another production cycle.

Although the above-described apparatus 250 has been discussed in the context of forming a two-layer preform, it will be appreciated that the disclosed principles of construction and operation may be adapted to mold preforms having numerous layers. For instance, additional stations could be disposed on the turntable and additional injection machines and associated coating cavities arranged on the machine to provide for injections of additional layers.

4. Lamellar Injection Molding

A barrier layer or a barrier preform can also be produced by a process called lamellar injection molding (LIM). The essence of LIM processes is the creation of a meltstream which is composed of a plurality of thin layers. In this application, it is preferred that the LIM meltstream is comprised of alternating thin layers of PET and barrier material. The LIM process may be used in conjunction with the above-described preferred overmolding apparatus to overmold a coating of multiple, thin layers.

One method of lamellar injection molding is carried out using a system similar to that disclosed in several patents to Schrenk, U.S. Pat. Nos. 5,202,074, 5,540,878, and 5,628,950, the disclosures of which are hereby incorporated in their entireties by reference, although the use of that method as well as other methods obtaining similar lamellar meltstreams are contemplated as part of the present invention. Referring to FIG. 25, a schematic of a LIM system 270 is shown. The system in FIG. 25 shows a two material system, but it will be understood that a system for three or more materials could be used in a similar fashion. The two materials which are to form the layers, at least one of which is preferably a barrier resin, are placed in separate hoppers 272 and 274, which feed two separate cylinders, 276 and 278 respectively. The materials are coextruded at rates designed to provide the desired relative amounts of each material to form a lamellar meltstream comprised of a layer from each cylinder.

The lamellar meltstream output from combined cylinders is then applied to a layer generation system 280. In the layer generation system 280, the two layer meltstream is multiplied into a multi-layer meltstream by repetition of a series of actions much like one would do to make a pastry dough having a number of layers. First, one divides a section of meltstream into two pieces perpendicular to the interface of the two layers. Then the two pieces are flattened so that each of the two pieces is about as long as the original section before it was halved in the first step, but only half as thick as the original section. Then the two pieces are recombined into one piece having similar dimensions as the original section, but having four layers, by stacking one piece on top of the other piece so that the sublayers of the two materials are parallel to each other. These three steps of dividing, flattening, and recombining the meltstream may be done several times to create more thinner layers. The meltstream may be multiplied by performing the dividing, flattening and recombining a number of times to produce a single melt stream consisting of a plurality of sublayers of the component materials. In this two material embodiment, the composition of the layers will alternate between the two materials. The output from the layer generation system passes through a neck 282 and is injected into a mold to form a preform or a coating.

A system such as that in FIG. 25 to generate a lamellar meltstream may be used in place of one or both of the injectors in the overmolding process and apparatus described above. Alternatively, a barrier preform could be formed using a single injection of a LIM meltstream if the meltstream comprised barrier material. If a preform is made exclusively from a LIM meltstream or is made having an inner layer which was made from a LIM meltstream, and the container made therefrom is to be in contact with edibles, it is preferred that all materials in the LIM meltstream have FDA approval.

In one preferred embodiment, a preform of the type in FIG. 4 is made using an inject-over-inject process wherein a lamellar meltstream is injected into the barrier coating cavities. Such a process, in which a preform is overmolded with a lamellar meltstream, can be called LIM-over-inject. In a LIM-over-inject process to create a preform from which a beverage bottle is made by blow molding, the first or inner layer 72 is preferably virgin PET, and the LIM meltstream is preferably a barrier material, such as PHAE, and recycled PET. Recycled PET is used in the outer layer 74 because it will not be in contact with edibles and it is cheaper to use to make up the bulk of a container than is virgin PET or most barrier materials.

FIG. 4A shows an enlarged view of a wall section 3 of a preform of the type in FIG. 4 made by a LIM over inject process. The inner layer 72 is a single material, but the outer layer 74 is comprised of a plurality of microlayers formed by the LIM process.

An exemplary process to make such a preform is as follows. Recycled polyethylene terephthalate is applied through a feed hopper 272 to a first cylinder 276, while simultaneously, a barrier material is applied through a second feed hopper 274 to a second cylinder 278. The two materials are coextruded at rates to provide two-layer lamellar meltstream comprising preferably 60-95 wt. % recycled polyethylene terephthalate and preferably 5-40 wt. % barrier material. The lamellar meltstream is applied to the layer generation system 280 in which a lamellar melt stream comprising the two materials is formed by dividing, flattening and recombining the meltstream, preferably at least twice. This lamellar melt stream exits at 282 and is then injected into a mold, such as that depicted in FIG. 9. Preferably, the lamellar melt stream is injected into the preform coating cavities 120 of in an overmolding apparatus such as that in FIGS. 10 and 11 over a preform, to form a LIM-over-inject coated preform comprising a barrier layer consisting of alternating microlayers of barrier material and recycled PET.

In another exemplary process, virgin PET is applied through a feed hopper 272 to a first cylinder 276, while simultaneously, B-010 is applied through a second feed hopper 274 to a second cylinder 278. The two polymers are coextruded at rates to provide a meltstream comprising preferably 60-95 wt. % virgin polyethylene terephthalate and preferably 5-40 wt. % B-010. The two layer meltstream is applied to a layer generation system 280 in which a lamellar melt stream comprising the two materials is formed by dividing flattening and recombining the meltstream, preferably at least twice. This lamellar melt stream exits at 282 and is then injected into the preform molding cavities 156, 256 of any of the overmolding apparatus 150, 250 described above. This initial LIM preform is overinjected with recycled PET in the preform coating cavities 158, 258 to produce a preform with an inner layer consisting of alternating microlayers of barrier material and virgin PET, and an outer layer of recycled PET. Such a process may be called inject-over-LIM.

In the multilayer preform, LIM-over-inject or inject-over-LIM embodiments, the lamellar injection system can be used to advantage to provide a plurality of alternating and repeating sublayers, preferably comprised of PET and a barrier material. The multiple layers of these embodiments of the invention offers a further safeguard against premature diffusion of gases through the sidewall of the beverage container or other food product container.

H. Improving Mold Performance

As discussed above, the mold halves have an extensive cooling system comprising circulating coolant throughout the mold in order to conduct heat away and thus enhance the mold's heat absorption properties. With next reference to FIG. 26, which is a cross-section of a mold mandrel 298 and cavity 300 having features in accordance with the present invention, the mold cooling system can be optimized for the mold cavities by arranging cooling tubes 302 in a spiral around the mold cavity 300 and just below the surface 304. The rapid cooling enabled by such a cooling system helps avoid crystallization of the PET layer during cooling. Also, the rapid cooling decreases the production cycle time by allowing injected preforms to be removed from the mold cavities quickly so that the mold cavity 300 may be promptly reused.

As discussed above, the gate area 306 of the mold cavity 300 is especially pivotal in determining cycle time. The void space near the gate 308, which will make up the molded preform's base end 304, receives the last portion of the melt stream to be injected into the mold cavity 300. Thus, this portion is the last to begin cooling. If the PET layer has not sufficiently cooled before the overmolding process takes place, the force of the barrier material melt entering the mold may wash away some of the PET near the gate area 308. To speed cooling in the gate area of the mold cavity in order to decrease cycle time, inserts 310 of an especially high heat transfer material such as Ampcoloy can be disposed in the mold in the gate area 308. These Ampcoloy inserts 310 will withdraw heat at an especially fast rate. To enhance and protect the Ampcoloy inserts 310, a thin layer of titanium nitride or hard chrome may be deposited on the surface 312 of the Ampcoloy to form a hard surface. Such a deposited surface would be preferably between only 0.001 and 0.01 inches thick and would most preferably be about 0.002 inches thick.

As discussed above, the mandrel 298 is especially important in the cooling process because it directly cools the inner PET layer. To enhance the cooling effect of the mandrel 298 on the inner surface of the preform and especially to enhance the cooling effect of the mandrel 298 at the preform's gate area/base end 314, the mandrel 298 is preferably substantially hollow, having a relatively thin uniform wall 320, as shown in FIG. 26. Preferably, this uniform thickness is between 0.1 inch and 0.3 inches and is most preferably about 0.2 inches. It is particularly important that the wall 320 at the base end 322 of the mandrel 298 is no thicker than the rest of the mandrel wall 314 because the thin wall aids in rapidly communicating heat away from the molten gate area 314 of the injected preform.

To further enhance the mandrel's cooling capability, cooling water may be supplied in a bubbler arrangement 330. A core tube 332 is disposed centrally in the mandrel 298 and delivers chilled coolant C to the base end 322 thereof. Since the base end 322 is the first point of the mandrel 298 contacted by this coolant C, the coolant is coldest and most effective at this location. Thus, the gate area 314 of the injected preform is cooled at a faster rate than the rest of the preform. Coolant injected into the mandrel at the base end 322 proceeds along the length of the mandrel 298 and exits through an output line 334. A plurality of ribs 336 are arranged in a spiral pattern around the core 332 to direct coolant C along the mandrel wall.

Another way to enhance cooling of the preform's gate area was discussed above and involves forming the mold cavity so that the inner PET layer is thinner at the gate area than at the rest of the injected preform as shown in FIG. 4. The thin gate area thus cools quickly to a substantially solid state and can be quickly removed from the first mold cavity, inserted into the second mold cavity, and have a layer of barrier material injected thereover without causing washing of the PET.

In the continuing effort to reduce cycle time, injected preforms are removed from mold cavities as quickly as possible. However, it may be appreciated that the newly injected material is not necessarily fully solidified when the injected preform is removed from the mold cavity. This results in possible problems removing the preform from the cavity 300. Friction or even a vacuum between the hot, malleable plastic and the mold cavity surface 304 can cause resistance resulting in damage to the injected preform when an attempt is made to remove it from the mold cavity 300.

Typically, mold surfaces are polished and extremely smooth in order to obtain a smooth surface of the injected part. However, polished surfaces tend to create surface tension along those surfaces. This surface tension may create friction between the mold and the injected preform which may result in possible damage to the injected preform during removal from the mold. To reduce surface tension, the mold surfaces are preferably treated with a very fine sanding device to slightly roughen the surface of the mold. Preferably the sandpaper has a grit rating between about 400 and 700. More preferably a 600 grit sandpaper is used. Also, the mold is preferably sanded in only a longitudinal direction, further facilitating removal of the injected preform from the mold.

During injection, air is pushed out of the mold cavity 300 by the injected meltstream. As a result, a vacuum may develop between the injected preform and the mold cavity wall 304. When the injected preform is removed from the cavity 300, the vacuum may resist removal, resulting in damage to the not-fully-solidified preform. To defeat the vacuum, an air insertion system 340 may be employed. With additional reference to FIGS. 27 and 28, an embodiment of an air insertion system 340 is provided. At a joint 342 of separate members of the mold cavity 300, a notch 344 is preferably formed circumferentially around and opening into the mold cavity 300. The notch 344 is preferably formed by a step 346 of between 0.002 inches and 0.005 inches and most preferably about 0.003 inches in depth. Because of its small size, the notch 344 will not fill with plastic during injection but will enable air A to be introduced into the mold cavity 300 to overcome the vacuum during removal of the injected preform from the mold cavity 300. An air line 350 connects the notch 344 to a source of air pressure and a valve (not shown) controls the supply of air A. During injection, the valve is closed so that the melt fills the mold cavity 300 without air resistance. When injection is complete, the valve opens and a supply of air is delivered to the notch 344 at a pressure between about 75 psi and 150 psi and most preferably about 100 psi. The supply of air defeats any vacuum that may form between the injected preform and the mold cavity, aiding removal of the preform. Although the drawings show only a single air supply notch 344 in the mold cavity 300, any number of such notches may be provided and in a variety of shapes depending on the size and shape of the mold.

While some of the above-described improvements to mold performance are specific to the method and apparatus described herein, those of skill in the art will appreciate that these improvements may also be applied in many different types of plastic injection molding applications and associated apparatus. For instance, use of Ampcoloy in a mold may quicken heat removal and dramatically decrease cycle times for a variety of mold types and melt materials. Also, roughening of the molding surfaces and provides air pressure supply systems may ease part removal for a variety of mold types and melt materials.

I. Formation of Preferred Containers by Blow Molding

The barrier-coated containers preferably produced by blow-molding the barrier-coated preforms, the creation of which is disclosed above. The barrier-coated preforms can be blow-molded using techniques and conditions very similar, if not identical, to those by which uncoated PET preforms are blown into containers. Such techniques and conditions for blow-molding monolayer PET preforms into bottles are well known to those skilled in the art and can be used or adapted as necessary.

Generally, in such a process, the preform is heated to a temperature of preferably 80 to 120° C., more preferably 100 to 105° C., and given a brief period of time to equilibrate. After equilibration, it is stretched to a length approximating the length of the final container. Following the stretching, pressurized air is forced into the preform which acts to expand the walls of the preform to fit the mold in which it rests, thus creating the container.

J. Testing of Laminate Bottles

Several bottles were made according to the overmolding processes of the present invention, having varying amounts of IPA in the PET, and using PHAE as the barrier material. Control bottles were also made from PET having no IPA therein.

The test bottles were made by blow-molding preforms made by the overmolding process described above. An impact test was then performed on the bottles, whereby the sidewall (body portion) of each bottle was struck by an impacting force. The bottles were then observed for signs of physical damage, most importantly delamination of the laminate material in the sidewall of the bottle.

It was found that the bottles having inner PET layers having higher levels of IPA experienced less delamination when subjected to the impact test than laminates having lower levels of IPA, which still fared better than those bottles made from PET having no IPA at all. Thus, it is shown that better adhesion between the layers of the laminate is achieved when EPA-PET is used in making laminates with phenoxy materials.

Although the present invention has been described in terms of certain preferred embodiments, and certain exemplary methods, it is to be understood that the scope of the invention is not to be limited thereby. Instead, Applicant intends that the scope of the invention be limited solely by reference to the attached claims, and that variations on the methods and materials disclosed herein which are apparent to those of skill in the art will fall within the scope of Applicant's invention.

What is claimed is:

1. A mold for injection molding preforms, comprising:
   a first mold portion and a second mold portion,
   the first mold portion comprising a plurality of cavities, each cavity including a gate for injecting plastic melt and an upper region for molding a neck finish; and
   the second mold portion comprising a plurality of mandrels, each mandrel having a base end;
   wherein the first and second mold portions are moveable between a closed position, wherein each of the plurality of cavities of the first mold portion are mated with a corresponding mandrel of the plurality of mandrels of the second mold portion, and an open position;
   wherein a plurality of void spaces is defined by the cavities and corresponding mandrels when the mold is in the closed position; and
   wherein at least the area surrounding each gate and the base end of each mandrel comprises a material having a high heat conductivity to allow for rapid cooling of plastic melt when placed in the mold.

2. The mold of claim 1, wherein the mandrel has a coolant supply tube configured to deliver circulating coolant for cooling the mandrel.

3. The mold of claim 1, wherein the base of each mandrel and the area surrounding each corresponding gate form a portion of the void space corresponding to an end cap region of a preform.

4. The mold of claim 1, wherein the mandrel comprises an elongated body comprising a high heat transfer material, and the elongated body of the mandrel and a portion of the cavity define a portion of the void space defining a generally cylindrically shaped portion of a body of a preform.

5. The mold of claim 1, wherein a substantial portion of the mandrel comprises a high heat transfer material.

6. The mold of claim 1, wherein the high heat conductivity material comprises beryllium coated with a hard metal.

7. The mold of claim 1, wherein the high heat conductivity material comprises a high heat conductivity alloy.

8. A mold for injection molding preforms, comprising:
   a plurality of mandrels and a plurality of cavities;
   each mandrel including a wall and a coolant supply tube disposed within the mandrel to supply coolant to the mandrel; and
   each cavity including a lower region comprising a gate for injecting plastic melt and an upper region for molding a neck finish of a preform;
   wherein at least the area surrounding each gate comprises a high heat conductivity material.

9. The mold of claim 8, wherein at least a portion of each mandrel comprises a high heat conductivity material.

10. The mold of claim 9, wherein the base end of the mandrel comprises high heat conductivity material.

11. The mold of claim 9, wherein a substantial portion of each mandrel comprises a high heat conductivity material.

12. The mold of claim 8, wherein a void space is defined between one of the mandrels and a corresponding cavity, and the cavity is sized and adapted so that the thickness of the void space adjacent to the lower region of the cavity is different from the thickness of the void space adjacent to the upper region of the cavity.

13. The mold of claim 8, wherein the mold is movable between a closed position and an open position.

14. The mold of claim 13, wherein the area surrounding each gate and the base end of each corresponding mandrel define a void corresponding to an end cap region of a preform when the mold is in the closed position.

15. The mold of claim 8, wherein the cavity comprises an insert comprising the gate for injecting plastic into the void space, the insert comprising high heat conductivity material.

16. The mold of claim 8, wherein the high heat conductivity material comprises beryllium coated with a hard metal.

17. The mold of claim 8, wherein the high heat conductivity material comprises a high heat conductivity alloy.

18. A mold assembly, comprising:
   a cavity section having an upper cavity surface and a lower cavity surface, the lower cavity surface comprising a first body of high heat transfer material;
   an elongated core having a core mold surface comprising a second body of high heat transfer material; and
   a void space formed by the cavity section and the elongated core when the mold assembly is in a closed position, the void space having an upper end and a lower end, the upper end of the void space being defined by the upper cavity surface and the core mold surface, and the lower end of the void space being defined by the lower cavity surface and the core mold surface.

19. The mold of claim 18, wherein the void space is configured to receive plastic to form a preform comprising a neck finish and a body portion, wherein the upper end of the void space forms the neck finish.

20. The mold of claim 19, wherein the lower end of the void space forms the body portion extending from the neck finish and terminating in an end cap.

21. The mold of claim 18, wherein the elongated core comprises a tube surrounded by an outer wall of the mandrel and configured to deliver coolant directly to a rounded end of the core.

22. The mold of claim 18, wherein the first body of high heat transfer material and the second body of high heat transfer material comprise beryllium coated with a hard metal.

23. The mold of claim 18, wherein the first body of high heat transfer material and the second body of high heat transfer material comprise a high heat conductivity alloy.

24. The mold of claim 18, wherein the cavity comprises an insert defining a gate for injecting plastic into the void space, the insert comprising high heat transfer material.

25. An injection molding assembly having a plurality of void spaces for forming preforms having a neck finish and a body portion, the body portion extending from the neck finish and terminating in a base end, the improvement comprising:
   a plurality of mandrels having a wall and a base end; and
   a plurality of cavities each having a surface that that cooperates with corresponding walls a mandrel to define each of the plurality of void spaces,
   wherein each cavity comprises a gate, wherein at least a portion of the cavity surrounding the gate comprises a high heat transfer material.

26. An injection molding assembly comprising:
   an elongated mandrel;
   a cavity configured to receive at least a portion of the mandrel; and
   a void space defined by the mandrel and the cavity and configured to receive material to form a preform;
   wherein at least a portion of the mandrel and the cavity comprises a high heat transfer material.

27. The injection mold assembly of claim 26, wherein the cavity includes a gate for injecting plastic melt into the void space, and said at least a portion of the mandrel and the cavity comprising a high heat transfer material is proximate to the gate.

* * * * *